US007937319B2

(12) United States Patent
Kennis et al.

(10) Patent No.: US 7,937,319 B2
(45) Date of Patent: May 3, 2011

(54) METHODS AND SYSTEMS FOR COMPLIANCE MONITORING KNOWLEDGE BASE

(75) Inventors: Peter H. Kennis, Marietta, GA (US); Daniel R. Kuokka, Palo Alto, CA (US); Charles A Coombs, Atlanta, GA (US); Stayton D Addison, Dunwoody, GA (US); Andrew T Otwell, Douglasville, GA (US); Jeffrey Z Johnson, Alpharetta, GA (US); Patrick J. D. Taylor, Atlanta, GA (US); Michael E. Lortz, Atlanta, GA (US)

(73) Assignee: Oversight Technologies, Inc., Atlanta, GA (US)

( * ) Notice: Subject to any disclaimer, the term of this patent is extended or adjusted under 35 U.S.C. 154(b) by 1340 days.

(21) Appl. No.: 11/307,303

(22) Filed: Jan. 31, 2006

(65) Prior Publication Data

US 2006/0212486 A1 Sep. 21, 2006

Related U.S. Application Data

(63) Continuation of application No. 11/085,725, filed on Mar. 21, 2005.

(51) Int. Cl.
*G06Q 30/00* (2006.01)

(52) U.S. Cl. ....................... 705/38; 35/36; 35/37; 35/38

(58) Field of Classification Search .................... 705/35, 705/36 R, 37, 36, 38; 707/100
See application file for complete search history.

(56) References Cited

U.S. PATENT DOCUMENTS

| | | | | |
|---|---|---|---|---|
| 7,174,507 | B2 * | 2/2007 | Baudin et al. | 715/234 |
| 7,216,056 | B2 * | 5/2007 | Kubota et al. | 702/179 |
| 2003/0153991 | A1 * | 8/2003 | Visser et al. | 700/79 |
| 2004/0019500 | A1 | 1/2004 | Ruth | |
| 2004/0054690 | A1 * | 3/2004 | Hillerbrand et al. | 707/104.1 |
| 2004/0107124 | A1 | 6/2004 | Sharpe et al. | |
| 2005/0060245 | A1 * | 3/2005 | Hoffman et al. | 705/28 |

OTHER PUBLICATIONS

"Robot Auditors Could KO Future Enrons", Periodic Publication of News & Information for SystemLink, Link News, Issue 29, May 2002, pp. 1-4.

Gaudin, Sharon, "Datamation—Report: Insiders Wreaking Havoc on Corporate Security," May 29, 2003.

(Continued)

*Primary Examiner* — Nga B. Nguyen

(57) ABSTRACT

A knowledge base and methods for use in connection with a policy compliance monitoring system operative to determine exceptions to policies expressed by computer-executable policy statements. The system allows establishment, codification, and maintenance of enterprise policies, monitors electronic transactions of the enterprise from various and possibly heterogeneous data sources, detects exceptions to established policies, reports exceptions to authorized users such as managers and auditors, and/or provides a case management system for tracking exceptions and their underlying transactions. The knowledge base comprises extractor files that are utilized for extracting information from data sources for utilization in policy compliance monitoring, a mapper for normalizing data from the data sources against a system ontology and storing normalized data in a monitoring database, and computer-executable compliance policy statements used by a transaction analysis engine. The policy statements represent predetermined policies of the enterprise that apply to data stored in the monitoring database.

48 Claims, 48 Drawing Sheets

OTHER PUBLICATIONS

"2002 Report to the Nation Occupational Fraud and Abuse", 2002, pp. 1-29, Association of Certified Fraud Examiners, Austin, TX.
Pricewaterhouse Coopers, "Economic Crime Survey 2003", pp. 1-21.
Pricewaterhouse Coopers, "Key Elements of Antifraud Programs and Controls", Nov. 2003, pp. 1-29.
"Moving to Transaction Incident Management for IS Security", Strategic Analysis Report, Gartner Research, Jun. 19, 2002, pp. 1-32.
Kuskner, David, Vegas 911, Spectrum, IEEE, Apr. 2006, pp. 44-49, vol. 43, Issue 4, IEEE Media/IEEE Spectrum Magazine, New York, NY.
Jonas, Jeff, "Non-Obvious Relationship Awareness" (NORA), IBM Corporation, 2005, pp. 1-78.

* cited by examiner

EXEMPLARY ERP ENVIRONMENT-TRANSACTION INTEGRITY MONITORING (TIM)

INTEGRATED ERP ENVIRONMENT

DISTRIBUTED ERP SYSTEM(S) ENVIRONMENT

EXEMPLARY ENTITIES / TRANSACTIONS

EXEMPLARY CHANGES TO MONITORING ENTITIES - METADATA

MAIN EXECUTION LOOP

700

```
•
•
•

if ConfigureExtractor
        if MasterExtractor or SyncExtractor or LogExtractor
                specify enterprise databae connectivity
        end if
        if ProgrammaticExtractor
                specify interprocess communication
        end if
        specify staging database connectivity
        block configure extractor knowledge
                specify primary keys
                specify fields to extract
                specify filters
        end block
        specify context and parameters
end if
if ConfigureMapper
        configure staging database connectivity
        configure monitoring database connectivity
        block configure ontology
                define set of entities
                for each entity
                        specify entity name and description
                        specify entity fields
                        specify entity meta data
                end for
        end block
        block configure mappings
                for each entity
                        specify entity sources
                        specify field mappings
                        specify entity key
                end for
        end block
        specify context and parameters
end if
if ConfigureCore
        configure monitoring database connectivity
        block configure frames
                define set of frames (integrity checks)
                for each frame
                        specify transaction
                        specify support entities
                        specify indicators
                        specify additional frame parameters
                end for
        end block
        specify context and parameters
end if
if ConfigureWorkbench (UI)
        configure monitoring database connectivity
        configure user permissions
        configure reports
end if

•
•
•
```

EXEMPLARY CODE FOR TIM SYSTEM CONFIGURATION

```
•
•
•
while forever
        read extractor knowledge file
        validate extractor file
        for each data source
                if InitialLoad
                        run MasterExtractor
                else
                        if UsesSyncExtractor
                                run SyncExtractor
                        else
                                if SyncInterval
                                        run SyncExtractor
                                else if UsesLogExtractor
                                        run LogExtractor
                                else if UsesProgrammaticExtractor
                                        run ProgrammaticExtractor
                                 else if UsesAdditionalExtractor
                                        run AdditionalExtractor
                                end if
                        end if
                end if
        end for
end while
•
•
•
```

DATA EXTRACTOR ARCHITECTURE

```
•
•
•
<!-- $NoKeywords$ -->
<extractors>
  <db_table_extractor>
    <description>JDE Extractor </description>
    <extractor_name>F43121</extractor_name>
    <source_table>F43121</source_table>
    <staging_table>F43121</staging_table>
    <key_field>PRMATC</key_field>
    <key_field>PRKCOO</key_field>
    <key_field>PRDCTO</key_field>
    <key_field>PRDOCO</key_field>
    <key_field>PRSFXO</key_field>
    <key_field>PRLNID</key_field>
    <key_field>PRNLIN</key_field>
    <key_field>PRKCO</key_field>
    <key_field>PRDOC</key_field>
    <key_field>PRDCT</key_field>
    <!-- <sql_filter> PS_VENDOR.SETID like '%US%'  </sql_filter>  -->
    <field>
      <name>PRMATC</name>
      <type>varchar(1)</type>
    </field>
    <field>
      <name>PRKCOO</name>
      <type>varchar(5)</type>
    </field>
•
•
•
```

PORTION OF EXEMPLARY EXTRACTOR FILE FIG. 9

MULTI-STAGE DATA EXTRACTION

IDENTIFY CHANGES FROM THE SOURCE DATABASE

PROGRAMMATIC EXTRACTION

1300

```
•
•
•
process EnterpriseSystemPlugin
        while true
if table update
        query for any additional fields
                send update to ExtractorListener
        end if
end while
end EnterpriseSystemPlugin

process ExtractorListener
        while true
                if received update
                        determine if new row
                        if new row
                                insert fields in staging database
                        else
                                update fields in staging database
                        end if
                end if
        end while
end ExtractorListener
•
•
•
```

EXEMPLARY CODE FOR
PROGRAMMATIC EXTRACTOR

```
•
•
•

initialize db connection
for each extracted table
        query selected columns for all rows
        insert rows in staging database
end for
close db connection

•
•
•
```

EXEMPLARY CODE FOR MASTER EXTRACTOR FIG. 14

LOG DATA EXTRACTION

1600

```
•
•
•

initial log connection
determine new log entries
for each new log entry
        create temporary row
        append log meta data
        query selected fields for subject row
        append fields
        add to temporary table
end for
for each row in temporary table
        determine if new row
        if new row
                insert selected fields in staging database
        else
                update selected fields in staging database
        mark as modified
end for
close db connection

•
•
•
```

EXEMPLARY CODE FOR LOG EXTRACTOR

```
•
•
•
initialize db connection
for each extracted table
        query selected fields for all rows
        save local temporary table
        DetermineNewAndModifiedRows
        for each new row
                insert selected fields in staging database
                mark as modified
        end for
        determine modified rows
        for each modified row
                update selected fields in staging database
                mark as modified
        end for
end for
close db connection

procedure DetermineNewAndModifiedRows
        construct full row index on staging table
        for each row in temporary table
                query for key in staging database
                if not exists
                        mark as new
                else
                        query for full row key
                        if not exists
                                mark as modified
                        end if
                end if
        end for
end procedure
•
•
•
```

EXEMPLARY CODE FOR RESYNC EXTRACTOR FIG. 17

EXEMPLARY TRANSACTIONS: SUPPORT AND TRANSACTIONAL ENTITIES

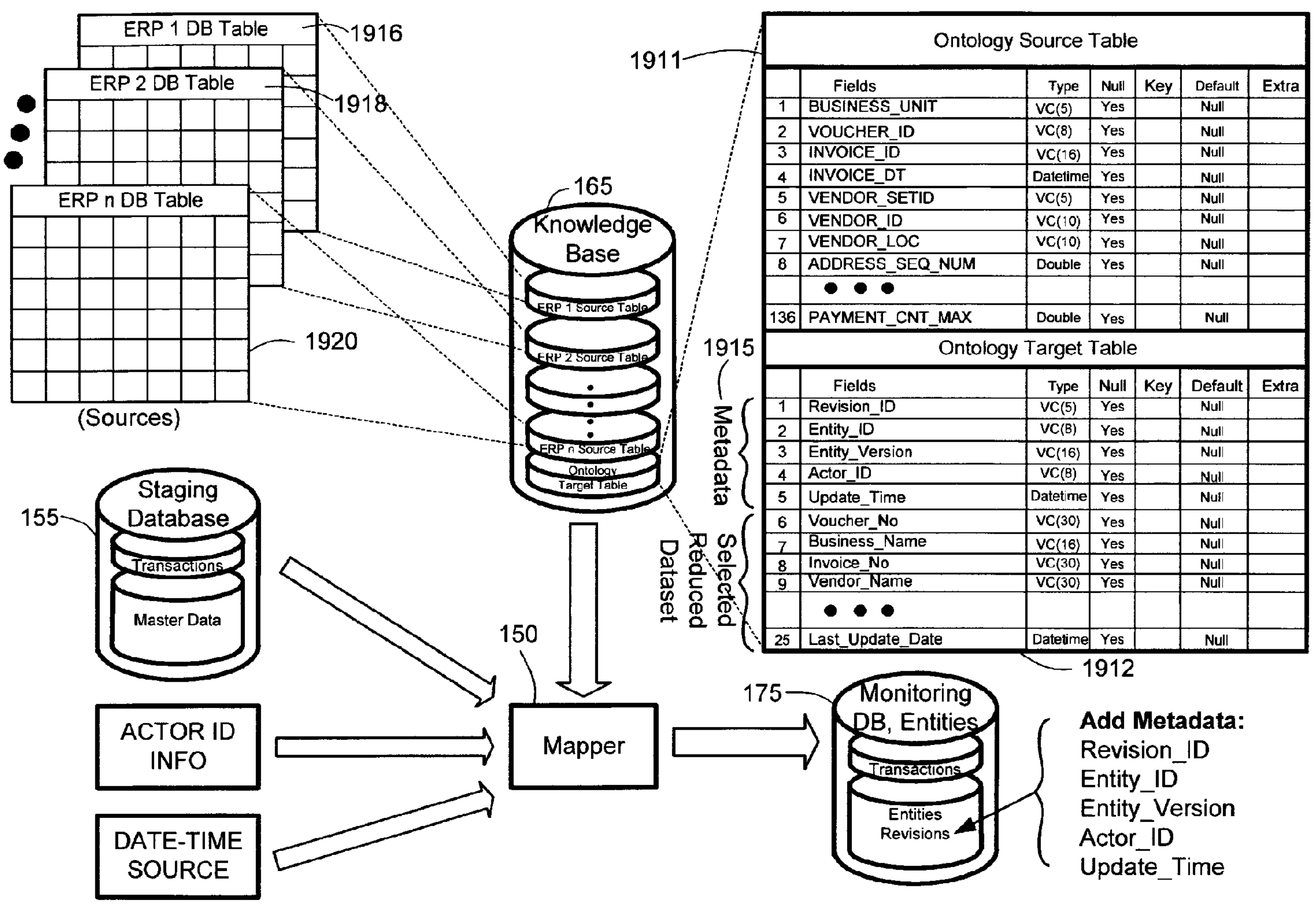

Ontology Source Table

| | Fields | Type | Null | Key | Default | Extra |
|---|---|---|---|---|---|---|
| 1 | BUSINESS_UNIT | VC(5) | Yes | | Null | |
| 2 | VOUCHER_ID | VC(8) | Yes | | Null | |
| 3 | INVOICE_ID | VC(16) | Yes | | Null | |
| 4 | INVOICE_DT | Datetime | Yes | | Null | |
| 5 | VENDOR_SETID | VC(5) | Yes | | Null | |
| 6 | VENDOR_ID | VC(10) | Yes | | Null | |
| 7 | VENDOR_LOC | VC(10) | Yes | | Null | |
| 8 | ADDRESS_SEQ_NUM | Double | Yes | | Null | |
| | • • • | | | | | |
| 136 | PAYMENT_CNT_MAX | Double | Yes | | Null | |

Ontology Target Table

| | Fields | Type | Null | Key | Default | Extra |
|---|---|---|---|---|---|---|
| 1 | Revision_ID | VC(5) | Yes | | Null | |
| 2 | Entity_ID | VC(8) | Yes | | Null | |
| 3 | Entity_Version | VC(16) | Yes | | Null | |
| 4 | Actor_ID | VC(8) | Yes | | Null | |
| 5 | Update_Time | Datetime | Yes | | Null | |
| 6 | Voucher_No | VC(30) | Yes | | Null | |
| 7 | Business_Name | VC(16) | Yes | | Null | |
| 8 | Invoice_No | VC(30) | Yes | | Null | |
| 9 | Vendor_Name | VC(30) | Yes | | Null | |
| | • • • | | | | | |
| 25 | Last_Update_Date | Datetime | Yes | | Null | |

MAPPER ARCHITECTURE

```
•
•
•

process CreateTargetTables
        read ontology file
        validate ontology file
        for each table specification
                create table
                create table meta data (entitiy to entity linking, display text)
        end for
end CreateTarget Tables

process Mapper
open staging db connection
open monitoring db connection
read base mappings
read custom mappings
validate mappings
validate consistency with ontology
for each monitoring table
        query/join source staging tables
        perform table/field transformations
        perform value transformations
        compute additional fields
        mark previous revision as old
        save fields as new current revision in monitoring table
        set new flag
end for
end Mapper

•
•
•
```

EXEMPLARY CODE FOR MAPPER

FIG. 20

EXEMPLARY MAPPING (A/P)

2200

```
•
•
•
<?xml version="1.0"?>
<?xml-stylesheet href="../ontology.xsl" type="text/xsl"?>
<!-- $Id: mappingPTP xml,v 1.0, 2005-03-15 13 52 47Z, Mike Lortz$ -->
<!-- $NoKeywords$ -->
<ontology xmlns:xsi="http://www.w3.org/2001/XMLSchema-instance"
xsi noNamespaceSchemaLocation="C:\dev\Oversight\modules\kb\mapping.xsd">
  <README>Mapping for Procure-to-Pay (P2P) from XYZ</README>
  <README>In most cases amounts are stored in XYZ without decimals and need
to be divided by zero. That is done in many places in this mapping
file.</README>
  <README>In cases where XYZ amounts must be multiplied by -1, zero is
added to the result so that -0 is not stored in MySQL and displayed in
Oversight. It is thought that this problem relates to a floating point
hardware problem </README>
  <entity>
    <name>AP_VENDOR</name>
    <source>
      <name>F0401</name>
      <alias>V</alias>
      <join></join>
      <comment>F0401 is the XYZ Vendor Master</comment>
    </source>
    <source>
      <name>F0101</name>
      <alias>VAB</alias>
      <join>on (V.A6AN8=VAB.ABAN8)</join>
      <comment>F0101 is the XYZ Address Book Master</comment>
    </source>
    <source>
      <name>F0116</name>
      <alias>VABD</alias>
      <join>on (VAB.ABAN8=VABD.ALAN8 AND VAB.ABEFTB=VABD ALEFTB)</join>
      <comment>F0116 is the XYZ Address by Date</comment>
    </source>
    <key>V A6AN8</key>
    <nickname>VAB ABALPH</nickname>
    <field>
      <name>VENDOR_ID</name>
      <mapping>V.A6AN8</mapping>
    </field>
    <field>
      <name>NAME1</name>
      <mapping>VAB.ABALPH</mapping>
    </field>
    <field>
      <name>NAME2</name>
      <mapping>VAB.ABALP1</mapping>
    </field>
      •
      •
      •
```

EXEMPLARY MAPPER MAPPING FILE

```
•
•
•
<?xml version="1.0"?>
<?xml-stylesheet href="ontology.xsl" type="text/xsl"?>
<!-- $Id: ontologyPTP.xml,v 1.0, 2005-03-15 13:52:49Z,
Mike Lortz$ -->
<!--$NoKeywords$-->
<ontology xmlns:xsi="http://www.w3.org/2001/
XMLSchema-instance"
xsi:noNamespaceSchemaLocation="C:\dev\Oversight\
modules\kb\ontology.xsd">
  <README>Oversight Ontology for Procure-to-Pay
(P2P)</README>
  <entity>
    <name>AP_VENDOR</name>
    <title>Vendor</title>
    <description>A supplier of goods or services
    </description>
    <typeid>110</typeid>
    <linkage>
      <target>AP_PO</target>
      <title>POs</title>
      <description>All POs to the specified vendor
      </description>
      <query>from AP_PO as P join AP_VENDOR
           as V on P.VENDOR_ID=V.VENDOR_ID
       </query>
    </linkage>
    <linkage>
      <target>AP_VOUCHER</target>
      <title>Vouchers</title>
      <description>All vouchers for the specified
          vendor</description>
      <query>from AP_VOUCHER as VO join
               AP_VENDOR as V on
              VO.VENDOR_ID=V.VENDOR_ID
      </query>
    </linkage>
<linkage>
   <target>AP_VOUCHER_LINE</target>
   <title>Voucher Lines</title>
   <description>All voucher lines for the specified
         vendor</description>
   <query>from AP_VOUCHER_LINE as VL join
          AP_VENDOR as V on VL.VENDOR_ID
          =V.VENDOR_ID</query>
 </linkage>
 <linkage>
   <target>AP_PAYMENT</target>
   <title>Payments</title>
   <description>All payments to the specified vendor
   </description>
   <query>from AP_PAYMENT as P join AP_VENDOR
      as V on P.VENDOR_ID=V.VENDOR_ID</query>
 </linkage>
 <field>
   <name>VENDOR_ID</name>
   <description>Unique identifier for each Vendor. The
          mapped values for this field MUST BE UNIQUE.
          This field is often mapped to a concatenation
          of multiple fields that make VENDOR_ID unique
    </description>
    <type>varchar(50)</type>
 </field>
 <field>
   <name>NAME1</name>
   <description>Primary business name</description>
   <type>varchar(40)</type>
 </field>
 <field>
   <name>NAME2</name>
   <description>Secondary business name</description>
   <type>varchar(40)</type>
 </field>
 <field>
   <name>ADDRESS1</name>
   <description>Remittance Address Line 1</description>
   <type>varchar(40)</type>
 </field>
•
•
•
```

EXEMPLARY ONTOLOGY FILE

FIG. 23

KNOWLEDGE BASE ARCHITECTURE

2500

```
•
•
•
open monitoring db connection
read base frames
read custom frames
validate frames
for each frame
        compute any required statistics tables
        for each new revision of an entity
                for each set of support entities
                        evaluate indicators
                        if new indicator confidence > threshold
                                add new exception with confidence
                                compute potential impact and probability
                                generate description
                                link basis revisions
                                update wariness on basis entities
                        end if
                end for
        end for
end for
unset new flag
•
•
•
```

EXEMPLARY CODE FOR CORE EXECUTION

FIG. 25

EXEMPLARY POLICY EXCEPTION:
INVALID BUSINESS TRANSACTION SEQUENCE

EXEMPLARY POLICY EXCEPTION:
OVERRIDDEN TRANSACTIONS,
STORED ENTITIES/TRANSACTIONS

EXEMPLARY POLICY EXCEPTION:
EXCEPTIONS DETERMINED & RECORDED

2900

2910

2950

```
<!--VENDOR_GHOST_CREATION-->
<frame>
  <name>VENDOR_GHOST_CREATION</name>
  <summary>A Vendor is the same as an Employee.</summary>
  <description>
          <![CDATA[Vendor <B><%=VENDOR.VENDOR_ID%> <%=VENDOR.NAME1%></B>
          has been added or changed and is the same as Employee
          <B><%=EMPL.EMPLOYEE_ID%><%=EMPL.FIRST_NAME%><%=EMPL.LAST_NAME%></B>.]]>
  </description>
  <category>3</category>
  <system>1</system>
  <impact>9000</impact>
  <filter context="Scrub/.*">VENDOR.ADDRESS1!='346 N ORANGE GROVE BLVD'</filter>
  <transaction>
     <name>AP_VENDOR</name>
     <alias>VENDOR</alias>
  </transaction>
  <entity>
     <name>HR_EMPLOYEE</name>
     <alias>EMPL</alias>
  </entity>
  <indicator>
     <summary>The Vendor and Employee have the same phone number.</summary>
     <description>
           <![CDATA[ The Vendor and Employee have the same phone number:
                    <%=VENDOR.PHONE%> ]]>
     </description>
     <expr>VENDOR.PHONE != '' and VENDOR.PHONE=EMPL.PHONE</expr>
     <conf>.20</conf>
  </indicator>
  <cev>
     <column>
        <entity alias="VENDOR" title="New Vendor" open="1" view="detail"></entity>
     </column>
     <column>
        <entity alias="EMPL" title="Employee" open="1" view="detail"></entity>
     </column>
  </cev>
</frame>
```

EXEMPLARY FRAME/EXECUTABLE
POLICY STATEMENT

FIG. 29

PORTION OF EXEMPLARY FRAME:
CONFIDENCE LEVEL CALCULATION

FRAME TYPES & EXECUTION SEQUENCE FIG. 31

EXEMPLARY CALCULATION OF WARINESS, CONFIDENCE, IMPACT AND PRIORITY

| OST_EXCEPTION | | |
|---|---|---|
| **Name** | **Type** | **Default Value** |
| EXCEPTION_ID | bigint(20) | 0 |
| EXCEPTION_NAME | varchar(100) | '' |
| EXCEPTION_FRAME_NAME | varchar(50) | NULL |
| EXCEPTION_FRAME_VERSION | varchar(20) | |
| EXCEPTION_FRAME_UPDATE | datetime | |
| EXCEPTION_DESCRIPTION | text | NULL |
| EXCEPTION_DATE_DETECTED | datetime | NULL |
| EXCEPTION_POTENTIAL_IMPACT | int(10) | NULL |
| EXCEPTION_EXPECTED_IMPACT | int(11) | NULL |
| EXCEPTION_PROBABILITY | tinyint(3) | NULL |
| EXCEPTION_PRIVATE | tinyint(1) | 0 |
| EXCEPTION_OWNER | int(11) | NULL |
| EXCEPTION_STATUS_ID | int(11) | 0 |
| EXCEPTION_ADDED_BY | char(1) | NULL |
| CATEGORY_ID | int(11) | NULL |
| SYSTEM_ID | int(11) | NULL |
| LAST_UPDATE_TIME | datetime | NULL |

DATA STRUCTURE OF AN
EXEMPLARY EXCEPTION

FIG. 33

RELATIONSHIP AMONG TRANSACTIONAL ENTITIES,
SUPPORT ENTITIES AND EXCEPTIONS

EXCEPTIONS AND RELATED ENTITIES

RELATED ENTITIES: PURCHASE ORDER

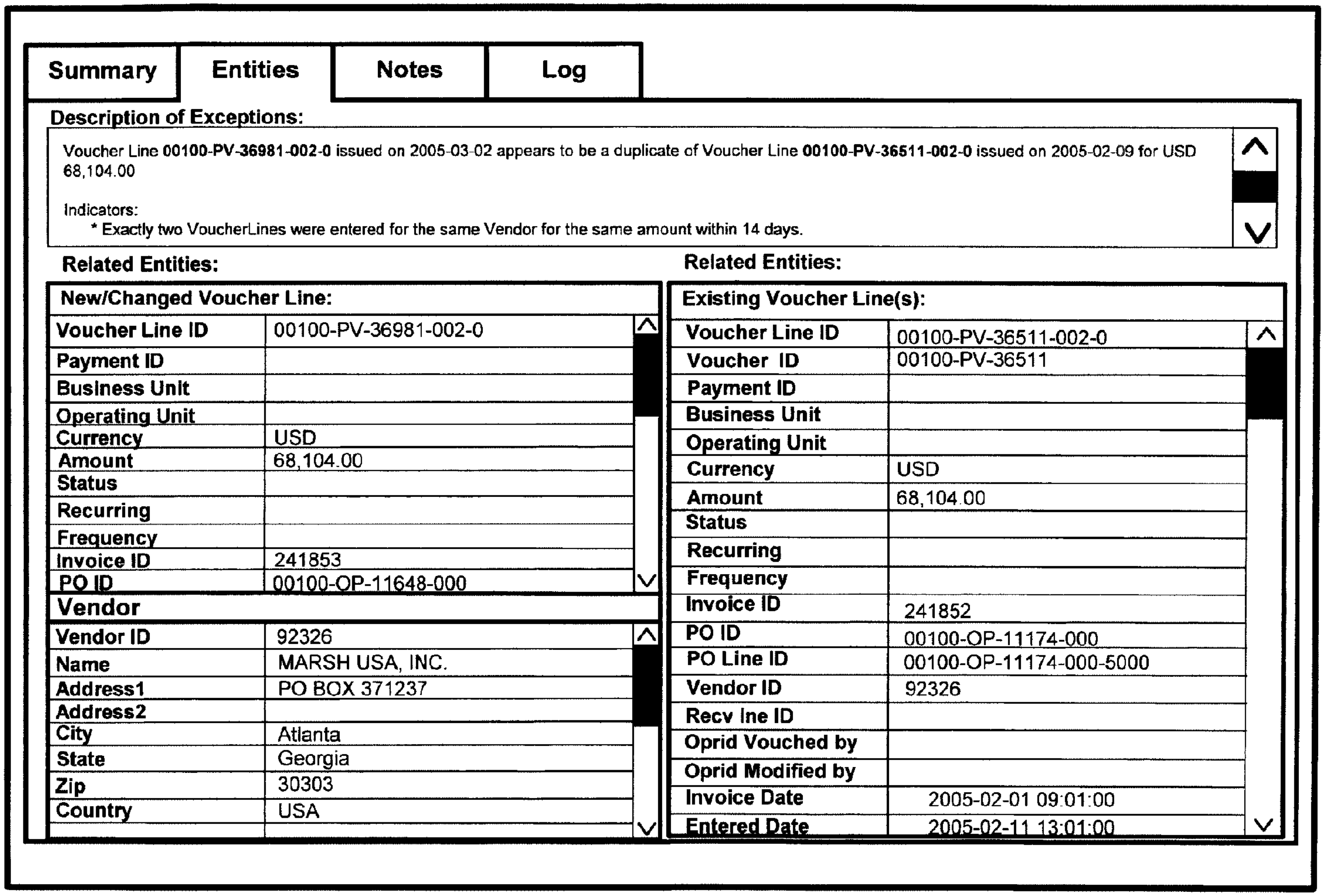

FIG. 37

| Summary | Entities | Notes | Log |

Description of Exceptions:

Voucher Line 00100-PV-36981-002-0 issued on 2005-03-02 appears to be a duplicate of Voucher Line 00100-PV-36511-002-0 issued on 2005-02-09 for USD 68,104.00.

Indicators:
* Exactly two VoucherLines were entered for the same Vendor for the same amount within 14 days.

Related Entities:

New/Changed Voucher Line:

| Field | Value |
|---|---|
| Voucher Line ID | 00100-PV-36981-002-0 |
| Payment ID | |
| Business Unit | |
| Operating Unit | |
| Currency | USD |
| Amount | 68,104.00 |
| Status | |
| Recurring | |
| Frequency | |
| Invoice ID | 241853 |
| PO ID | 00100-OP-11648-000 |
| Vendor | |
| Vendor ID | 92326 |
| Name | MARSH USA, INC. |
| Address1 | PO BOX 371237 |
| Address2 | |
| City | Atlanta |
| State | Georgia |
| Zip | 30303 |
| Country | USA |

Related Entities:

Existing Voucher Line(s):

| Field | Value |
|---|---|
| Voucher Line ID | 00100-PV-36511-002-0 |
| Voucher ID | 00100-PV-36511 |
| Payment ID | |
| Business Unit | |
| Operating Unit | |
| Currency | USD |
| Amount | 68,104.00 |
| Status | |
| Recurring | |
| Frequency | |
| Invoice ID | 241852 |
| PO ID | 00100-OP-11174-000 |
| PO Line ID | 00100-OP-11174-000-5000 |
| Vendor ID | 92326 |
| Recv Ine ID | |
| Oprid Vouched by | |
| Oprid Modified by | |
| Invoice Date | 2005-02-01 09:01:00 |
| Entered Date | 2005-02-11 13:01:00 |

RELATED ENTITIES DETAIL

RELATED ENTITIES FROM DIFFERENT DATA SOURCES

| Exceptions VENDOR_GHOST_CREATION - 105012001124226 | | | | | | [Go] [Advanced] |
|---|---|---|---|---|---|---|

| Summary | Entities | Notes | Log |
|---|---|---|---|

Description of Exceptions:
Vendor SSCNA_C9892 PROEDGE INC has been added or changed and is the same as Employee 0008034 Adelbert Bell.

*Indicators:*
** The Vendor and Employee have a similar or identical address
   Vendor Address: 16007 DELMAR CT, LOWELL, IN 46356

Related Entities: ⬅ 3920

| New Vendor | |
|---|---|
| Vendor ID | SSCNA-C9892 |
| Name 1 | PROEDGE INC |
| Name 2 | |
| Address 1 | 16007 DELMAR CT |
| Address 2 | |
| City | LOWELL |
| State | IN |
| Zip | 46356 |
| Country | USA |
| Phone | |
| Bank Account | |
| Status | ACTIVE |
| Oprid Entered By | |
| Effective Date | 2005-01-20 09:00:00 |

Related Entities ⬅ 3915

| Employee | |
|---|---|
| Employee ID | 0008034 |
| Last Name | Bell |
| First Name | Adelbert |
| SSN | |
| Address1 | 16007 DELMAR CT |
| Address2 | |
| City | LOWELL |
| State | IN |
| Zip | 46356 |
| Country | USA |
| Phone | |
| Employee Status | ACTIVE |
| Marital Status | |

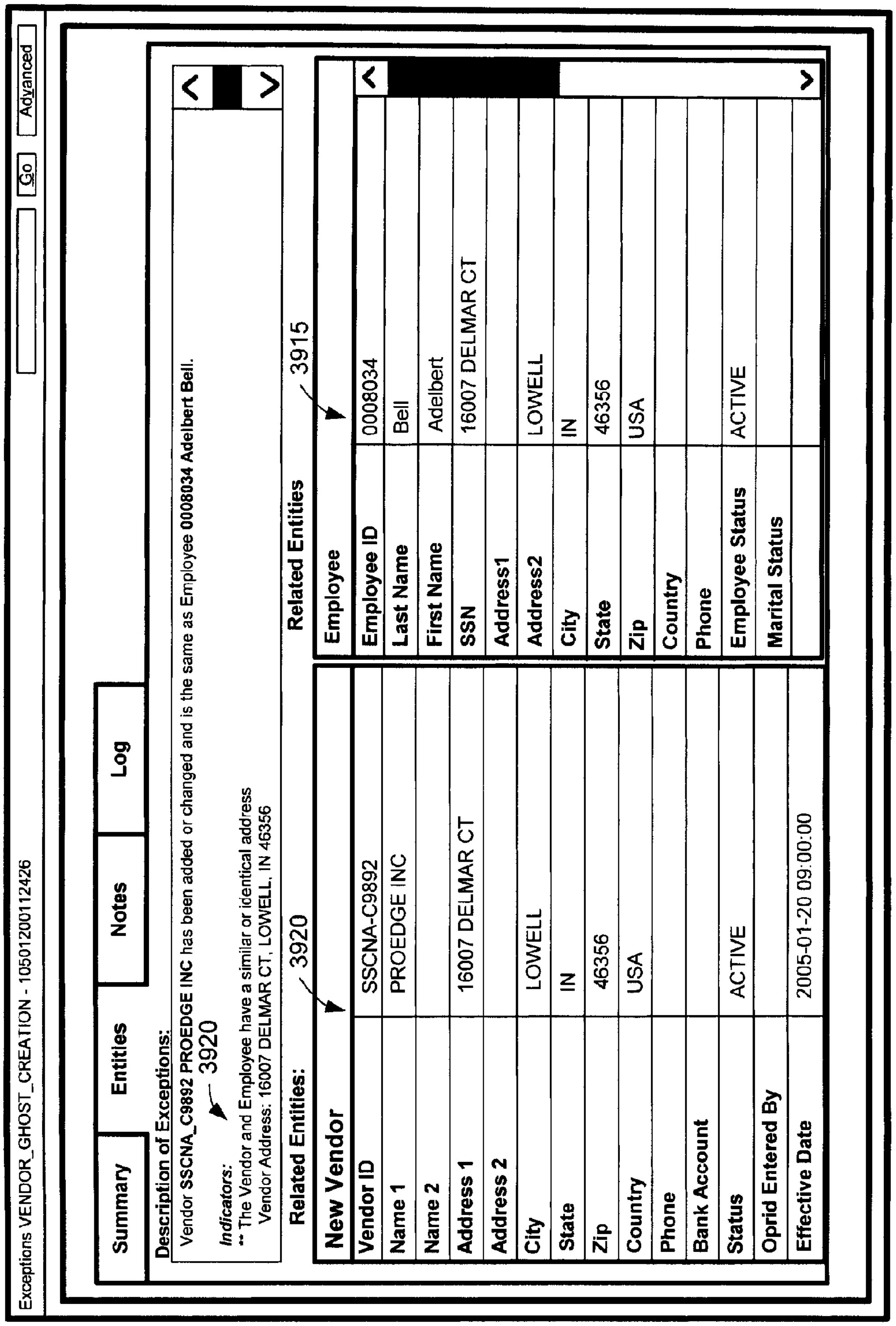

FIG. 39

RELATED ENTITIES: LINK ANALYSIS

EXEMPLARY CASE MANAGEMENT UI --- SUMMARY

| Summary | Entities | Chronology | Reports | Notes | Log |

Employee [Adelbert Bell]    — 4102

4104 — Case ID    1236897
Date Created 01/05/2005

| Employee | |
|---|---|
| Employee ID | 0008034 |
| Last Name | Bell |
| First Name | Adelbert |
| SSN | |
| Address1 | 16007 DELMAR CT |
| Address2 | |
| City | LOWELL |
| State | IN |
| Zip | 46356 |
| Country | USA |
| Phone | |
| Employee Status | ACTIVE |
| Marital Status | |

EXEMPLARY CASE MANAGEMENT UI — ENTITIES

EXEMPLARY CASE MANAGEMENT UI --
TRANSACTION HISTORY / CHRONOLOGY

| Summary | Entities | Chronology | Reports | Notes | Log |

| Impact | Confidence | Status |

View: ☐ Day  ☐ Week  ● Month  ☐ Year

| Case No. | Exception ID | Actor | Exception Description | Impact |
|---|---|---|---|---|
| 1212345 | 10530-20-0012756 | Jane Doe | Duplicated Payment | $150,000 |
| 1212456 | 10530-20-0012768 | John Smith | Ghost Vendor | $70,000 |
| 1212567 | 10530-20-0023456 | Linda Hunt | Ghost Vendor | $110,000 |
| 1212567 | 10530-20-0053678 | Linda Hunt | Ghost Vendor | $10,000 |
| 1212789 | 10530-20-0023456 | Jane Doe | Misdirected Payment | $110,000 |
| 1214376 | 10530-20-0324675 | John Smith | Improper Payroll Payments | $80,000 |
| 1214356 | 10530-20-0343456 | Linda Smith | Improper Payroll Payments | $1,000 |
| 1215276 | 10530-20-0652778 | Linda Smith | Improper Payroll Payments | $25,000 |

Total: $2,170,340

☐ Private

EXEMPLARY CASE MANAGEMENT UI --- REPORT / IMPACT

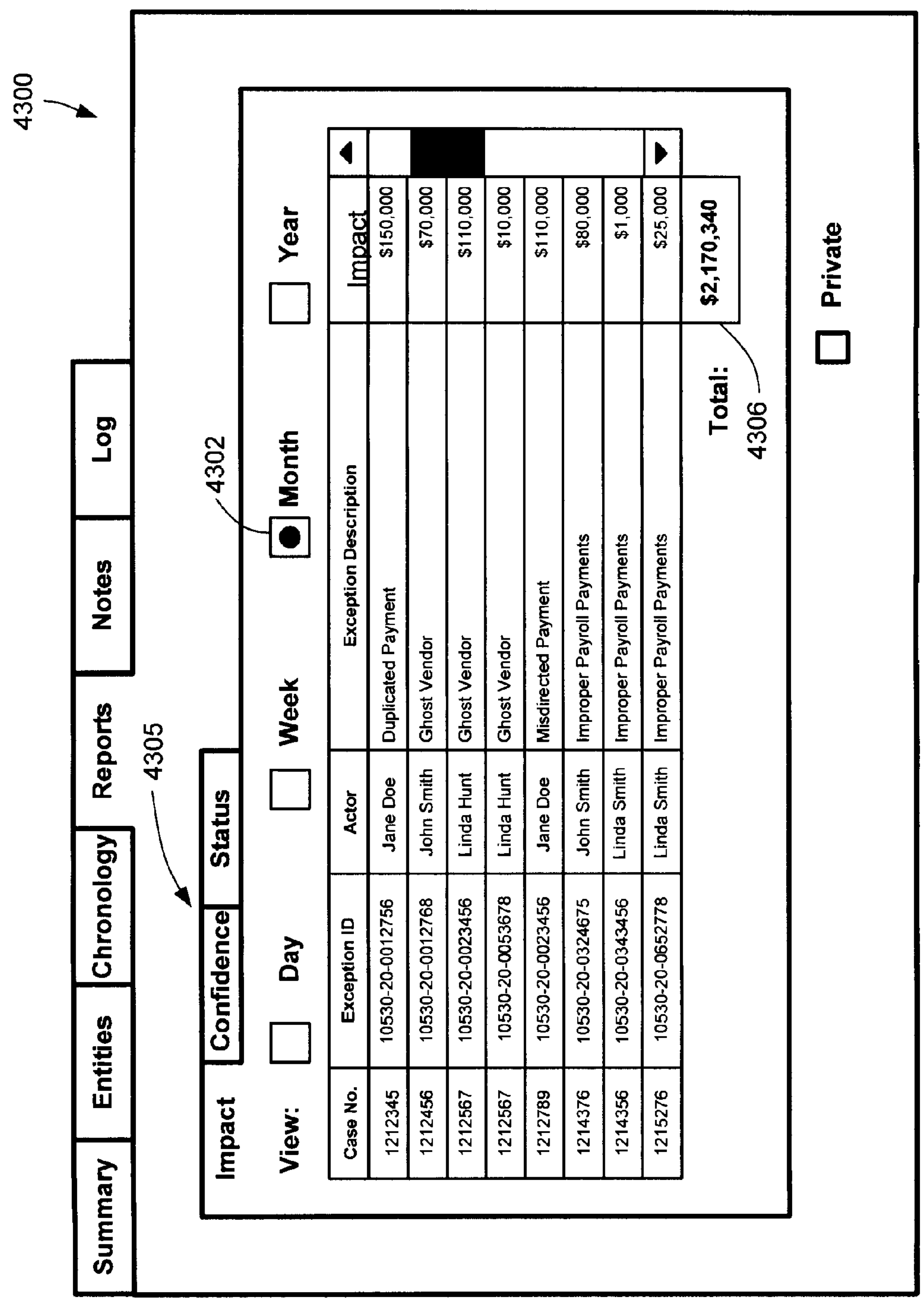

FIG. 43

EXEMPLARY CASE MANAGEMENT UI --- REPORTS / STATUS

EXCEPTION ASSIGNED TO AN OWNER WITH ITS STATUS

EXEMPLARY CASE MANAGEMENT UI --- NOTES

EXEMPLARY CASE MANAGEMENT UI --- LOG

EXEMPLARY EXCEPTION AND CASE

METHODS AND SYSTEMS FOR COMPLIANCE MONITORING KNOWLEDGE BASE

CROSS-REFERENCE TO RELATED APPLICATION

This application is a continuation of copending U.S. patent application entitled "METHODS AND SYSTEMS FOR TRANSACTION COMPLIANCE MONITORING" by Peter H. Kennis, Daniel R. Kuokka, Charles A. Coombs, Stayton D. Addison, Andrew T. Otwell, Jeffrey Z. Johnson, Patrick Taylor, and Michael E. Lortz, having application Ser. No. 11/085,725, filed on Mar. 21, 2005, which claims the benefit of and priority on U.S. Provisional Patent Application No. 60/554,784 entitled "METHODS AND SYSTEMS FOR CONTINUOUS MONITORING OF TRANSACTION DATA FLOW" BY Peter H. Kennis, Stayton D. Addison, Charles A. Coombs, Andrew T. Otwell, and Daniel R. Kuokka, filed on Mar. 19, 2004, the disclosures of which are hereby incorporated herein by reference in their entirety.

This application is also related to and incorporates by reference herein the following US patent applications:

(1) application Ser. No. 11/307,300, filed on Jan. 31, 2006, entitled "Methods and Systems for Extraction of Transaction Data for Compliance Monitoring";

(2) application Ser. No. 11/307,302, filed on Jan. 31, 2006, entitled "Methods and Systems for Mapping Transaction Data to Common Ontology for Compliance Monitoring";

(3) application Ser. No. 11/307,305, filed on Jan. 31, 2006, entitled "Methods and Systems for Policy Statement Execution Engine";

(4) application Ser. No. 11/307,307, filed on Jan. 31, 2006, entitled "Methods and Systems for Compliance Monitoring Case Management";

(5) application Ser. No. 11/307,308, filed on Jan. 31, 2006, entitled "Methods and Systems for Entity Linking in Compliance Policy Monitoring"; and (6) application Ser. No. 11/307,309, filed on Jan. 31, 2006, entitled "Methods and Systems for Monitoring Transaction Entity Versions for Policy Compliance".

FIELD OF THE INVENTION

The present invention relates generally to compliance monitoring of electronic enterprise transactions, and more particularly relates to extraction of electronic data transactions within enterprise computing systems for enterprise policy compliance monitoring, anomaly detection, risk assessment, fraud deterrence, and investigation.

BACKGROUND OF THE INVENTION

The growth of automated business systems, such as enterprise resource planning (ERP) and customer relationship management (CRM) applications, continues to propel productivity gains and new efficiencies in the e-business world. These business systems allow organizations to easily manage accounts payable, human resources, account receivables, inventory, payroll, and more in real-time. However, automated business systems are subject to errors, misuse, and fraud, just like manual, unautomated systems. Furthermore, automated business systems can open the door for business "hacks" resulting in asset misappropriation and significant financial losses. Both intentional and unintentional problems can jeopardize the integrity of transactions and reporting of an enterprise.

Sources of integrity compromise can be broken into categories that range from the most malicious to guiltless acts of well-meaning employees. Vulnerabilities in electronic transaction systems can: (1) permit access to target business applications to launch fraudulent schemes, (2) unknowingly introduce system errors that affect asset appropriation, such as create duplicate payments, or (3) allow system control to be overridden or circumvented, which then provides others the opportunity to abuse or misuse the system to commit fraud.

Organizations must take measures to reduce and eliminate all forms of errors, misuse, and fraud. Present day financial controls of modern business enterprises do not do enough to mitigate business risks from fraud and error within the organization. According to reports from the Association of Certified Fraud Examiners (ACFE), fraud and white collar hacks collectively drain 6 percent of a typical business enterprise's annual revenue. In 2002, these losses purportedly totaled over $600 billion. A survey by one well-known accounting firm pegged the average loss per company at greater than $2 million. Another accounting firm calls the problem of fraud and error "a bigger loss problem than viruses and worms combined."

The ACFE study found that an average fraud scheme lasted 18 months before it was detected. More than half of the detected schemes accounted for losses greater than $100,000; nearly one in six caused losses greater than $1 million. The study also reported that nearly two-thirds of all identified fraud was detected by "accident" or employee tips.

New motivations for evaluating financial controls, including the Sarbanes-Oxley Act of 2002, have driven some enterprises to re-think their financial controls. Section 404 of the Sarbanes-Oxley Act caused the Securities and Exchange Commission (SEC) to establish rules about annual reports of certain companies, especially publicly held companies. Such rules require an annual report to contain (1) a statement of management's responsibility for establishing and maintaining an adequate internal control structure and procedures for financial reporting, as well as (2) management's assessment, as of the end of the company's most recent fiscal year, of the effectiveness of the company's internal control structure and procedures for financial reporting. Section 404 also requires the company's auditor to attest to, and report on management's assessment of the effectiveness of the company's internal controls and procedures for financial reporting in accordance with standards established by the Public Company Accounting Oversight Board. These requirements alone have triggered a search by both a company's management and auditors for solutions to the establishment and maintenance of internal control structures, which are inevitably reflected in a company policies and procedures.

The Sarbanes-Oxley Act has heightened the importance of establishing enterprise policies regarding business activities and practices, ensuring compliance to those policies, and correcting lack of compliance promptly and efficiently. Failure to establish and abide by some government-imposed requirements can result in criminal as well as civil penalties, so many businesses and other organizations are scrambling to establish policies and compliance monitoring systems.

The real-time nature of information, analysis, decision-making, and policy validation creates additional complexities in financial controls and compliance monitoring. Partly because so much information in modern business enterprises is conducted by computer systems, some businesses and government organizations are exploring whether it is feasible to implement automated transaction monitoring systems as an alternative or supplemental to traditional people-based financial controls. In the process of exploring automated monitoring systems, many enterprises are facing tradeoffs between stringent controls, operational efficiency, and business risk. While stringent systems controls may stop a small percent of insiders who intend to defraud the enterprise, stringent controls place a heavy burden on the vast majority of insiders who are honest. Theoretically, automated transaction monitoring should allow an enterprise to remove many system restrictions and rely on real-time analysis to flag transactions that do not comply with enterprise policies. However, prior efforts to provide efficient and effective automated transaction monitoring systems have not been entirely successful.

Some prior approaches to automated transaction monitoring focused on narrow fields of critical transaction data flows and were implemented to detect overt indications of profound and clear problems. Software tools that assist in recording and documenting the investigative actions of a human auditor are known (case management systems). Some functions in querying available data were automated but only so under the direction of a human operator. Such limited approaches are watchful of only a small percentage of transactions on a computer system. Problematic issues in areas outside of the monitored fields can be overlooked though such issues may result in problems in seemingly non-critical transactions, may affect critical transactions with subtlety, and may result in disperse adverse affects that amount in summations to problems deserving attention but that may go undetected.

Accordingly, there is room for improvement in automated transaction monitoring systems that are operative for establishing enterprise policies and procedures, monitoring compliance with such policies and procedures, and reporting violations or deviations from the established policies and procedures. But there are various requirements for a system that will be effective and acceptable to the business community. Automated transaction monitoring must rely upon sophisticated data acquisition and multi-perspective analysis to correlate information from ERP systems, legacy mainframe applications, network monitoring solutions, and external data sources. These various systems implement the known business functions of accounts payable, accounts receivable, general ledger, human resources & payroll, and inventory management. After collecting relevant transaction information, automated transaction monitoring solutions must analyze each transaction and the context of the transaction with the same level of scrutiny that an internal human auditor and fraud examiner would employ. This complex analysis requires a combination of domain engineering, automated link analysis, behavior, deductive analysis, and standard business intelligence.

Furthermore, an effective transaction analysis system should flag suspicious activities and attempt to distinguish real concerns from hundreds of indicators of fraud, misuse, and errors. The system should detect acts of concealment and conversion designed to circumvent standard auditing techniques. The system should preferably operate in continuous or near real-time mode, so as to detect efforts at concealment and prevent complications and expense from later remedy.

Providing an acceptable transaction monitoring and analysis system has proven a daunting task. Nonetheless, the benefits of such a system are clear: (1) transaction integrity monitoring should build an audit trail of transactions within a financial system and direct internal auditors to the most suspicious transactions, (2) transaction integrity monitoring should establish a business environment that deters employees and other insiders from breaking enterprise policies or defrauding the company, (3) transaction integrity monitoring should provide the benefits of rigorous financial controls without the administrative overhead and bureaucratic burden, (4) even if compliance with policies is not 100% or employees learn to game the system, risk managers should have a solution that keeps pace with real-time business transactions, and (5) an acceptable transaction integrity monitoring system should act as the ultimate layer of security from outsiders who penetrate the network as authorized users.

As will be described and explained in detail below, the present inventors have constructed various systems and methods that meet these and other requirements for an efficient, effective, robust, and comprehensive automated electronic transaction integrity monitoring.

SUMMARY OF THE INVENTION

Briefly described, and according to one aspect, the present invention relates to a knowledge base for use in connection with a policy compliance monitoring system operative to determine exceptions to policies expressed by computer-executable policy statements. The invention is particularly suitable for use in an automated electronic transaction integrity monitoring system that allows establishment, codification, and maintenance of enterprise policies, monitors electronic transactions of the enterprise from various and possibly heterogeneous data sources, detects exceptions to established policies, reports such exceptions to authorized users such as managers and auditors, and/or provides a case management system for tracking such exceptions and their underlying transactions.

More particularly described, a knowledge base constructed in accordance with this aspect of the invention comprises a plurality of extractor files that are utilized by one or more data extractors coupled for data communications with one or more data sources for extracting information for utilization in policy compliance monitoring. The knowledge base further comprises a plurality of normalizing files for access and utilization by a mapper operative for normalizing data from the one or more data sources against a system ontology and storing normalized data in a monitoring database. The knowledge base further comprises a plurality of computer-executable compliance policy statements for use by a transaction analysis engine. The policy statements represent one or more predetermined policies of the enterprise that apply to data stored in the monitoring database.

In one embodiment, each of plurality of extractor files includes information identifying a data source containing information for utilization in the policy compliance monitoring system, access protocols for the data source, and predetermined tables and columns of tables of the data source. An extractor file is provided for one or more of the following types of extractors: master extractor, resync extractor, log extractor, programmatic extractor, external data source extractor, and information technology (IT) environment extractor.

In one embodiment, the normalizing files of the knowledge base include an ontology file. The ontology file contains information identifying an entity that is subject to testing for policy compliance by a compliance policy statement, in a format corresponding to expressions contained in the compliance policy statement. The ontology file may also contain linkages identifying other entities related to one of the entities expressed in the ontology.

In another embodiment, a normalizing file includes information required to add metadata to data obtained from a data source. The metadata comprises revision information that allows comparison of different versions of an entity over a period of time, and/or actor information. In yet another embodiment, the normalizing files may include a mapping file. The mapping file identifies specific tables and column in a schema of a data source, and corresponding specific tables and columns in a schema of the monitoring database.

In one embodiment, the compliance policy statements comprise logical expressions for evaluating data stored in the monitoring database against predetermined requirements, and indicators that represent the resolution of a logical expression. The indicators comprise an exception that signals possible lack of compliance with a policy expressed by the compliance policy statement. The compliance policy statements may comprise one or more of the following types of policy statements: generic policy statements, industry specific policy statements, business process specific policy statements, ERP system specific policy statements, customer specific policy statements, division specific policy statements, and other expressions of a policy of the enterprise. In one embodiment, the compliance policy statements comprise XML frames, which are computer-executable.

In another embodiment, the knowledge base further comprises a user interface for allowing user access to and modification of the extractor files, the normalizing files, and the policy statements, for customization and configuration.

In another aspect, the present invention relates to a method for maintaining a knowledge base for use in connection with a policy compliance monitoring system operative to determine exceptions to policies expressed by computer-executable policy statements. The method includes the step of providing a plurality of extractor files that are utilized by one or more data extractors coupled for data communications with one or more data sources for extracting information for utilization in policy compliance monitoring. The method further includes the step of providing a plurality of normalizing files for access and utilization by a mapper operative for normalizing data from the one or more data sources against a system ontology and storing normalized data in a monitoring database. The method further comprises the step of providing a plurality of computer-executable compliance policy statements for use by a transactions analysis engine. The policy statements represent one or more predetermined policies of the enterprise that apply to the data stored in the monitoring database.

In one embodiment, each of the plurality of extractor files includes information identifying a data source containing information for utilization in the policy compliance monitoring system, access protocols for the data source, and predetermined tables and columns of tables of the data source. An extractor file is provided for one or more of the following types of extractors: master extractor, resync extractor, log extractor, programmatic extractor, external data source extractor, and information technology (IT) environment extractor.

In another embodiment, the normalizing files comprise an ontology file which contains information identifying an entity that is subject to testing for policy compliance by a compliance policy statement, in a format corresponding to expressions contained in the compliance policy statement. The ontology file may also contain linkages identifying other entities related to one of the entities expressed in the ontology.

In one embodiment, the normalizing file includes information required to add metadata to data obtained from a data source. The metadata includes revision information that allows comparison of different versions of an entity over a period of time. The metadata may also include actor information. In another embodiment, the normalizing files comprise a mapping file that identifies specific tables and column in a schema of a data source, and corresponding specific tables and columns in a schema of the monitoring database.

In one embodiment, the compliance policy statements comprise logical expressions for evaluating data stored in the monitoring database against predetermined requirements, and indicators that represent the resolution of a logical expression. The indicators comprise an exception that signals possible lack of compliance with a policy expressed by the compliance policy statement. The policy statements may comprise one or more of the following types of policy statements: generic policy statements, industry specific policy statements, business process specific policy statements, ERP system specific policy statements, customer specific policy statements, division specific policy statements, and other expressions of a policy of an enterprise. In one embodiment, the compliance policy statements are expressed in XML frames, which are computer-executable.

In another embodiment, the method further comprises the step of providing a user interface for allowing user access to and modification of the extractor files, the normalizing files, and the policy statements, for customization and configuration.

In yet another aspect, the present invention relates to a policy statement executable by a computer-based analysis engine operative for determining a possible lack of compliance of electronic transaction data with a predetermined policy expressed by the statement, the electronic transaction data stored in a database accessed by the analysis engine. The policy statement comprises information identifying at least one entity in the database, the entity comprising data items corresponding to the electronic transaction expressed in a predetermined ontology. The policy statement further comprises at least one indicator comprising computer-executable logical statements expressed in terms of the ontology that resolves to an exception in response to a predetermined condition. The policy statement further comprises information specifying a view of information resulting from execution of the statement for provision to an external system.

In one embodiment, the policy statement is expressed as an XML data structure, the database is a monitoring database, and the data in the monitoring database is extracted from one or more data sources. The data sources may include ERP systems, enterprise application systems, external data sources, and information technology (IT) infrastructure data. In another embodiment, the electronic transaction data is obtained from one or more data sources and mapped into a schema corresponding to the ontology and mapping information. In one embodiment, at least one entity is a transactional entity. In another embodiment, at least one entity is a support entity.

In one embodiment, the indicator utilizes additional information together with entity information in resolving to an exception. The exception is provided to an external system for user disposition.

In another embodiment, an indicator provides a confidence level associated with the exception. The confidence levels of a plurality of indicators are combined statistically to obtain a single composite confidence level. In yet another embodiment, the predetermined condition of the indicator occurs when the confidence level exceeds a predetermined threshold value.

In one embodiment, the policy statement further comprises logical statements for computing a priority associated with an exception based on confidence and impact. A logical statement may provide for computing a wariness associated with an entity involved in an exception. The computed wariness is provided as an output. The wariness is computed by combining the confidence levels of one or more exceptions as probabilities, incrementally, as one or more exceptions are resolved, thereby providing updated values for wariness for particular entities over time and as a result of multiple exceptions. In one embodiment, at least one indicator provides an expected impact expression. The expected impact comprises a product of the confidence level and potential impact.

In one embodiment, the policy statement further comprises information that determines whether the policy statement should execute by the analysis engine. In another embodiment, the policy statement further comprises information that identifies at least one system with which the policy statement is effective. In yet another embodiment, the information of the policy statement specifying a view of information resulting from execution of the statement for provision to an external system comprises information relating to an entity involved in the statement. Further, the information specifying a view may also include information relating to the exception.

In yet another aspect, the present invention relates to method for determining a possible lack of compliance of electronic transaction data with a predetermined policy. The method comprises the step of providing a policy statement executable by a computer-based analysis engine operative to access a database that stores the electronic transaction data. The policy statement comprises information identifying at least one entity in the database, the entity comprising data items corresponding to an electronic transaction expressed in a predetermined ontology. The policy statement also comprises at least one indicator comprising computer-executable logical statements expressed in terms of the ontology that resolves to an exception in response to predetermined conditions. The policy statement also comprises information specifying a view of information resulting from execution of the statement for provision to an external system. The method further comprises the step of executing the policy statement by the analysis engine.

In an embodiment of the method, the policy statement is expressed as an XML data structure. In one embodiment, the database is a monitoring database and the data in the monitoring database is extracted from one or more data sources. The one or more data sources may include ERP systems, enterprise application systems, external data sources, and information technology (IT) infrastructure data. In another embodiment, the electronic transaction data is obtained from one or more data sources and mapped into a schema corresponding to the ontology and mapping information. In one embodiment, at least one entity is a transactional entity. In another embodiment, at least one entity is a support entity.

In one embodiment, at least one indicator utilizes additional information together with entity information in resolving to an exception. The exception is provided to an external system for user disposition. In another embodiment, at least one indicator provides a confidence level associated with the exception. The confidence levels of a plurality of indicators are combined statistically to obtain a single composite confidence level. The predetermined condition is the confidence level exceeding a predetermined threshold value.

In yet another embodiment, the method further comprises logical statements for computing a priority associated with an exception based on confidence and impact. A logical statement may provide for computing a wariness associated with an entity involved in an exception; the computed wariness is provided as an output. The wariness is computed by combining the confidence levels of one or more exceptions as probabilities, incrementally, as one or more exceptions are resolved, thereby providing updated values for wariness for particular entities over time and as a result of multiple exceptions.

In one embodiment, at least one indicator provides an expected impact expression. The expected impact comprises a product of the confidence level and potential impact.

In another embodiment, the policy statement further comprises information that determines whether the policy statement should execute by the analysis engine, and/or information that identifies at least one system with which the policy statement is effective. In yet another embodiment, the information specifying a view of information resulting from execution of the statement for provision to an external system comprises information relating to an entity involved in the statement, and/or information relating to the exception.

From the foregoing claimed aspects of the inventions, it will be appreciated that use of the invention can reduce the cost of compliance with regulatory, contractual, and business process compliance, including ongoing Sarbanes-Oxley compliance, by continuously monitoring key controls including that required for Section 404 certification by auditors. Use of systems and methods constructed in accordance with the invention addresses the tangible costs of controls testing and remediation along with the opportunity costs associated with the internal distractions of compliance. Use of the present invention catches errors, fraud and internal control issues early in the transaction process so that corrections can be made before time is wasted duplicating and reversing work, before money is lost, and before controls are deemed deficient. By identifying the root causes of control violations and errors in real time, the present invention allows an enterprise to improve the quality of its earnings, ensure accountability, enhance business processes, and remediate any weaknesses for regulatory compliance.

To meet the heightened concerns about inside threats from systems-based fraud, misuse, and errors, the present inventors pioneered the concept and technologies of automated transaction integrity monitoring ("TIM"), according to systems and methods of the present invention. Unlike existing perimeter security solutions or access control systems, systems constructed in accordance with aspects of the inventions identify transactions where authorized users perform suspicious or otherwise noncompliant transactions within business systems. A TIM system according to the invention(s) analyzes transactions across multiple business applications to detects, prevents, and deters financial loss from systems-based fraud, misuse, and errors.

Embodiments of the present invention combine advanced data acquisition, data analytics, case management, and evidentiary analysis functionality. The disclosed systems and methods collect data across multiple platforms (including IT infrastructure as well as external data sources such as publicly accessible databases), and perform multi-perspective analysis to identify fraud, misuse, and errors. The system is capable of detecting problem transactions in several ways, including the use of multiple indicators of problems, linkage to related entities, tracking ongoing exceptions to policies that have not been resolved, and helping identify patterns that are associated with errors, misuse, and fraud. The system then generates high-impact reports, provides integrated case management, and enables evidentiary analysis.

The benefits of such transaction integrity monitoring are clear. First, such transaction monitoring establishes a business environment that deters employees and other insiders from committing business hacks. Transaction integrity monitoring provides the benefits of rigorous internal controls without the overhead. Even if procedural rules are not 100 percent maintained or employees learn to game the system, risk managers will be satisfied with a solution that keeps pace with real-time business transactions. Finally, transaction integrity monitoring acts as the ultimate layer of security from outsiders who penetrate the network as authorized users.

The data extraction methodologies utilized in aspects of the inventions employ multi-pass and multi-system query technologies. The system collects data across multiple platforms to correlate information from ERP systems, legacy mainframe applications, network monitoring solutions, and external data sources as relevant to many different types of enterprise applications, such as (but not limited to) accounts payable, accounts receivable, general ledger, human resources and payroll, customer relationship management (CRM), inventory management, email, electronic document storage and retention, and contracts management.

A system constructed in accordance with aspects of the invention also provides end-to-end case management and advanced investigative link analysis for high quality cases with irrefutable evidence. The case management system supports the collection and management of case-specific exceptions, clues, interviews, e-mails, and reports, in a secure work area to which only authorized users and/or administrators have access. This secure work area greatly increases an investigator's ability to quickly and thoroughly resolve multiple cases without sacrificing the legally required integrity of the process.

The advanced evidentiary analysis tools significantly reduce the investigative and forensics analysis workload. Complex link analysis of the case related subjects, systems, and accounts takes a fraction of the time associated with manual research and analysis methods. Furthermore, use of the system can assist in the recovery of lost assets.

Preferably, systems constructed in accordance with the inventions are designed with security as an essential element of a hardened appliance. The cases management system provides a digitally secure and trusted "evidence locker" that stores transaction records, the reasoning behind evaluations and activities associated with the investigation process. Other security features provided in embodiments of the invention include (1) encryption and authentication of communication channels, (2) out-of-band configuration options to block its visibility on a network, (3) a hardened operating system, and (4) support for authenticated external/supplemental queries into enterprise business systems and queries to external data sources.

More particularly described, the claimed invention(s) are particularly useful in connection with methods and systems for the continuous monitoring of data corresponding to transactions that are computerized or that have related data recorded or processed on a computer, a system of computers, or a computer network. Data traffic from multiple and possibly heterogeneous sources is continuously and repeatedly monitored for policy exceptions that may be clues indicating attention or investigation is in order with regard to particular transactions. Clues are potentially indicative of errors and omissions promulgated by mere operator mistakes, system malfunctions, or computer software failures. Furthermore, clues are potentially indicative of misuses and intentional or unintentional failures in compliance with policies. In the worst circumstances, clues are indicative of fraudulent activities.

In one aspect, the invention provides powerful data collection functionalities and abstracts information about transactions to a human user. The disclosed system provides automated data collection capabilities for seamless collaboration between automated and human selected searches. Heterogeneous data sources are utilized and correlation pre-processing sorts multi-level likelihoods of problem detection to alert a human operator or trigger pre-selected actions such as the assembling of detected events into case folders.

In another aspect, the invention provides data analysis capabilities using incremental evidence gathering and heuristic and collaborative reasoning. Automated monitoring techniques include enterprise policy rule sets to continuously monitor a data source and periodically or occasionally query a database for patterns indicative of non-compliant behavior or fraud schemes.

In another aspect, the invention provides case management tools such as user interface controls to empower an investigator with regard to directed queries and to provide implementation control with regard to automated searches.

In another aspect, the invention provides compliance monitoring to provide for synchronization between enterprise policies and operational activities. Process errors and inefficiencies are detected and tracked through human-managed automated monitoring and problem-pattern recognition.

In another aspect, audit compliance is ensured with internal controls that results in reduced asset loss, increased operational effectiveness, and increased corporate and shareholder confidence. Corporate governance is enhanced while addressing regulatory requirements related to Sarbanes-Oxley. Performance indices such as cumulated impact are determined and reported continuously or periodically.

A further aspect of the present invention solves a need in today's security marketplace by providing continuous controls monitoring of 100% of business transactions and also provides a solution for management to determine that internal controls are operating effectively. Data is acquired in near real time and analyzed optionally in an independent system to assure the integrity of the data.

Another aspect of the invention provides methods and systems for a collaborative reasoning engine (CORE). The CORE is coupled to a knowledge base that stores computer-executable policy statements in the form of XML frames. These statements or frames are provided in sets, with an initial set of base frames that addresses many common enterprise compliance policy scenarios. The base frames can be customized or supplemented with custom frames to address the specific compliance needs of the particular enterprise. Because the frames are expressed in the readily-understandable and modifiable XML, the system is robust, flexible, and permits ready and rapid adaptation to new compliance situations.

The CORE is operative to apply a set of policy-expressing frames to determine whether or not a particular transaction is deemed policy noncompliant. Through a combination of multi-system query and link-analysis techniques, a determination is made regarding likelihood of whether an event is indicative of fraud, errors, or misuse. Acts of concealment and conversion that are designed to circumvent standard auditing techniques are detected.

A further aspect of the present invention provides rapid continuous automated overview of internal activity across critical business functions. A variety of automated cross-platform data monitoring and collection techniques are utilized and complimented by a hybrid of analytic support modules to audit activity within business applications and to detect inappropriate and suspicious insider threat activity. Various categories of "business-hacker" activities are addressed in real-time. Non-compliant business activities recognized include but are not limited to fraud and theft, misuse and abuse, errors and omissions, and inappropriate system and control overrides.

Yet another aspect of the present invention provides measures of compliance of business transactions with company internal controls. Corporate governance scorecards and reports are generated. When transactions are detected as out of compliance, multi-level or iterative querying determines whether these transactions are errors, overrides, or activities that require further investigation. Process efficiency, revenue recognition and enhancement toward the ability to meet Sarbanes-Oxley requirements and any level of external or internal auditing requirements are provided.

From the foregoing, those skilled in the art will understand and appreciate that, with its transaction integrity monitoring, exception detection, analysis engine, and case management aspects, a system constructed in accordance with aspects of the inventions identifies fraud, misuse, and errors that directly affect the bottom line of an enterprise or the operations of an organization. The disclosed system combines the benefits of a systems auditor, fraud examiner, forensics auditor, and an information security specialist that is on duty "24×7" to monitor the effectiveness of internal controls. With its advanced analysis engine, the disclosed system identifies systems-based fraud, misuse, and errors in veritable real time. Rather than relying on periodic audits that sample transaction data, the disclosed system's transaction integrity monitoring identifies a problem the moment it occurs and prevents a perpetrator from covering his or her tracks. By identifying errors, misuse, and abuse in veritable real time, the disclosed system minimizes financial loss by allowing an organization to quickly and decisively respond. In many cases, use of the system allows an enterprise to close a hole before it can be exploited. Finally, with transaction integrity monitoring, the disclosed system empowers enterprises to "trust but verify" its financial transactions. The system allows an enterprise's management team to establish a "tone at the top" regarding expectations of conduct within the organization.

These and other aspects, features, and benefits of the present invention(s) will become apparent from the following detailed written description of the preferred embodiments taken in conjunction with the following drawings, although variations and modifications therein may be affected without departing from the spirit and scope of the novel concepts of the disclosure.

BRIEF DESCRIPTION OF THE DRAWING FIGURES

Figure 3:
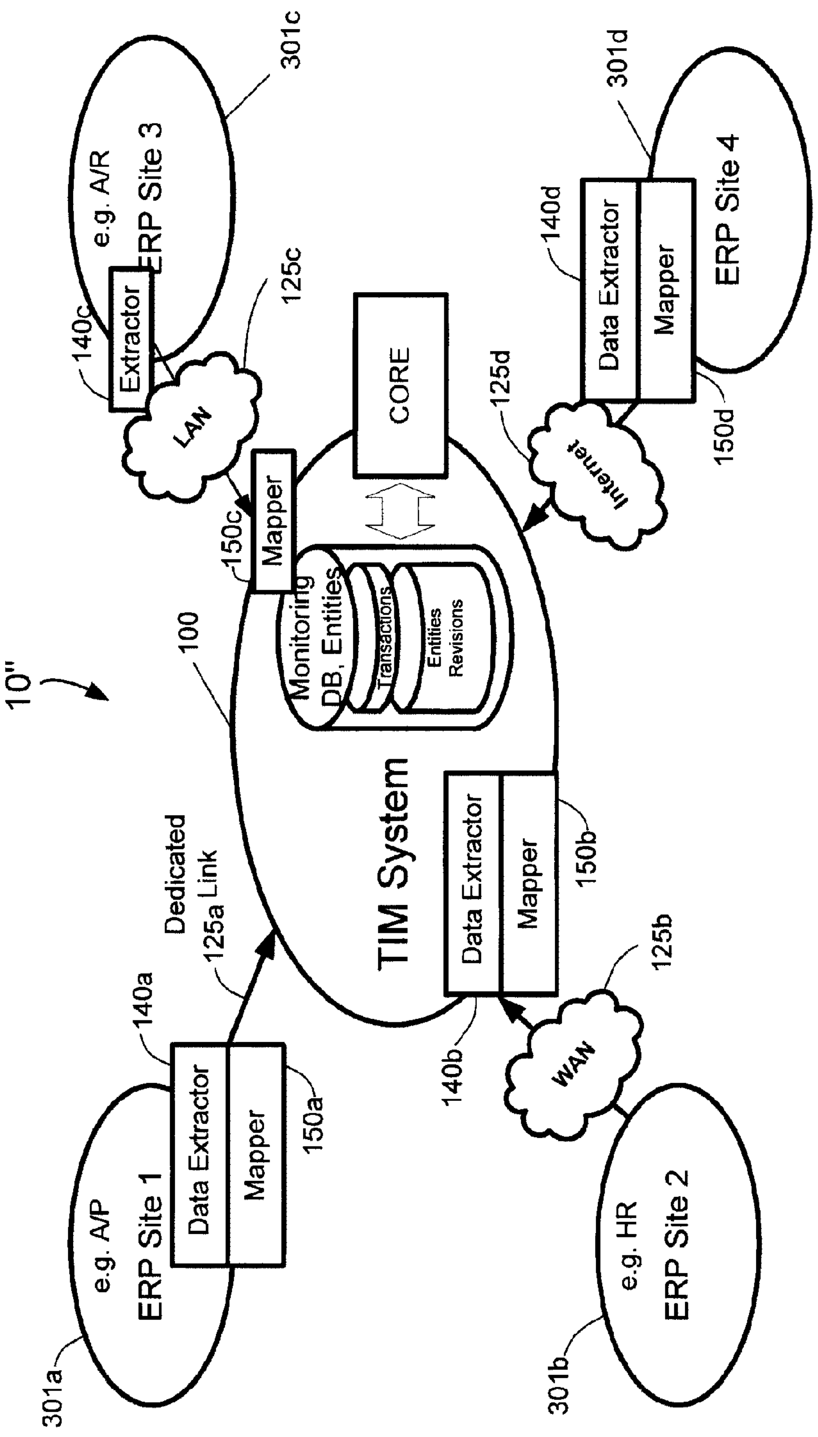

FIG. 3 schematically illustrates exemplary aspects of a distributed ERP system environment.

Figure 4:
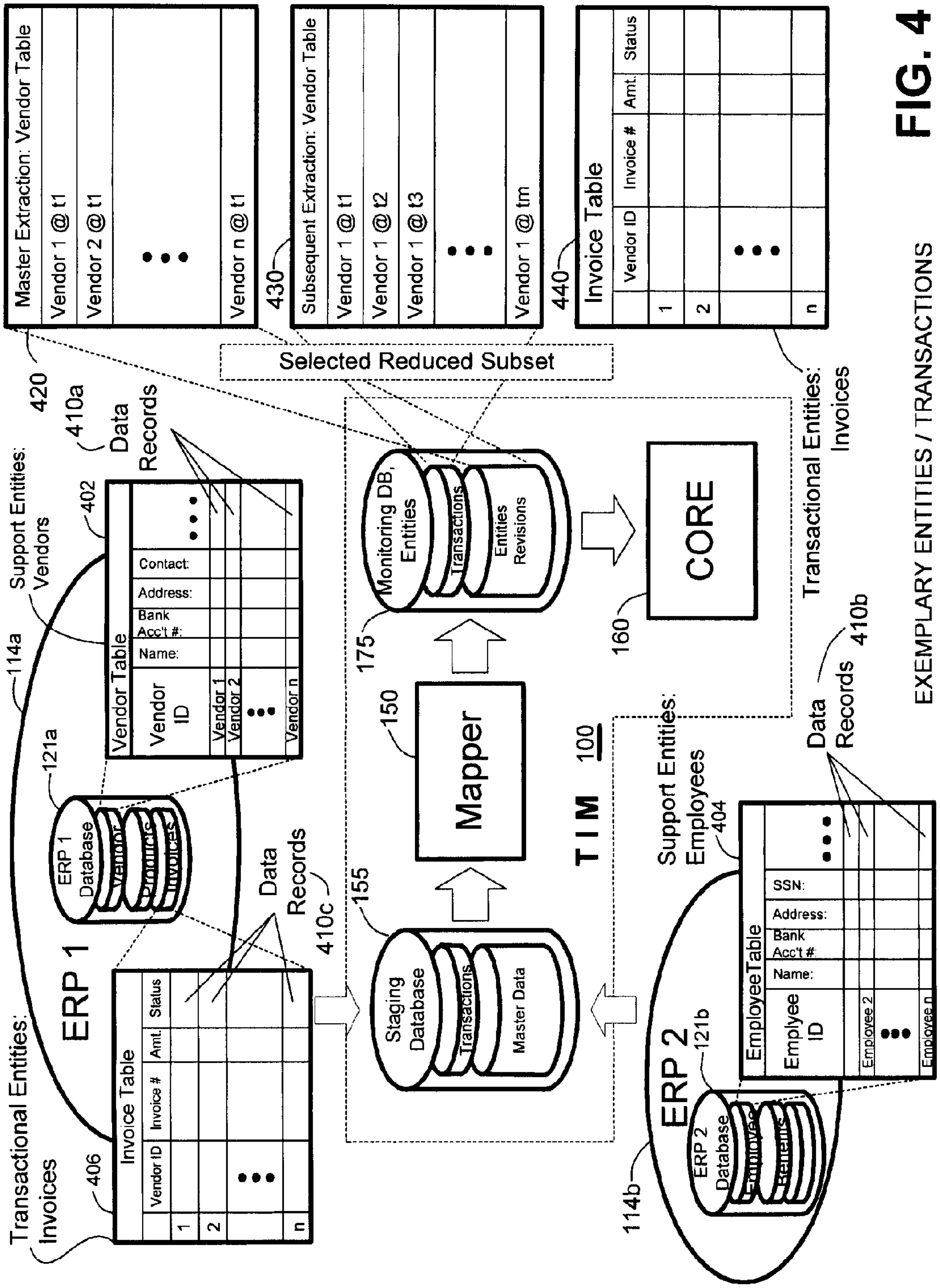

FIG. 4 illustrates exemplary heterogeneous databases storing information relating to business transactions and exemplary support and transactional entities.

Figure 5:
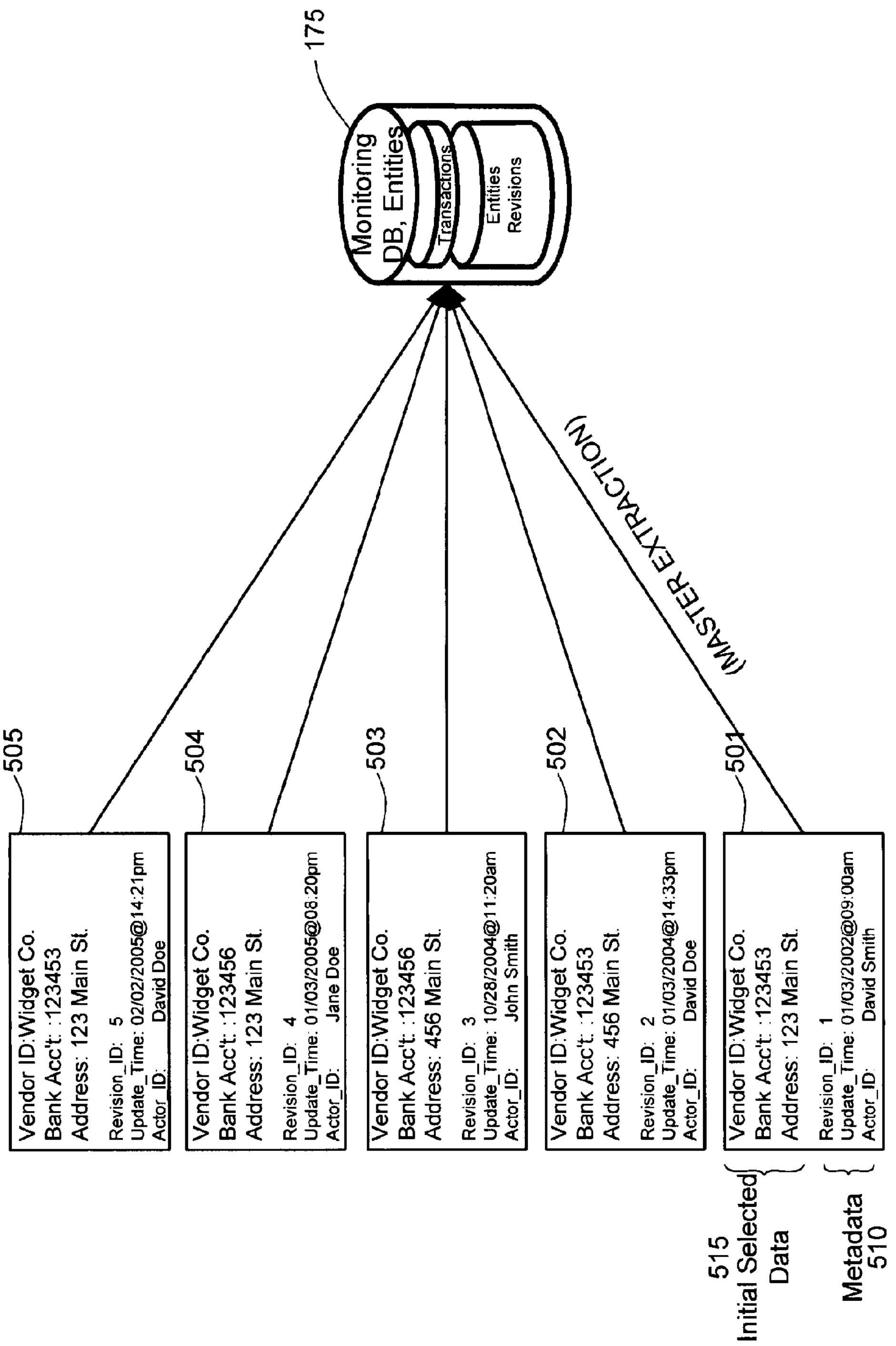

FIG. 5 illustrates changes to exemplary monitoring entities with metadata.

Figure 6:
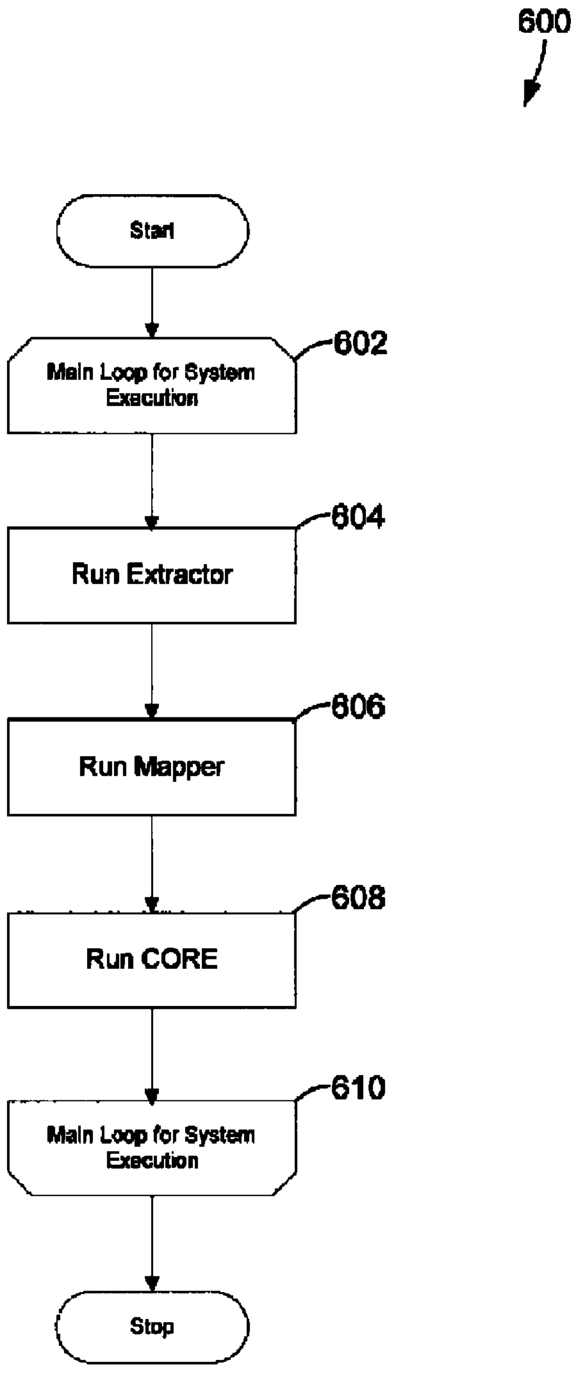

FIG. 6 is a flow chart of three major steps of TIM system: data extraction, mapping, running CORE.

FIG. 7 is a portion of exemplary code for TIM system configuration.

FIG. 8 is a portion of exemplary code for data extractor architecture.

FIG. 9 shows a portion of exemplary extractor file.

Figure 10:
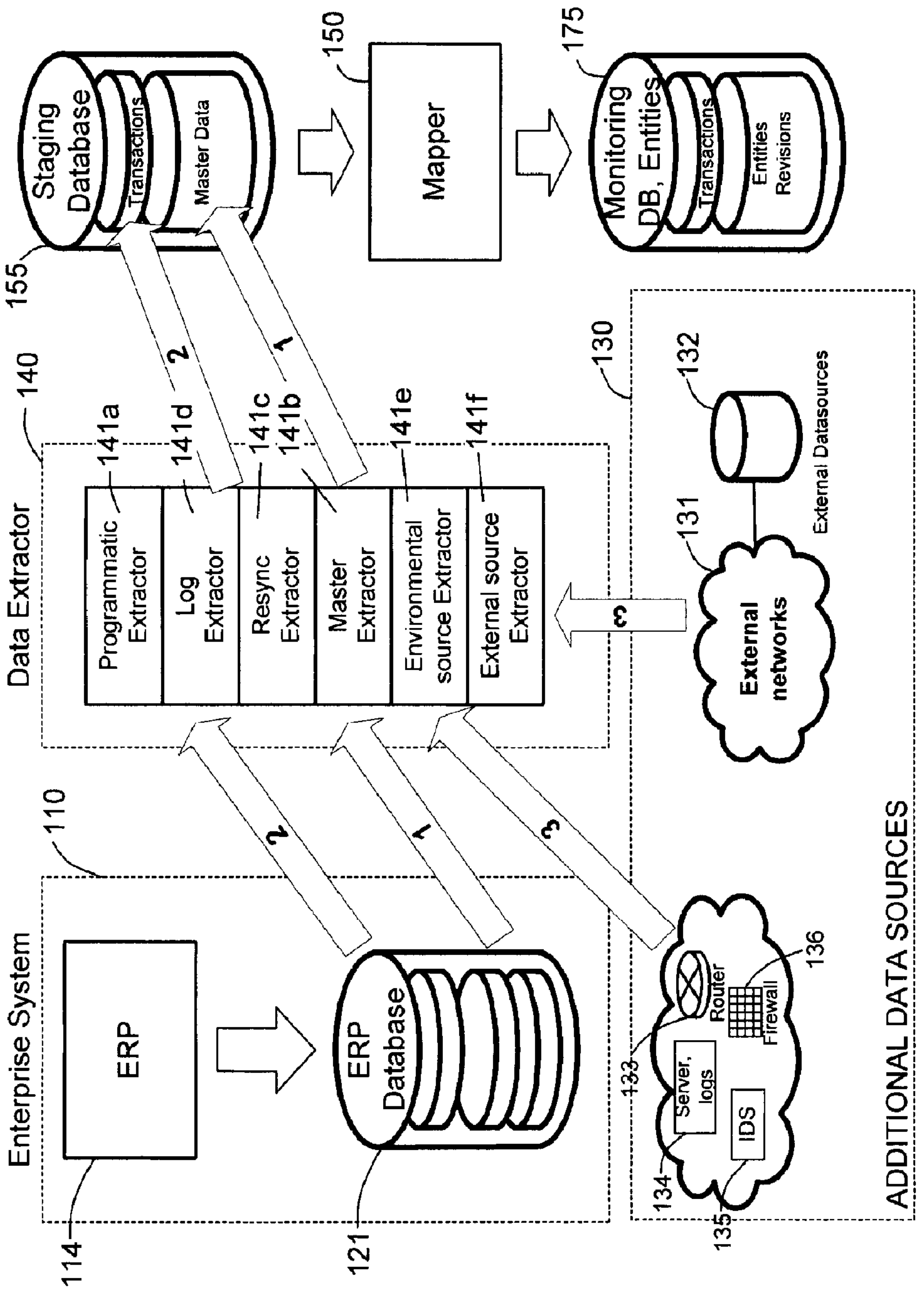

FIG. 10 is block diagram of multi-stage data extraction.

Figure 11:
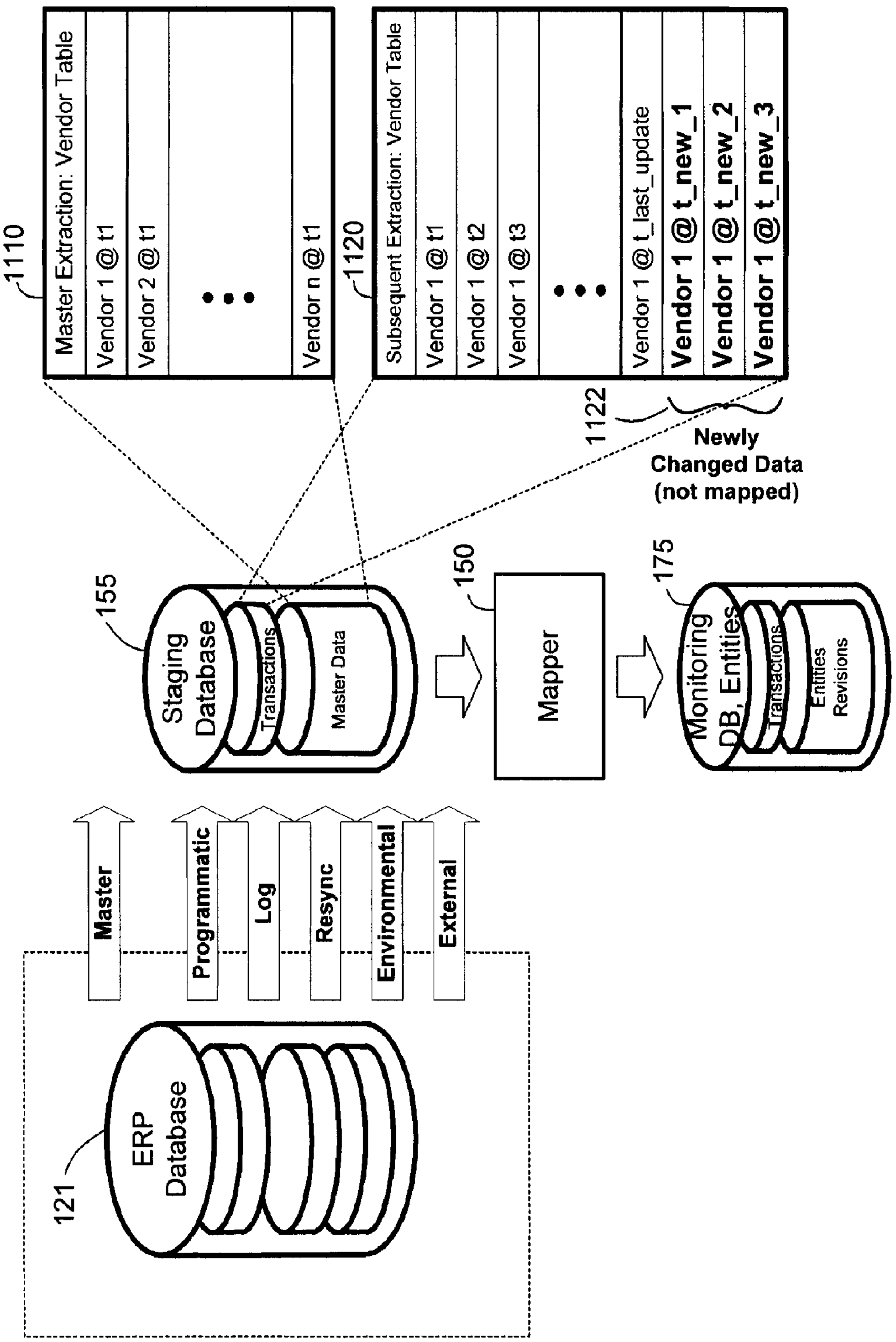

FIG. 11 illustrates how the TIM system identifies changes in a monitored database.

Figure 12:
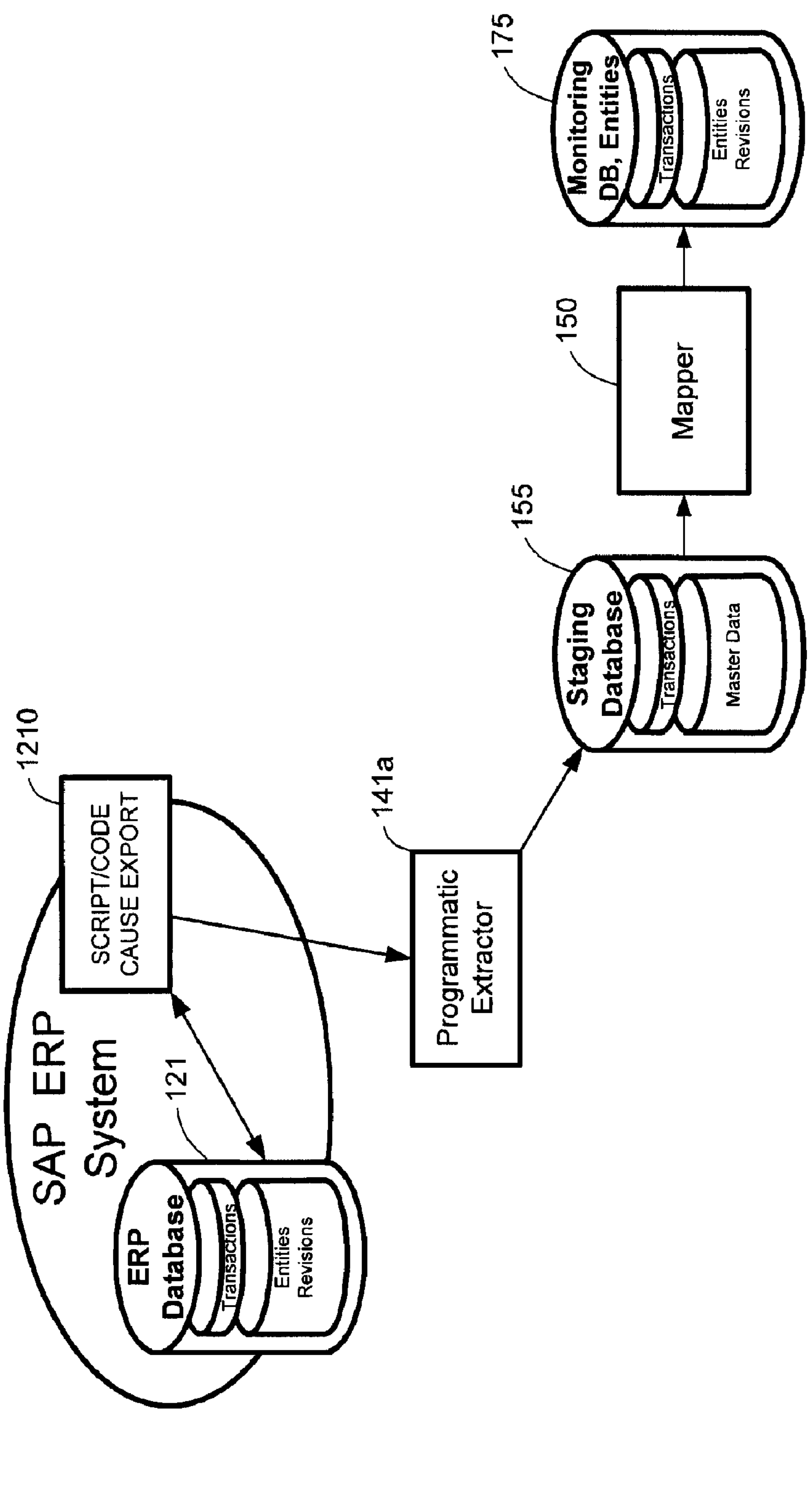

FIG. 12 shows an exemplary ERP system such as SAP where a programmatic extractor is employed.

FIG. 13 shows a portion of exemplary code for a programmatic extractor.

FIG. 14 shows a portion of exemplary code for a master extractor.

Figure 15:
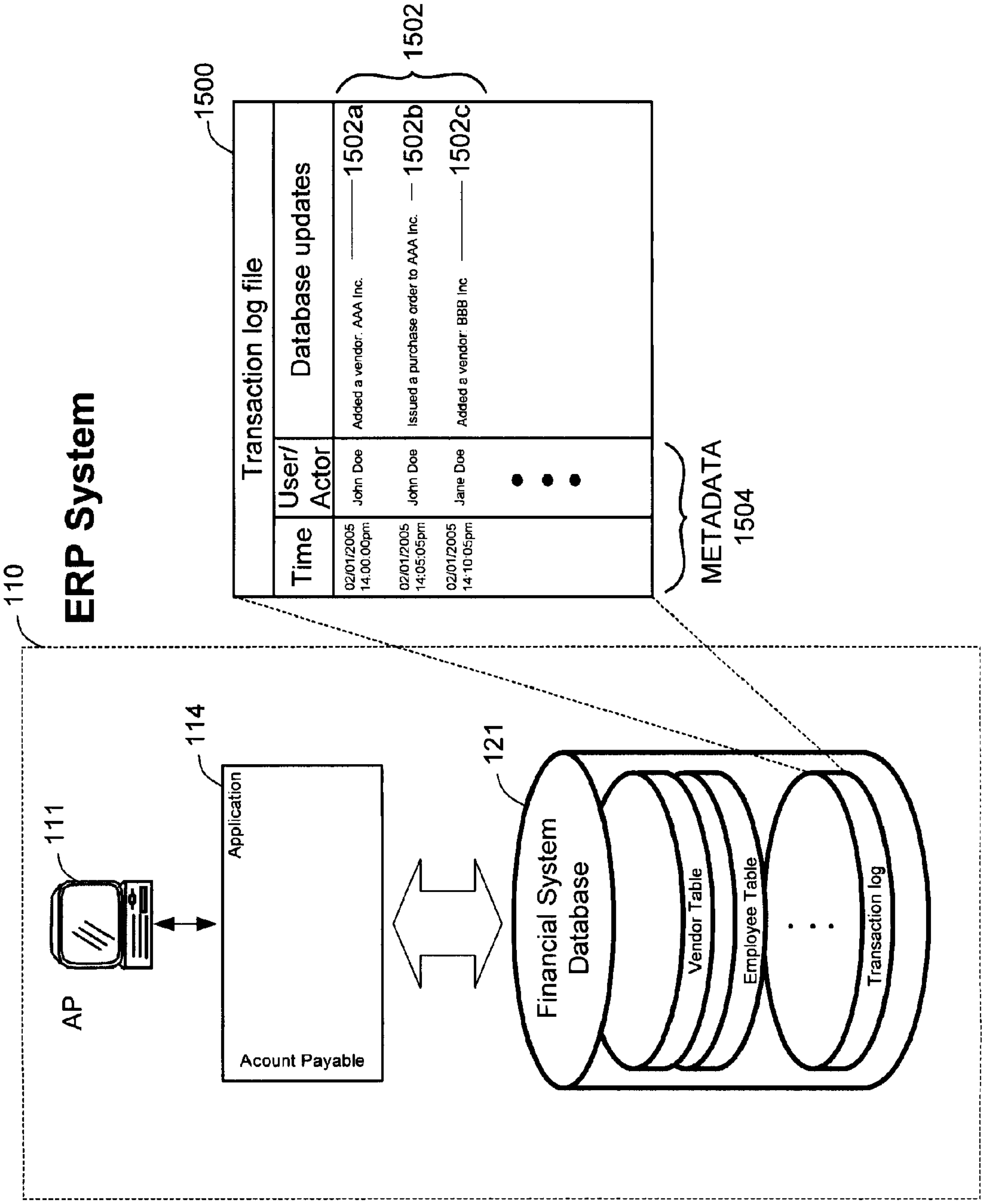

FIG. 15 shows a portion of exemplary code for a log extractor.

FIG. 16 illustrates an exemplary log file to provide information related to database updates.

FIG. 17 shows a portion of exemplary code for a resync extractor.

Figure 18:
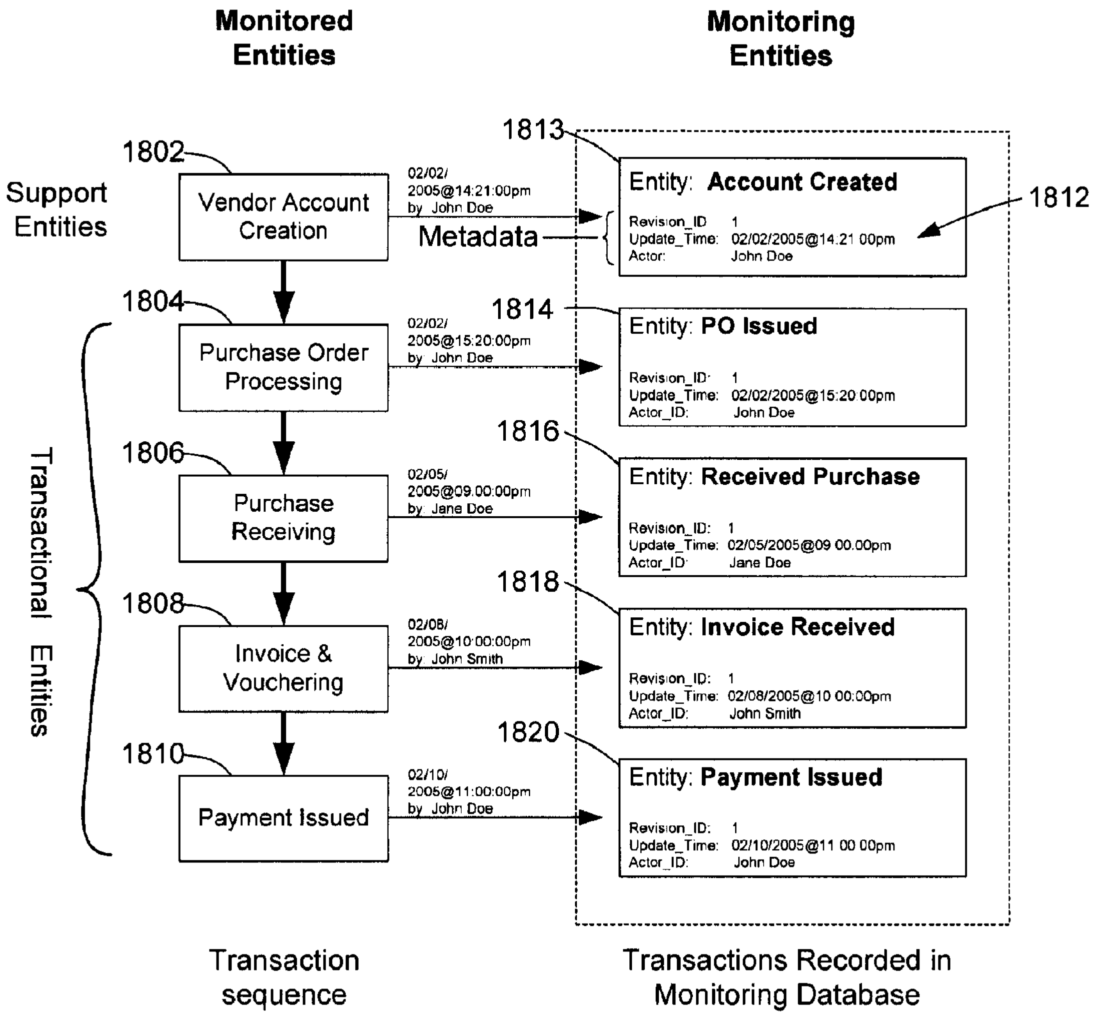

FIG. 18 shows an exemplary data extraction of a series of related business transactions comprising support and transactional entities.

FIG. 19 is a block diagram of an exemplary mapper.

FIG. 20 shows a portion of exemplary code for a mapper.

Figure 21:
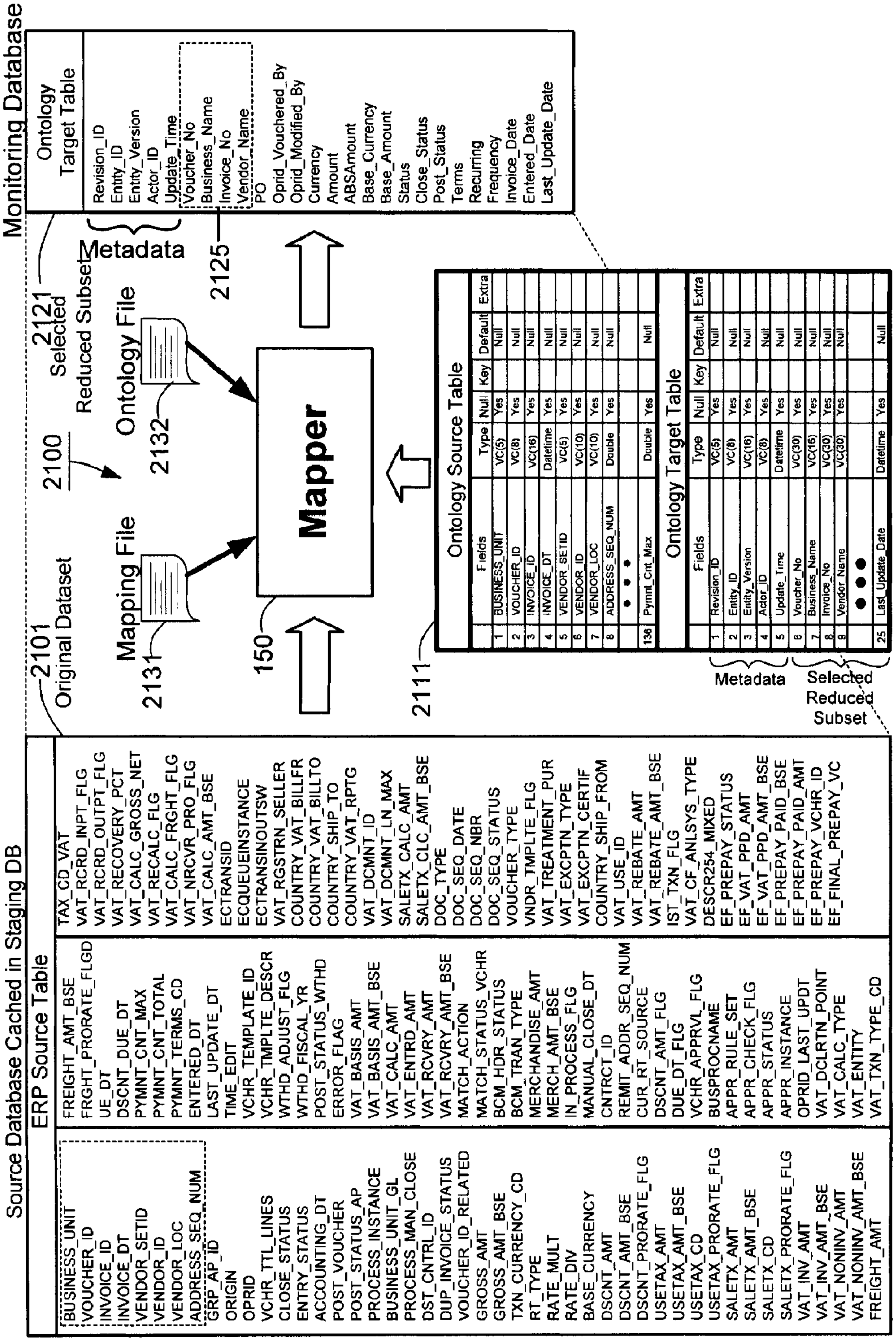

FIG. 21 illustrates a source table in a source ERP database mapped or normalized to a monitoring database target table with fewer fields and metadata.

FIG. 22 shows a portion of exemplary mapper mapping file.

FIG. 23 shows a portion of exemplary ontology file.

Figure 24:
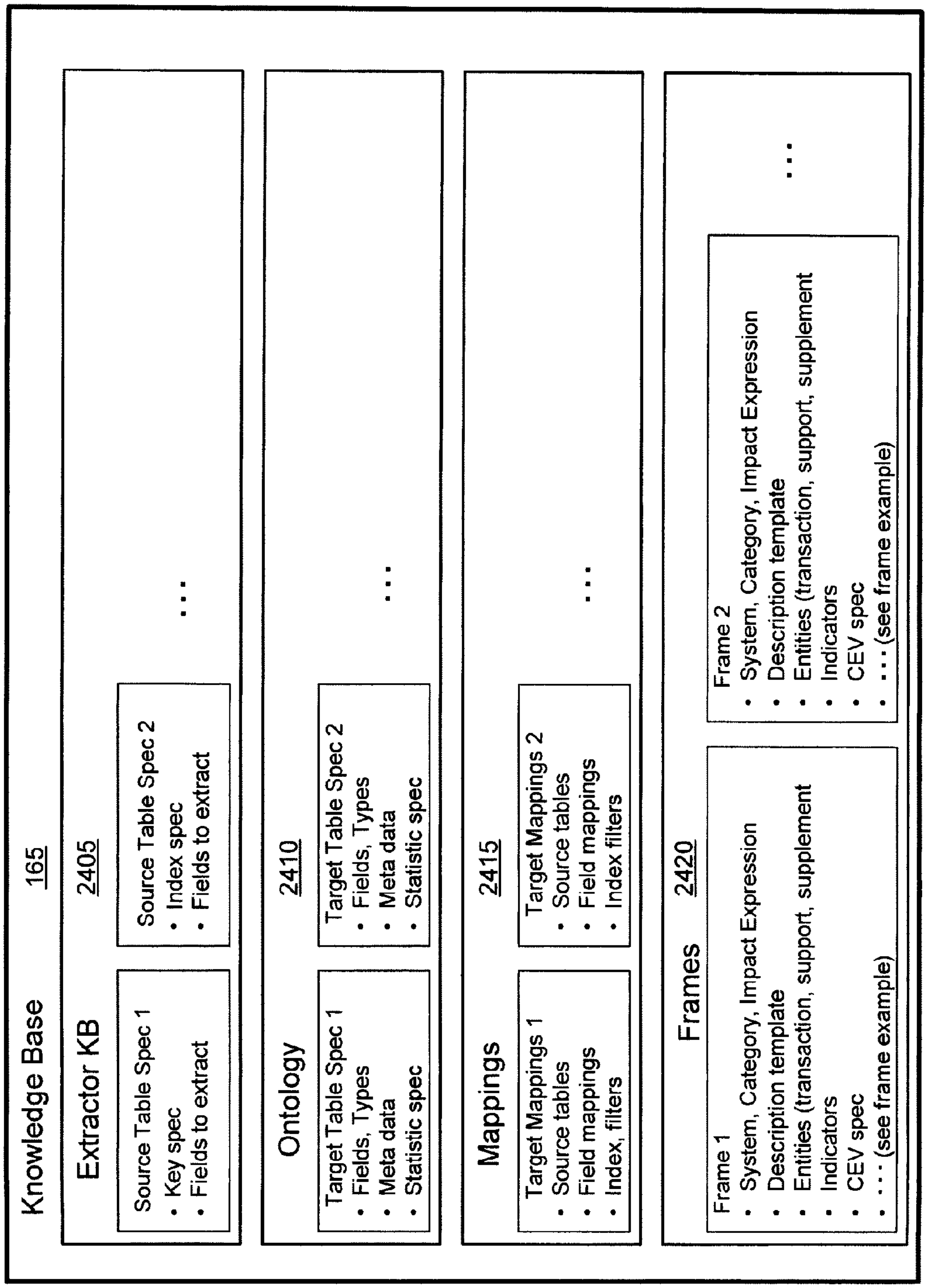

FIG. 24 is a block diagram of a knowledge base.

FIG. 25 shows a portion of exemplary code for CORE execution.

Figure 26:
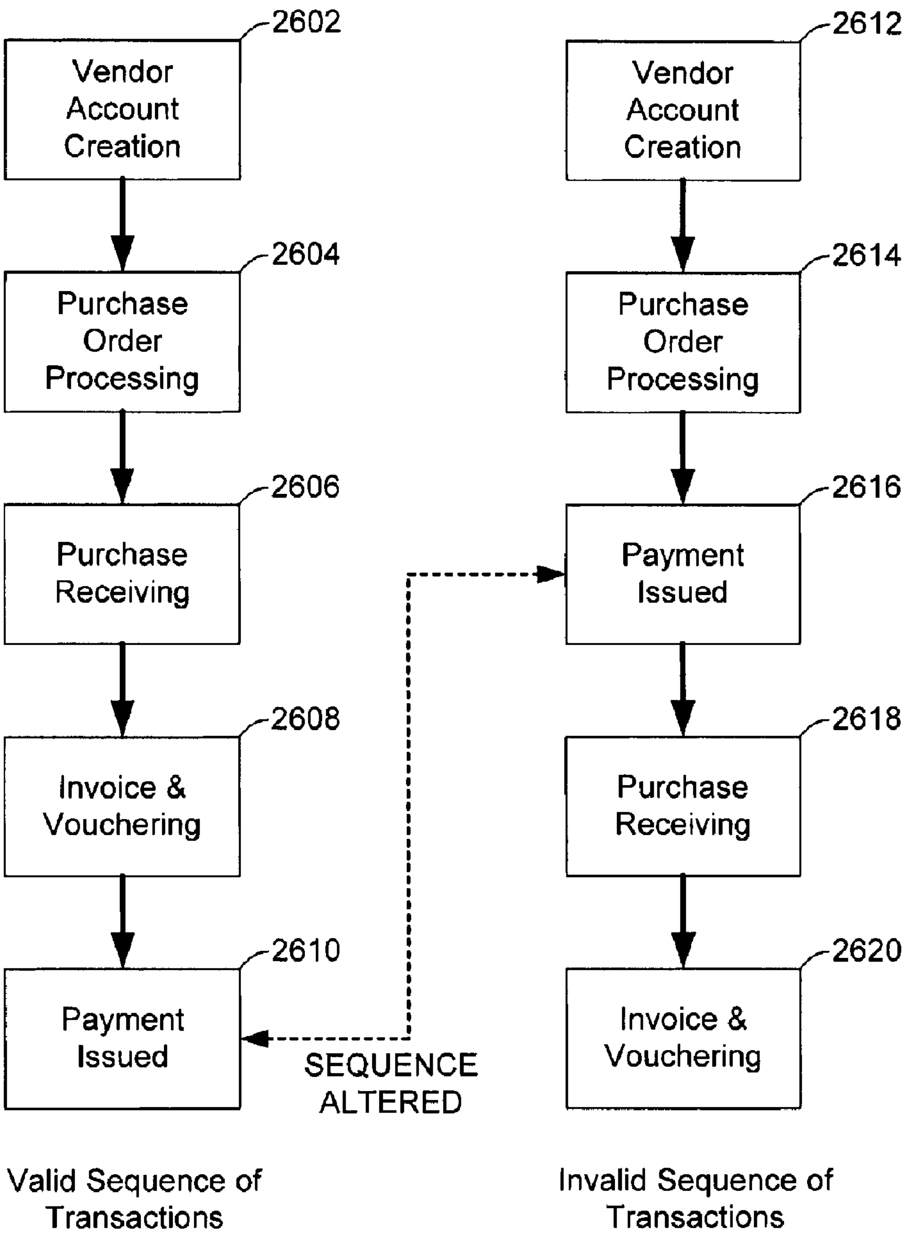

FIG. 26 illustrates an exemplary policy exception of an invalid business transaction sequence.

Figure 27:
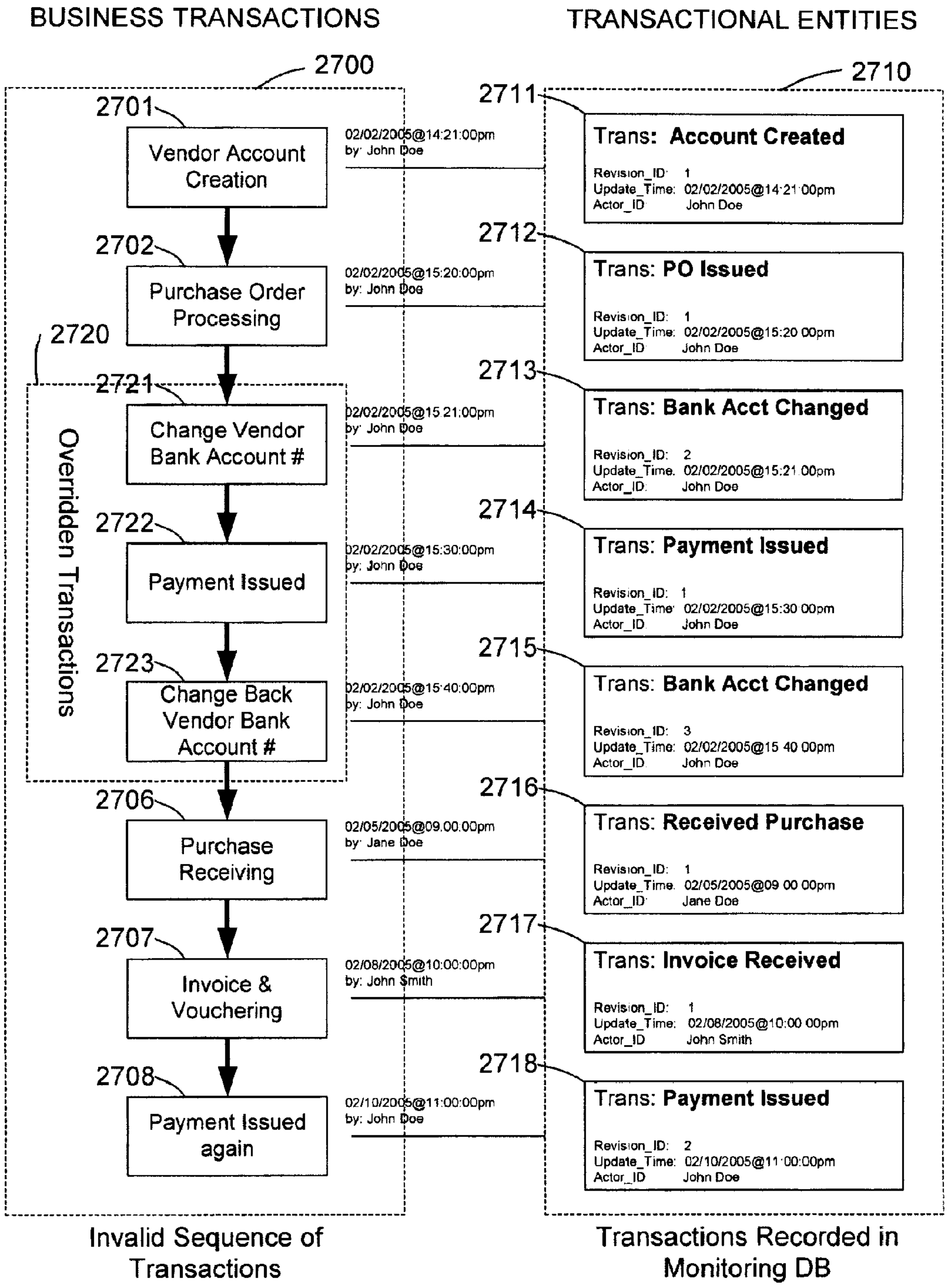

FIG. 27 illustrates another exemplary policy exception of overridden transactions and corresponding abbreviated exemplary transactions recorded in the monitoring database with metadata.

Figure 28:
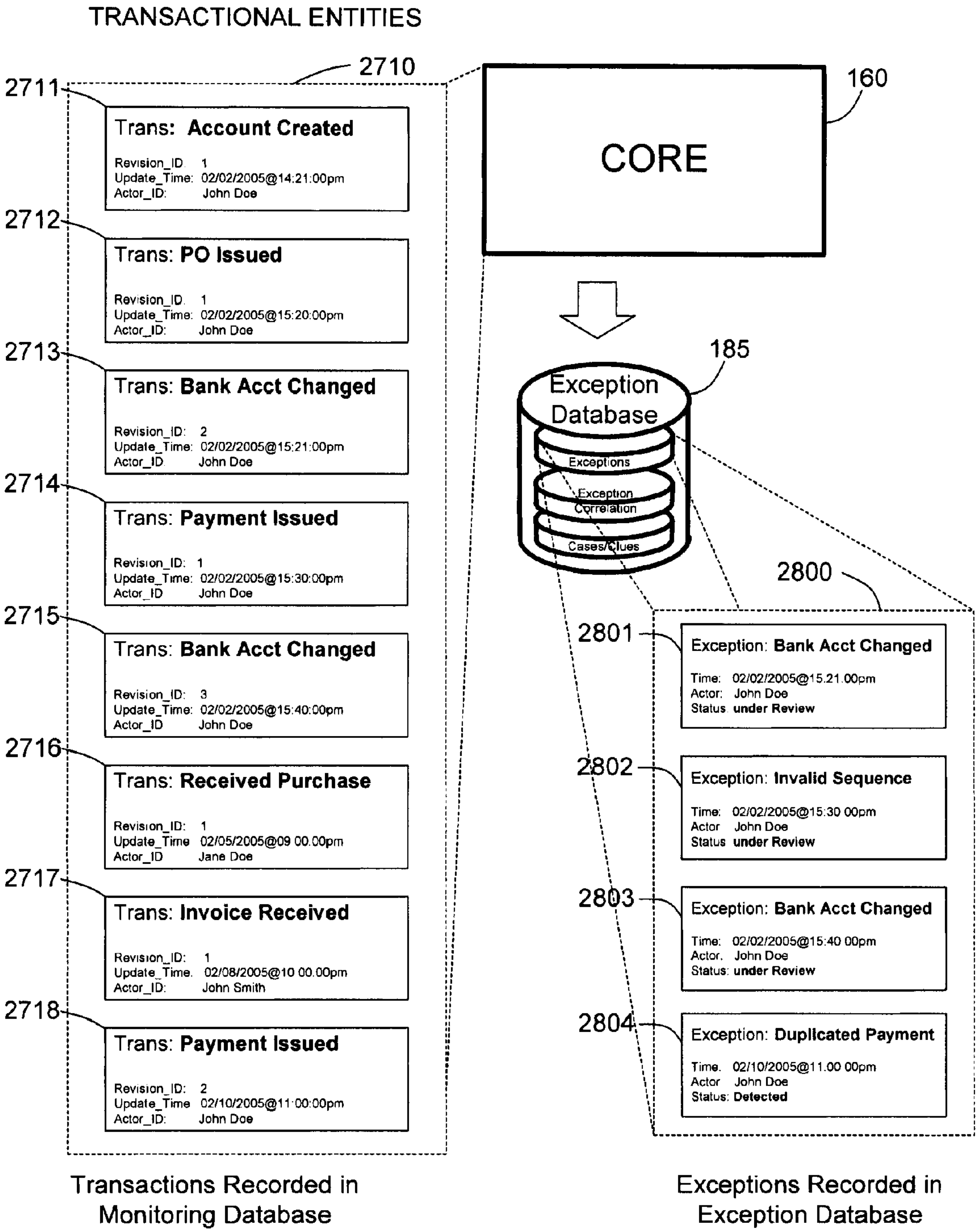

FIG. 28 illustrates exemplary policy exceptions created by a CORE process after transactions are examined.

FIG. 29 illustrates a frame/executable policy statement expressed in XML with corresponding indicator and other aspects.

Figure 30:
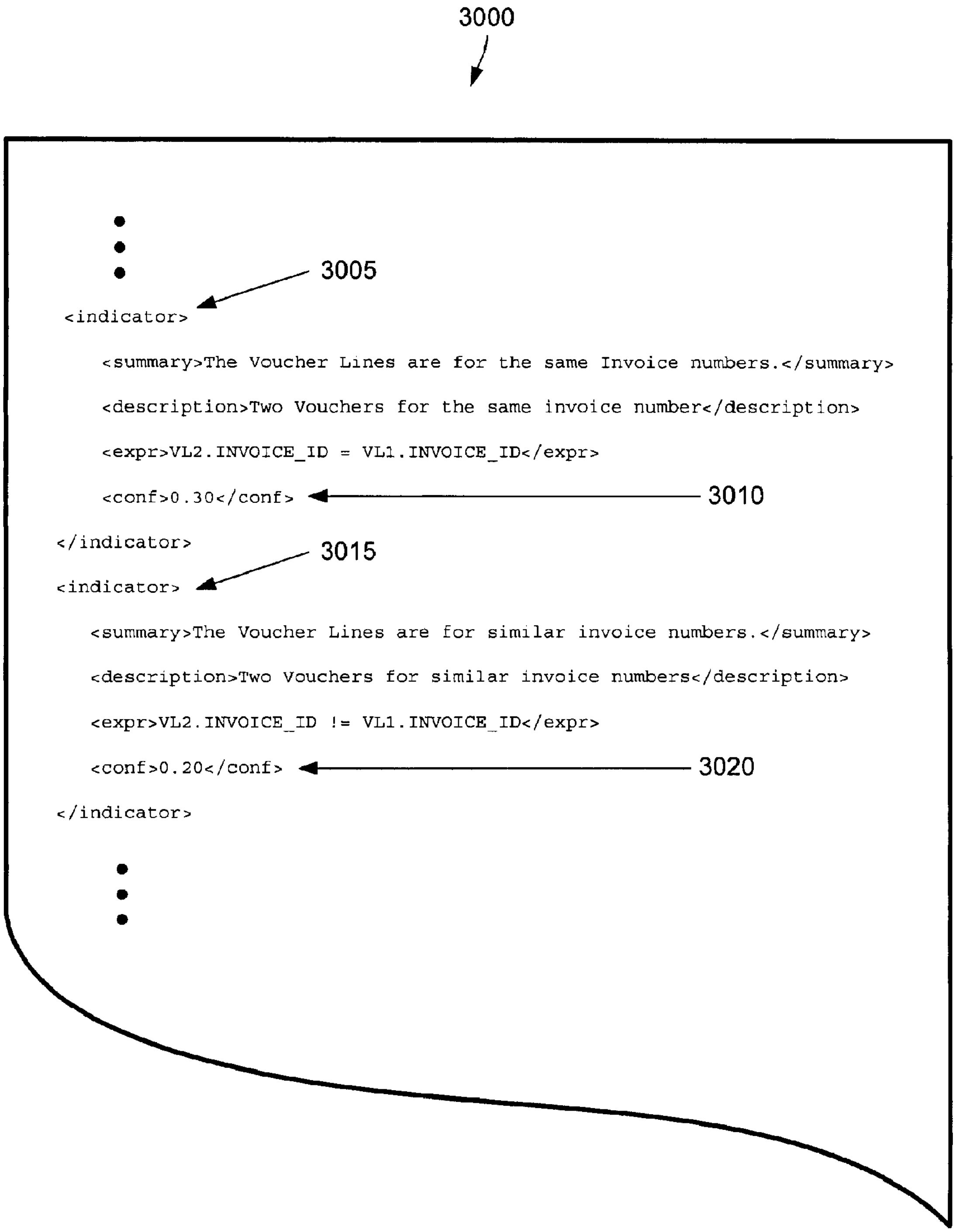

FIG. 30 shows an abbreviated frame with an expression to calculate confidence level associated with a corresponding indicator.

Figure 31:
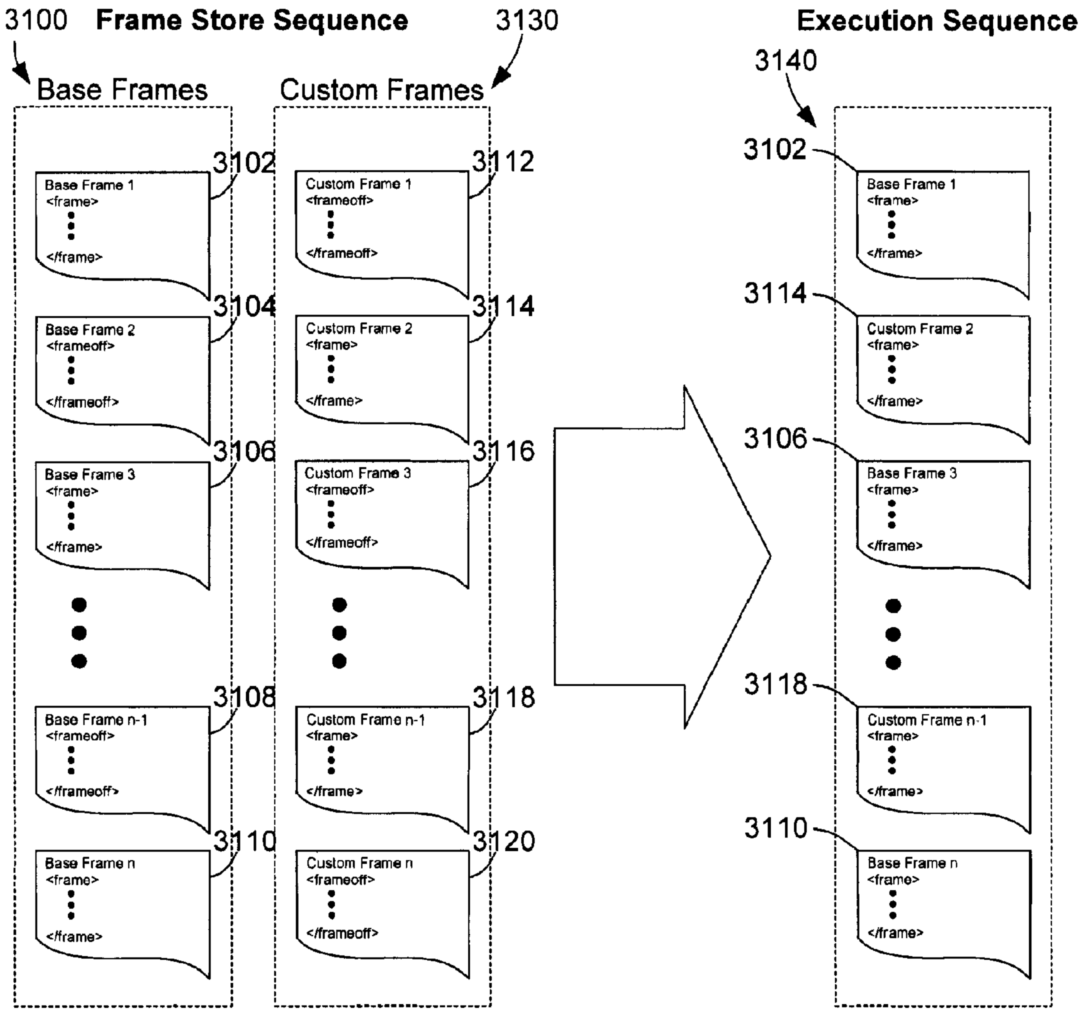

FIG. 31 illustrates base frames, custom frames, and a run time sequence of frames.

Figure 32:
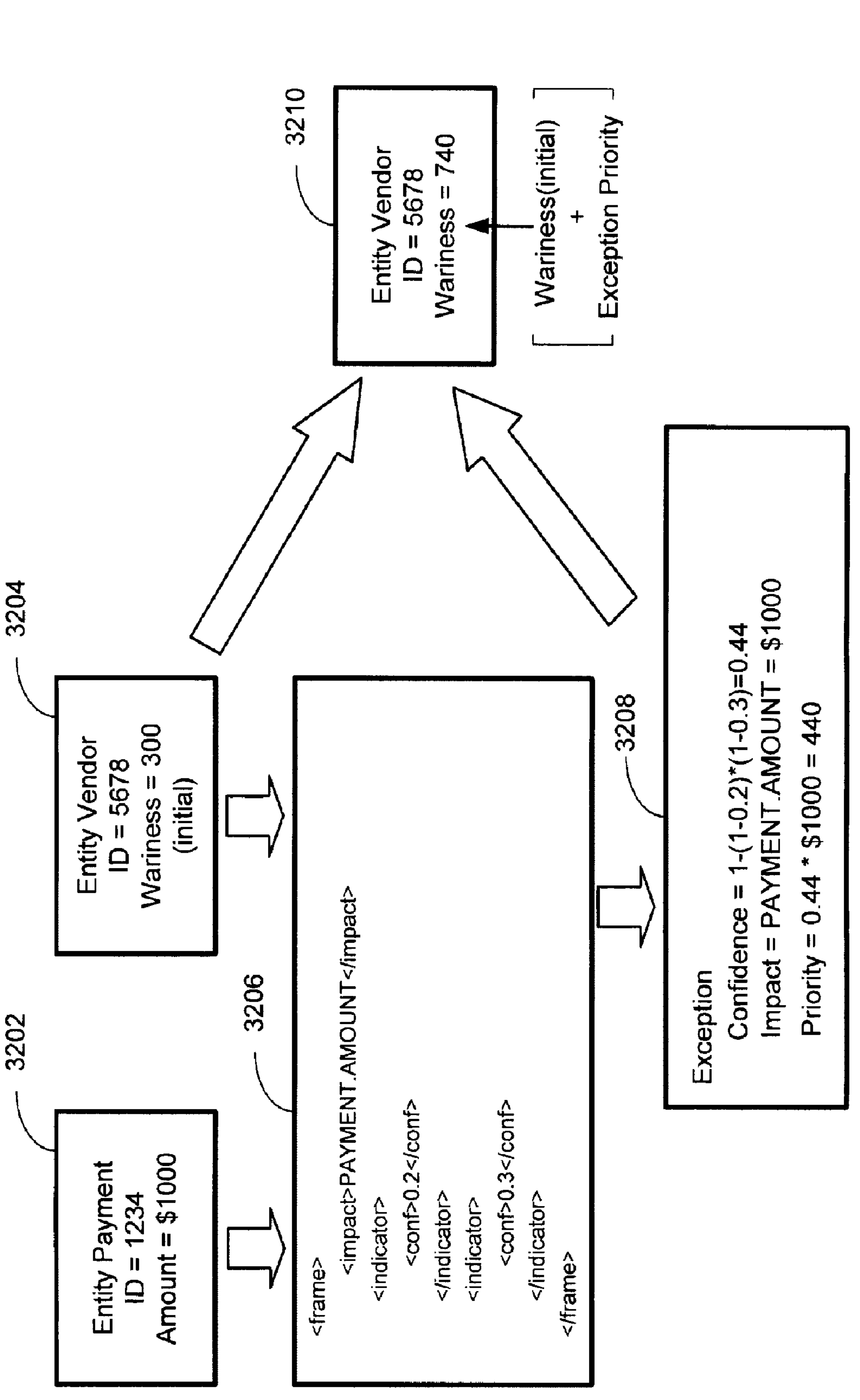

FIG. 32 shows a frame reflecting the relationship among confidence, impact, priority, and wariness.

FIG. 33 is a table to illustrate the data structure of an exception.

Figure 34:
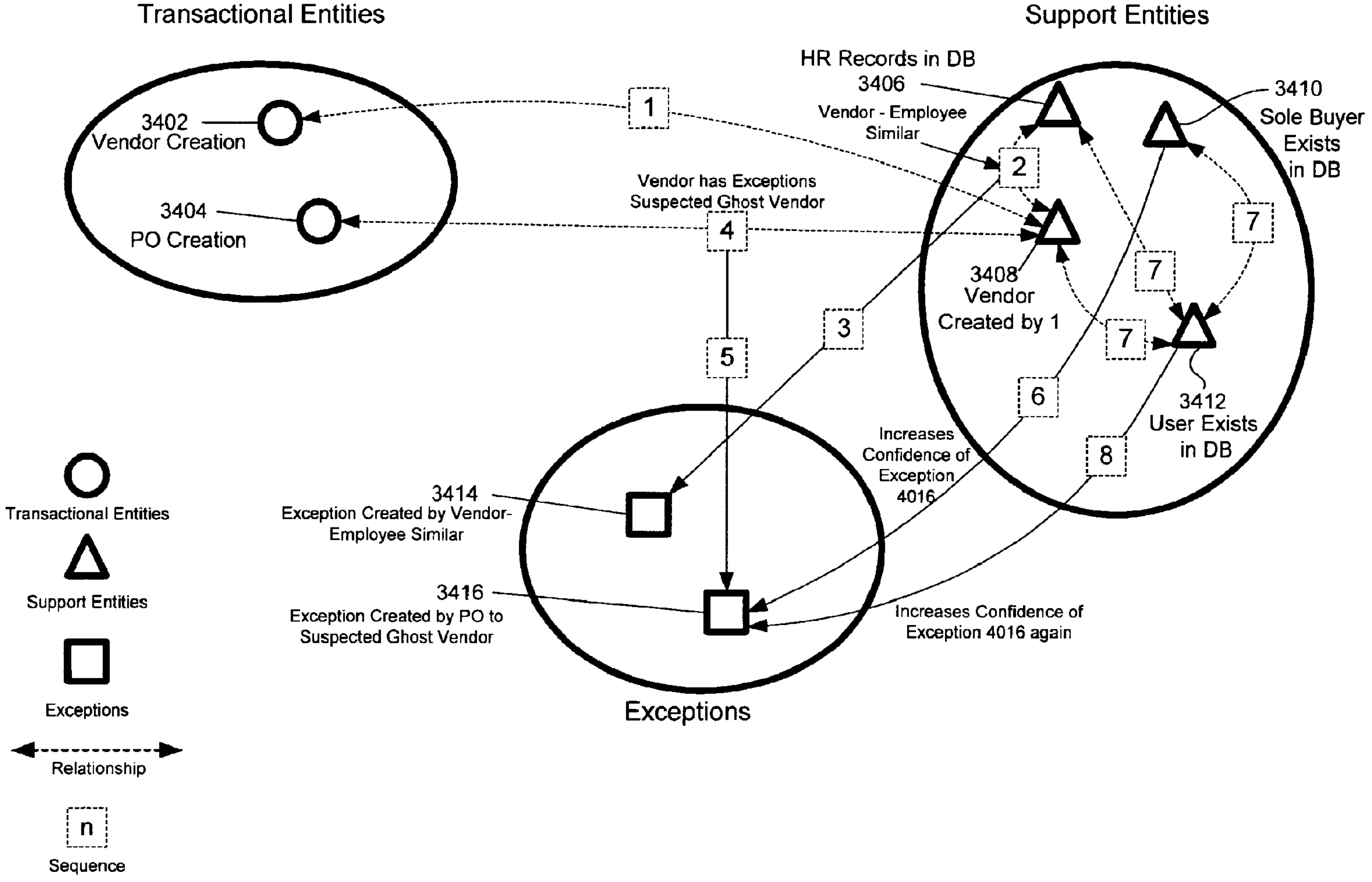

FIG. 34 shows the relationship of transactional entities, support entities and exceptions caused by these entities.

Figure 35:
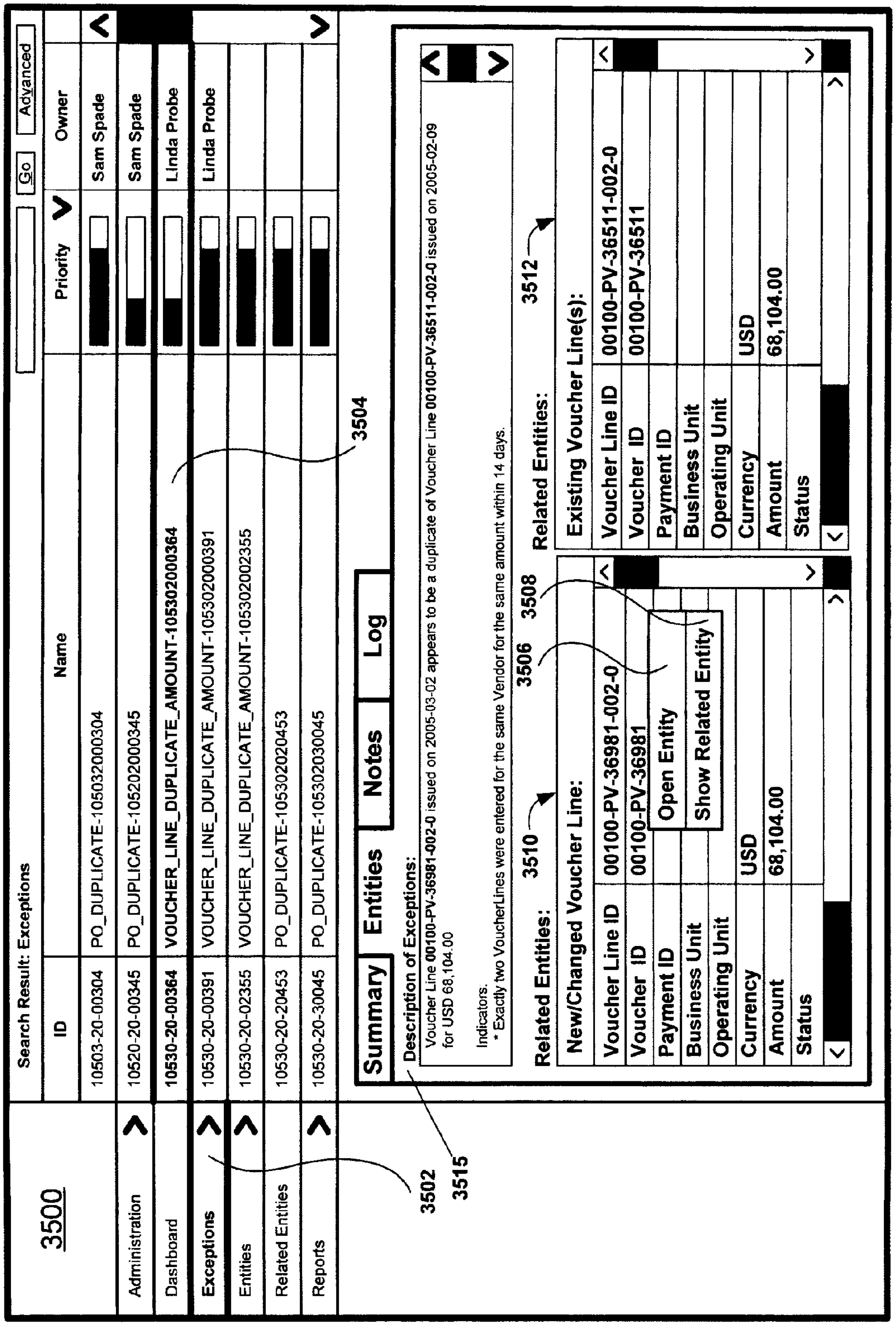

FIG. 35 is an exemplary UI screen view of exceptions and related entities.

Figure 36:
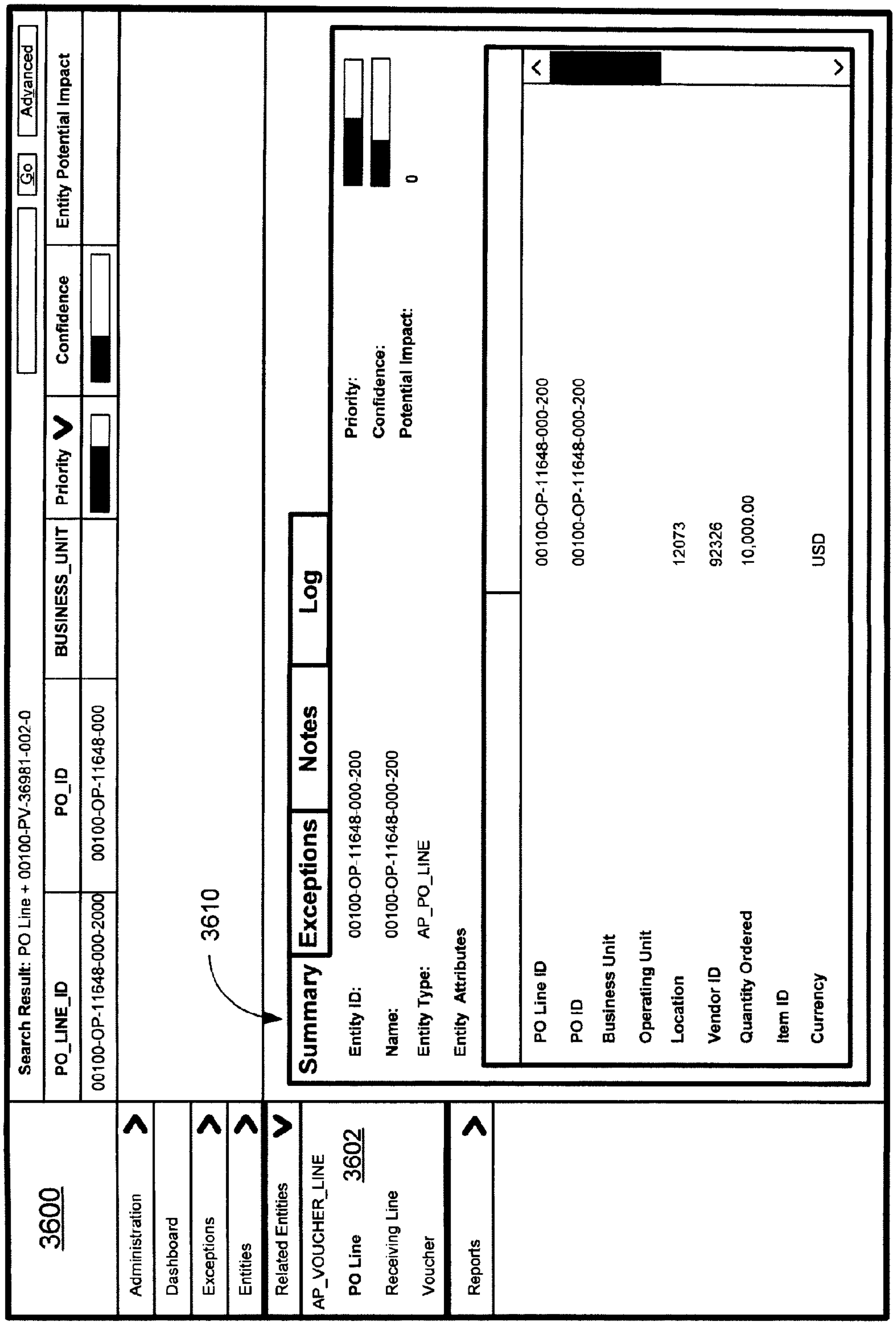

FIG. 36 is an exemplary UI screen view of related entities of an exception.

FIG. 37 is an exemplary UI screen view of an exception and its related entities.

Figure 38:
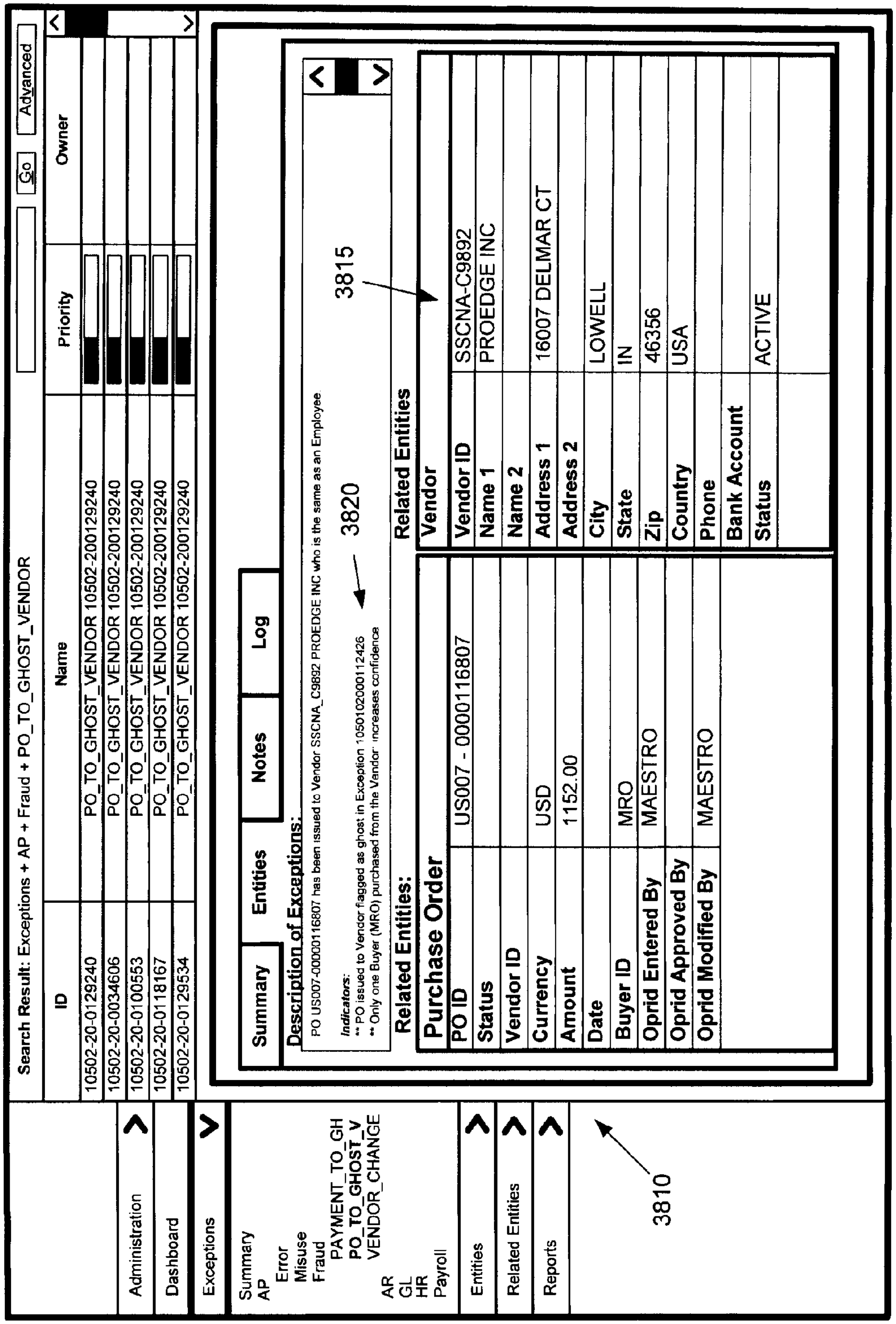

FIG. 38 is an exemplary UI screen view of some related entities from different data sources.

FIG. 39 is an exemplary UI screen view of an exception discovered by link analysis that relates information of a vendor in the AP database and an employee in the human resource database.

Figure 40:
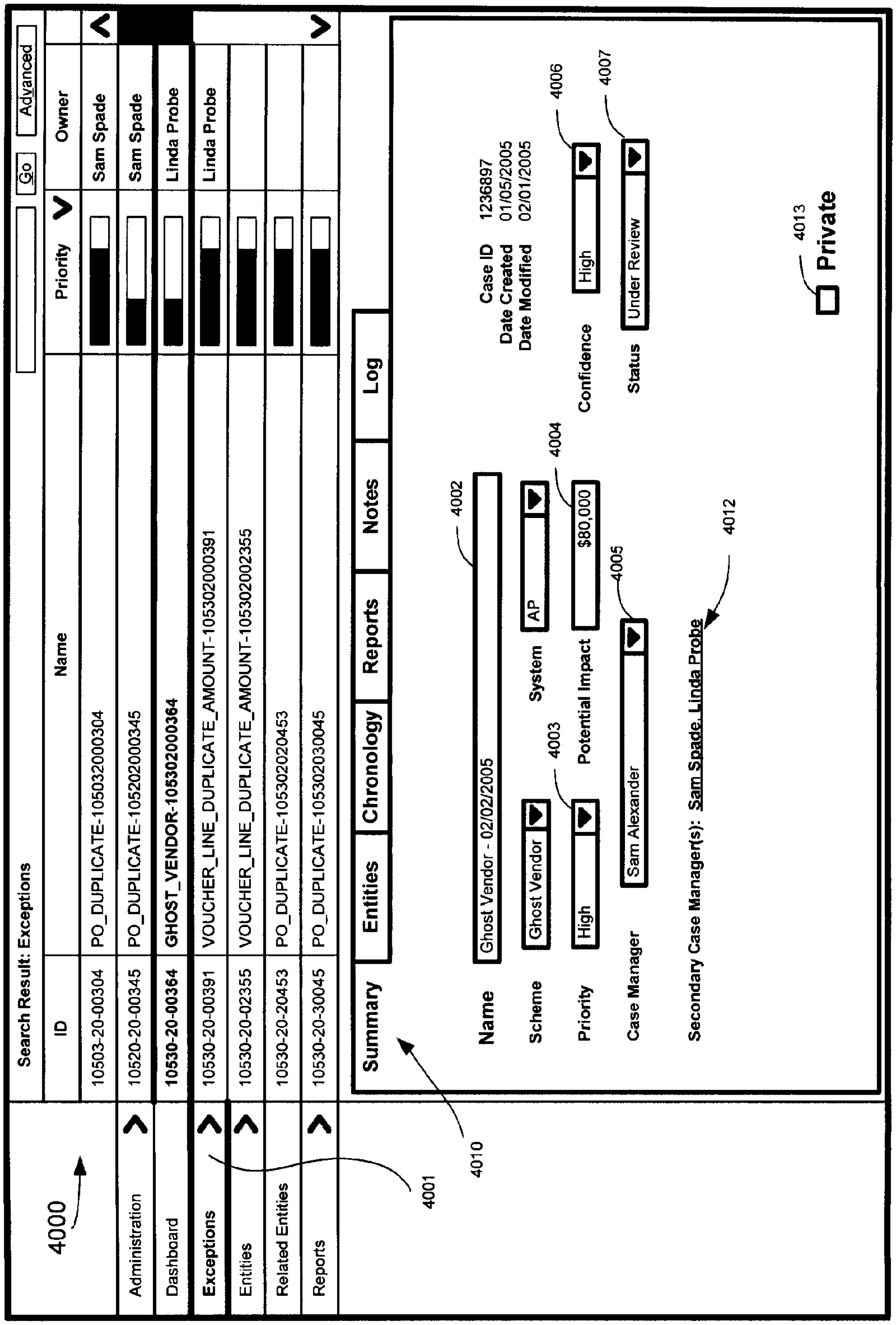

FIG. 40 is an exemplary UI screen view of exception case management with its summary information.

Figure 41:
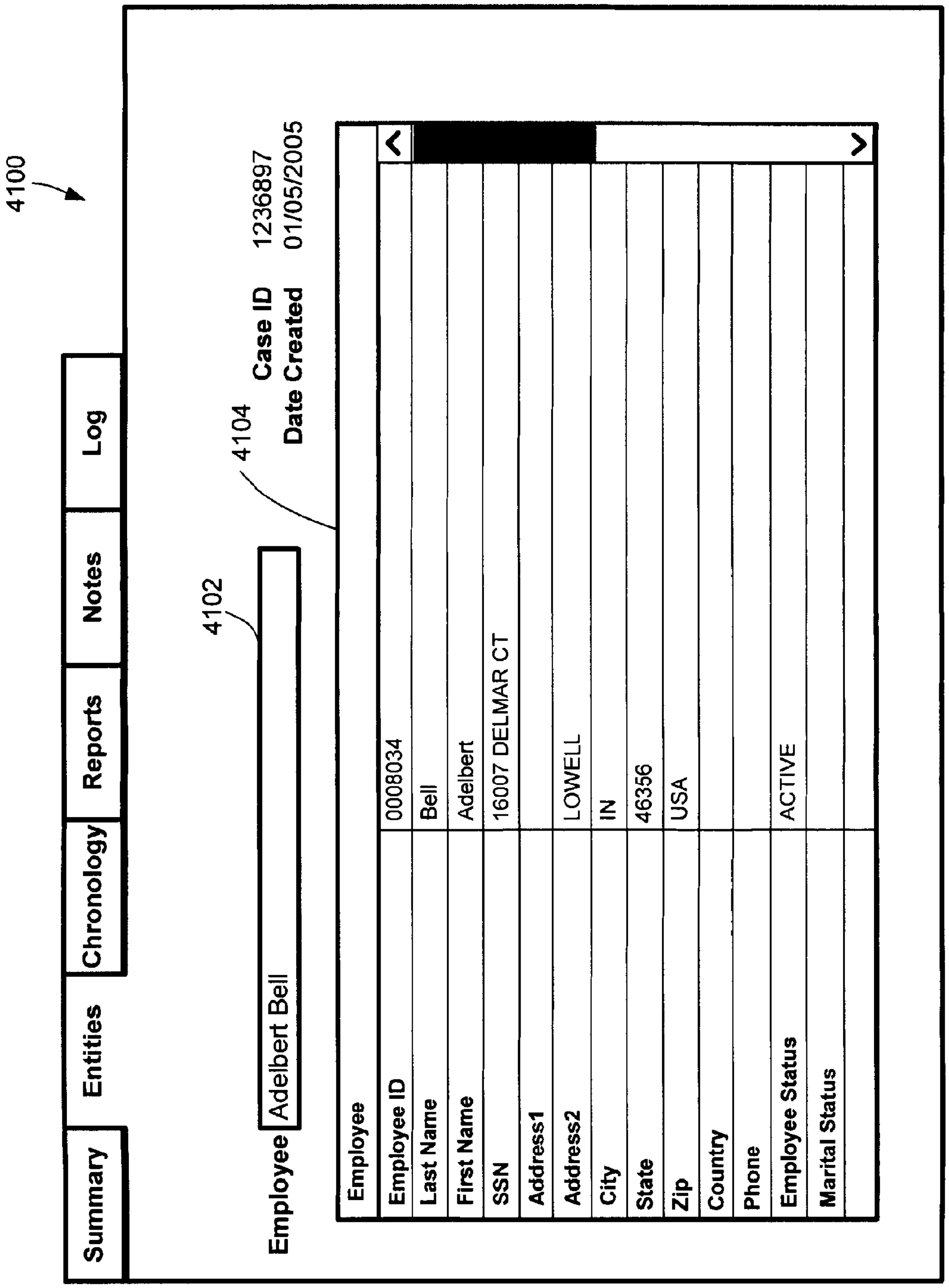

FIG. 41 is a portion of an exemplary UI view of entities showing information about an employee.

Figure 42:
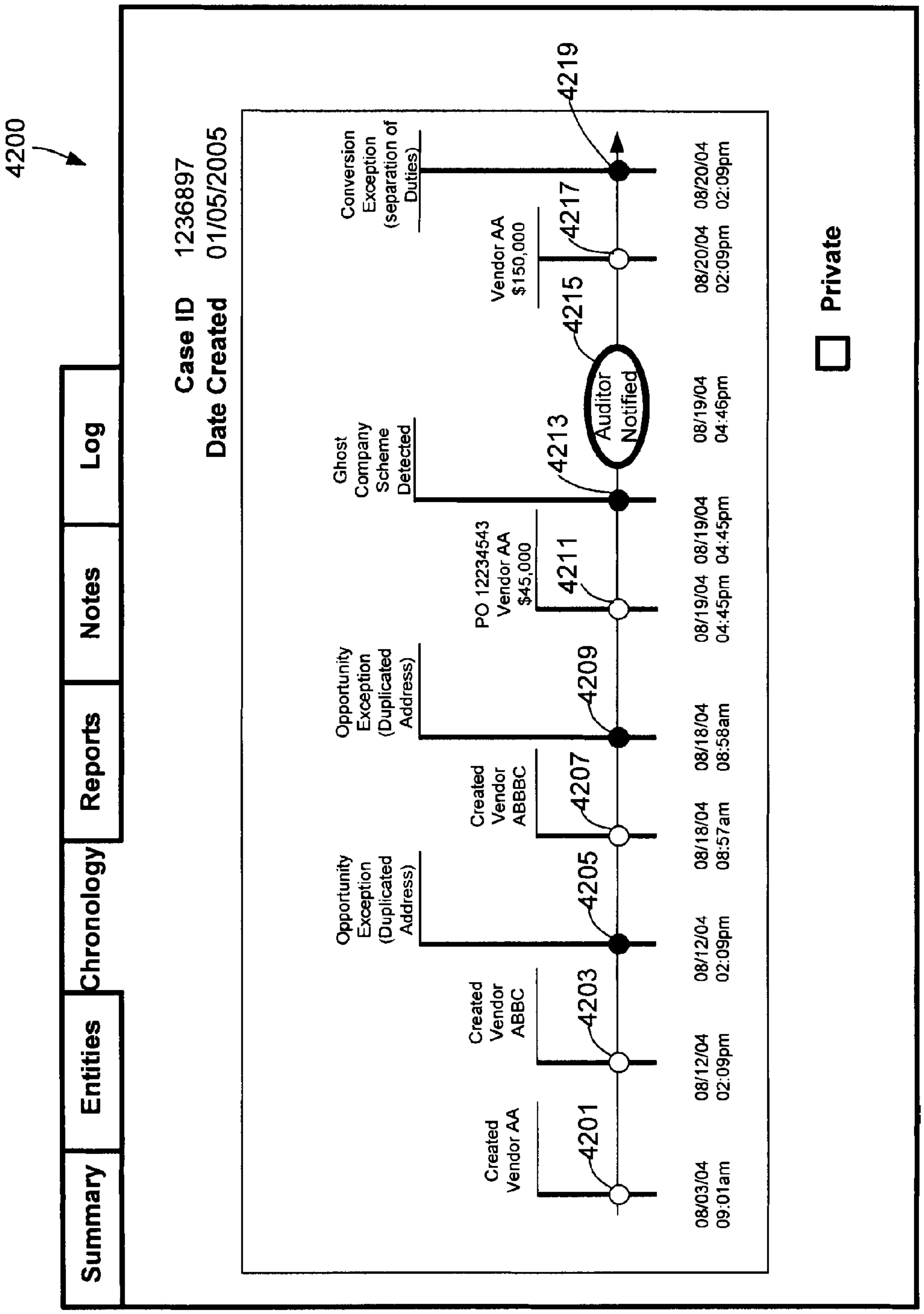

FIG. 42 is a portion of an exemplary UI view of an exemplary case with a graphical indicator of a chronology of one or more transactions and exceptions involved.

FIG. 43 is a portion of an exemplary UI view of a report generated by the case management system showing cumulated impact of a collection of related exceptions in a month.

Figure 44:
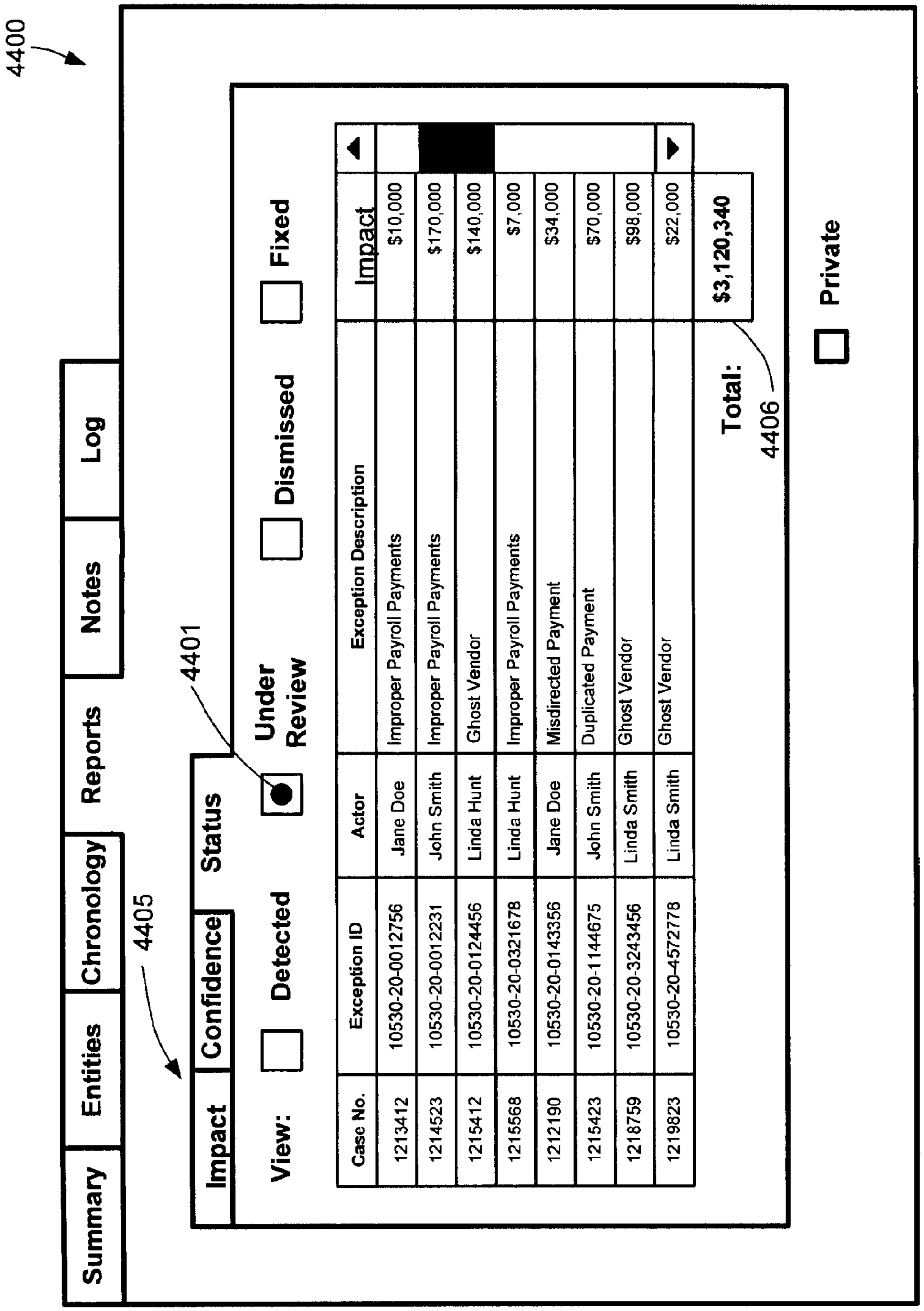

FIG. 44 is a portion of an exemplary UI view of a report generated by the case management system showing cumulated impact of a collection of related exceptions having same status.

Figure 45:
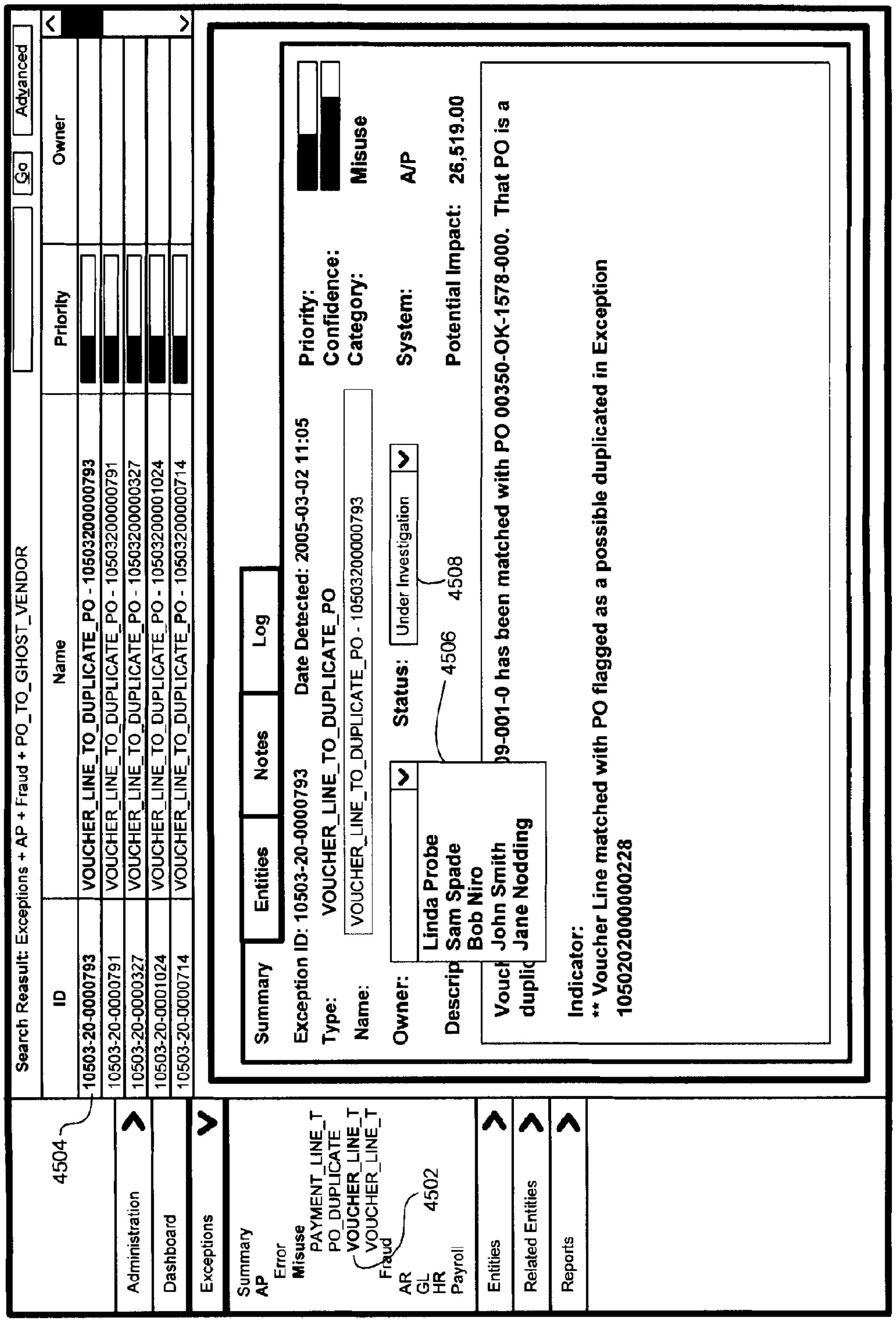

FIG. 45 is an exemplary UI screen view of assignment of an exception to an owner.

Figure 46:
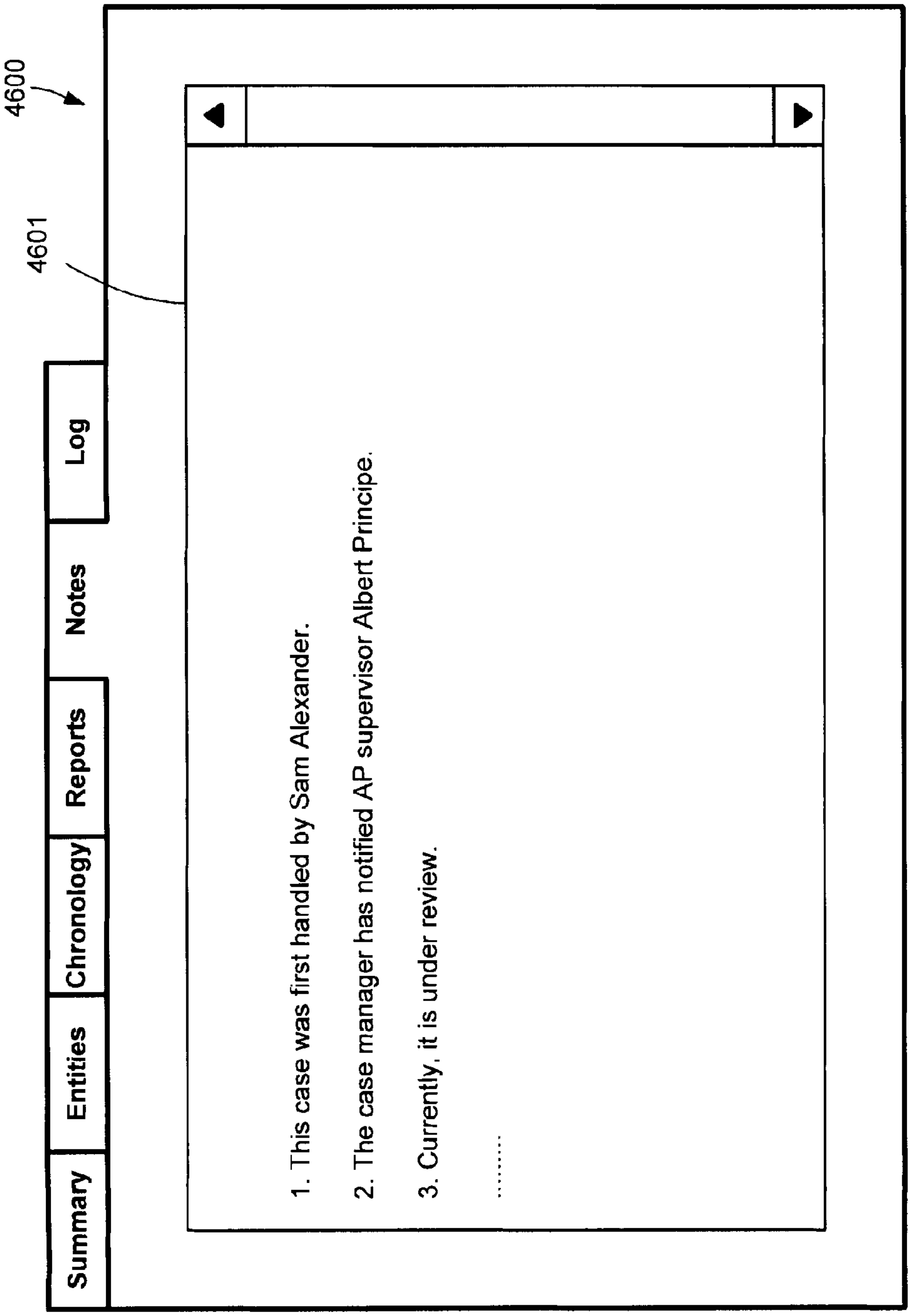

FIG. 46 is a portion of an exemplary UI view of notes associated with a case.

Figure 47:
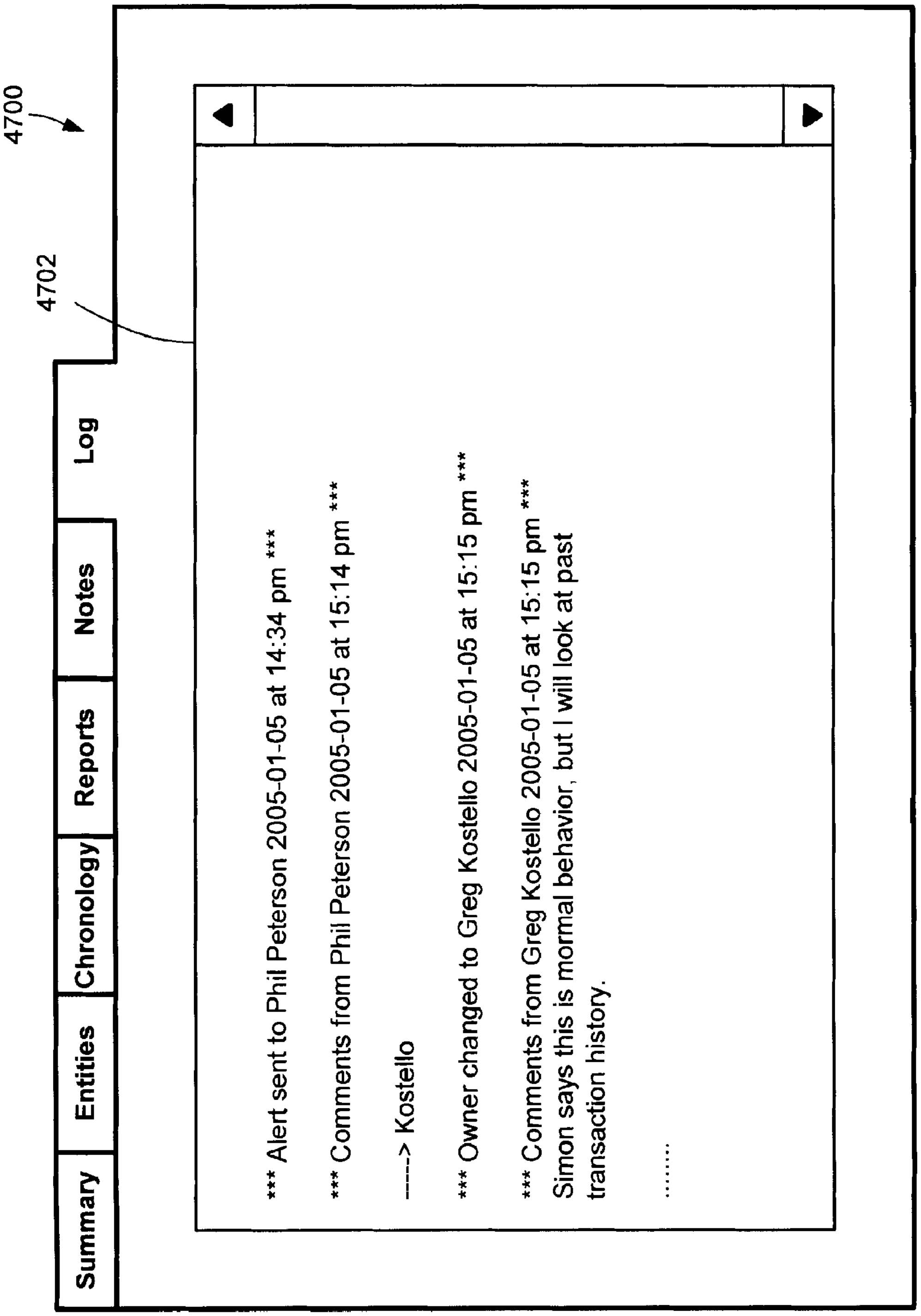

FIG. 47 is a portion of an exemplary UI view of logs of activities relating to a case.

Figure 48:
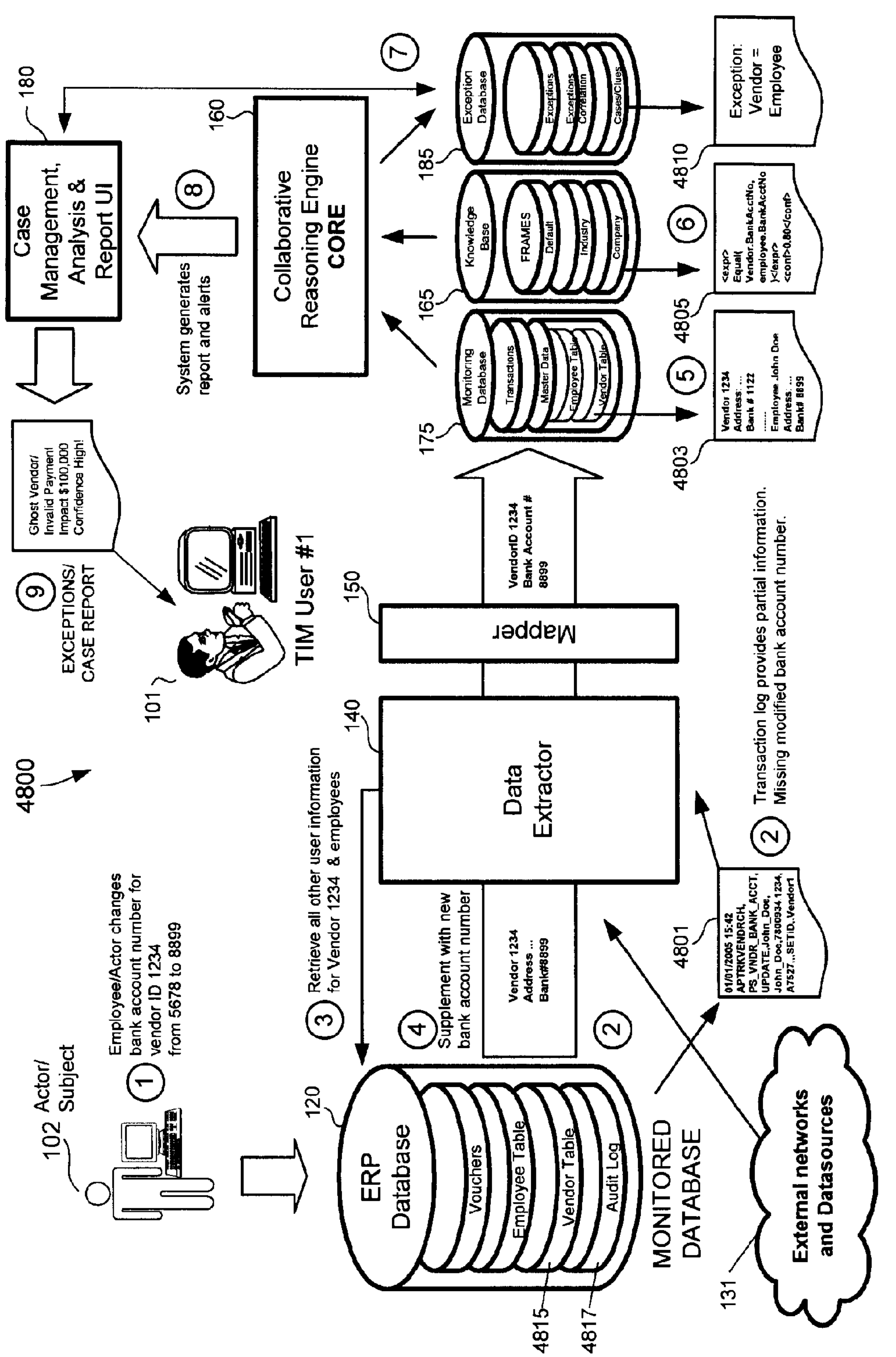

FIG. 48 illustrates the determination of an exemplary exception in response to changed data.

DETAILED DESCRIPTION OF THE PREFERRED EMBODIMENT

Prior to a detailed description of the invention(s), the following definitions are provided as an aid to understanding the subject matter and terminology of aspects of the present invention(s), and not necessarily limiting of the invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended.

DEFINITIONS/GLOSSARY

Actor: an individual responsible for conducting business activity within an Enterprise, typically generating Business Transactions. The activities of Actors are monitored in accordance with the principles and operations of the present invention.

Administrator: a type of user of a system made in accordance with the invention that has special permissions or access to certain administrative or configuration functions, e.g. a knowledge engineer, trained technician, system operator, or other person who works with an Enterprise. Typically, such a person assists in system configuration, creates Base Frames, and modifies/customizes Frames to create Custom Frames for use in the present invention.

A/P: Accounts Payable, a financial system function.

A/R: Accounts Receivable, a financial system function.

Application: a computer program that operates on a computer system, e.g., but not limited to, a computer program of an ERP, CRM, or HR system operated by or on behalf of an Enterprise. Further examples include an accounts payable (A/P) program that is used by the Enterprise to pay its vendors, employees, etc.; customer resource management (CRM) and other customer support programs, employee information applications, accounts receivable programs, inventory management programs, enterprise data storage and management systems, email systems and servers, and virtually any other type of program that generates transactions.

Base Frame: a Frame that is basic, or universal, or generally applicable to a wide range of circumstances for a variety of different Enterprises. For example, there is a strong correlation of fraud when an employee of a company is listed as a vendor within the company's payables system; a Base Frame that determines if an employee identifies himself or herself as a vendor for receiving payment is generally believed to be applicable to a wide variety of Enterprises. A set of Base Frames is preferably provided with an initial configuration in preferred embodiments of the present invention.

Business Transaction: a Transaction reflecting or representing business activity of an Enterprise, typically represented by one or more data fields of information stored in a database of the Enterprise, e.g. an HR or ERP type database. Generally, an Actor generates Business Transactions.

Case: A collection or repository of information representing one or more Exceptions and other related information, to facilitate investigations, monitoring, compliance tracking, etc. A Case is useful in collecting a Chain of Evidence that might be useful in policy enforcement or discipline. Generally synonymous with Preliminary Inquiry or Investigation, which may be considered different levels of a Case. Also can be referred to as a Case Folder.

CEV: comprehensive exception view, a user interface view of a particular exception including information related to this exception such as exception ID, description, priority, potential impact, owner, related entities, etc.

Chain of Evidence: a collection of related information that is or may be used to demonstrate that the current records match the claimed reality, i.e. proof that evidence has not been intentionally or unintentionally modified or corrupted.

Changed Entity An Entity that has changed, e.g. if data corresponding to a business transaction has been changed, such as the invoice number of a Transactional Entity corresponding to a real invoice, the data representing the change is a Changed Entity.

Clue: something that leads one toward the solution of a problem. A Clue can be one or more Indicators or one or more Exceptions. Indicators and Exceptions are species of Clue, but a Clue may consist of information other than Indicators or Exceptions.

Collaborative Reasoning Engine or CORE: a component of a system or method in accordance with the invention that executes Frames in accordance with the invention. It is a particular inventive species of a Compliance Rules Engine. Also Transaction Analysis Engine.

Compliance: the state of consistency and adherence to a policy, as reflected by one or more Frames.

Compliance Rules Engine: a system and/or software operative for executing one or more logical rules against a collection of data, to determine whether there is a violation of data rules. This is a generalized concept; see also Collaborative Rules Engine.

Compliance Policy Statement: an expression of a policy of an enterprise, typically in the form of a computer-executable series of statements and expressions, expressed in a computer-executable language such as XML frames. See also Frames.

Confidence: a function, generally mathematical in the present invention, of the quality and quantity of certain Indicators. In certain aspects of this invention, Confidence is a probability that an Exception or Case represents an actual impact or real-world event. Confidence can be express as a numerical value or a percentage; Confidence may be compared to a threshold value in order to establish an Indicator or trigger an Exception. Confidence can also be expressed in cumulative or summary terms such as high, medium or low.

CRM: customer relationship management; relates to aspects of interaction that an enterprise has with its customers. Many aspects of CRM are now computerized and generate various transactions, e.g. inquiries from prospective new customers, contact management functions, customer list maintenance, help desks and customer service representative monitoring, email organizers, web site interactivity, product returns and credits, couponing and rebates, online chat functions, instant messaging, etc.

Customer Control Objectives: narrative statements of the policies of an Enterprise with respect to some topic or management goal or objective. Such narrative statements may be represented by and maintained in a document or table (e.g. a database table), provided by the Enterprise. Customer Control Objectives are expressed formalistically in Frames or Compliance Policy Statements.

Custom Frame: a Frame that is especially created or modified for a particular Enterprise, to reflect circumstances or policies applicable to that particular Enterprise. A Custom Frame may be created by modification of a Base Frame and run in lieu of a particular Base Frame that is not applicable to that Enterprise, or a Custom Frame may be created from scratch.

DBMS: database management system.

Entity: something that has a separate and distinct existence or conceptual reality outside the present invention and a lifetime beyond a single business transaction. As used most often in this document, an Entity is the representation of data in a document or other aspect of an enterprise's business processes. An Entity has two main species: Transactional Entity and Support Entity. See also Changed Entity. An Entity can also be Static Entity or a Transient Entity. A Transactional Entity can exist in a Monitored Database or in a Monitoring Database.

Enterprise: an organization or business entity that utilizes the present invention; such an Enterprise will usually have one or more computer systems running one or more Applications, for which compliance monitoring in accordance with the invention is effected. An Enterprise can be a business, a government agency, a person, or virtually any other organization that conducts business transactions reflective of its business activity.

Enterprise Database: a database associated with an Enterprise, typically storing Transactions, Business Transactions, etc.

ERP System: Enterprise Resource Planning system, generally the software, system, and/or Applications responsible for planning and tracking the financial, logistical and human operations of an Enterprise.

Estimated Impact: a mathematical term, Confidence*Potential Impact.

Exception: an indication and representation of data corresponding to a possible violation of an Enterprise Policy. An Exception can occur from a single incident or action, or a collection of incident or action. In accordance with aspects of the invention, one or more Exceptions occur or are triggered as the result of the settings or values of one or more Indicators from the execution of one or more Frames, in response to determination by the logic of a Frame that something has occurred that is suspicious or noteworthy and might be indicative of a lack of compliance. There can be multiple related Exceptions corresponding to a policy violation. There can also be an aggregate Exception (a Super Exception) that itself consists of multiple Exceptions.

Exception Handling: the processing of one or more Exceptions. A User can flag or identify an Exception with a status such as detected, under review, dismissed, or fixed. Also relates to the storage and processing of Exceptions within database or store of Exceptions, such as a Case.

Extraction or Extract: a process of retrieving selected information from the databases of an Enterprise.

Frame: a computer-executable logical representation of a rule or set of rules, determined by a User (typically an Administrator type user) responsible for establishing compliance monitoring processes to implement a Policy, as applied to data or information reflecting one or more transactions or one or more data items of transactions. A specific implementation of a Compliance Policy Statement. In the preferred embodiments, a Frame is represented by an XML frame, although other computer-implemented mechanisms may be utilized. Typically, a Frame includes logic responsive to values of one or more Indicators to generate Exceptions. See also Base Frame and Custom Frame.

Fraudster: a user of a system who uses the system to perpetrate a fraud.

HR: Human Resources. When referring to a system, typically means a computer system or Application operative to maintain information about personnel within an organization (such as employees), for example, payroll information, health care insurance information, retirement benefits information, etc.

Impact: see Potential Impact.

Indicator: a signal, variable, marker or pattern of data that corresponds to, represents information about, and/or constitutes a component of an Exception. Typically, one or more Indicators make up an Exception. In aspects of this invention, a Frame contains computer-executable logic that processes data representing Indicators and generates Exceptions. An Indicator typically relates to a specific control activity and is designed to represent a specific control objective or Policy of an Enterprise. An Indicator may be a cumulated value, and can itself be determined from other Exceptions. An Indicator may also be an individual transaction or set of transactions that when detected and analyzed are indicative of misuse, abuse, or fraud, or other lack of compliance with a Policy.

Inquiry: see Preliminary Inquiry.

Investigation: an official and systematic process of determining the facts surrounding one or more Exceptions. In accordance with aspects of the invention, an Investigation can be stored in and represented by a Case.

Knowledge Base: a collection of Frames representing the compliance policies of the Enterprise, e.g. Policy Frames, stored in a data store or database. In accordance with aspects of the invention, a collection of XML data files that comprises computer-executable Frames, as well as data or tables associated with Extraction and with mapping of extracted data into the Monitoring Database.

Linking: the notion of retrieving and processing a number of related Entities, such as Transactional Entities, to assist in a broader review of transactions associated with particular Subjects, Support Entities, etc. For example, if a particular transaction such as a payment to a particular vendor is discovered to be duplicative of another, earlier payment to the same vendor, linking would allow the retrieval of other payments to that vendor, or identification, retrieval, and display of other payments authorized or initiated by the party that created the duplicate payment(s), or retrieval of other transactions such as invoices or other documents related to that particular vendor.

Link Analysis: correlating different business transactions or exceptions for the purpose of discovering or demonstrating a pattern of activity.

Mapping: a process of correlating data items identified in one manner with data items identified in a different manner.

For example, relating a data item from an ERP database identified in that database as CUSTOMER_NAME with a data item in another database (such as the Monitoring Database) identified as VENDOR.OST.

Monitoring Database: a database or DBMS that stores a selected subset of information derived from an Extraction of predetermined information relating to Transactions that are monitored in accordance with aspects of the invention. Typically the Monitoring Database is maintained separately and independently of any database that stores Transactions or information relating thereto. Entries in this database are referred to as Monitoring Entities.

Monitoring Entity: an entity comprising a data item in a Monitoring Database, typically comprising a selected subset of information from a Monitored Database. Monitoring Entities can be Transactional Entities or Support Entities.

Monitored Database: a database or DBMS that stores information relating to Transactions those are to be monitored in accordance with aspects of the invention. Also called a Transactions database, or Enterprise database, or Source database.

Monitored Entity: database entries or item in a Monitored Database; can be a Transactional Entity or a Support Entity.

Normalize: a process of transforming data items expressed in a first data item naming schema (e.g. of an enterprise database) into data items expressed in a different data item naming schema (e.g. associated with a monitoring database). May also involve combining one or more data items or fields in the first schema to a single data item or field in the second schema (or vice versa), reducing or expanding the characters count of the data item or fields, changing the units, changing the data type, etc. See also Mapping, Ontology. E.g. Data items may be normalized by mapping them into a different naming and data storage schema, in accordance with ontology.

Ontology: A collection of data and/or metadata, somewhat like a dictionary, that provides for creating relationships and/or interoperability between things that have different names, e.g. a data field in one database might have a field identifier CUSTOMER_NAME, while the same information in another database might have the field identifier PERSONNAME. Ontology would have a list of each item, CUSTOMER_NAME and PERSONNAME, with pointers to each other, thereby defining the relationship. Used in Mapping. An ontology may be, but is not necessarily, constructed with known ontology construction tools such as the Resource Description Framework (RDF), which is a general framework often used to describe a web site's metadata or the information about the information on the site.

Policy: a statement reflecting or representing the manner in which an Enterprise is to abide by rules or guidelines of behavior, sequence of operations, protocols, requirements for information, regulations, laws, or other indicators of actions.

Policy Frame: a Frame expressing or indicative of a Policy. May be expressed in XML, but can be expressed in other computer-executable form. In various aspects of the invention, it should be understood that to some extent all Frames are Policy Frames. Also, a Compliance Policy Statement.

Potential Impact: the potential loss (typically monetary) associated with an Exception or Case. Also referred to simply as Impact.

Preliminary Inquiry: a process of gathering information about one or more Exceptions to determine if a formal Investigation is needed or to be conducted.

Priority: the relative importance of an Exception or a Case. The default priority for a detected Exception may be based on the Estimated Impact. May be represented as "High", "Medium" or "Low", with numerical values, or with alphabetical values.

Private Flag: an indicator or flag that an Exception or Case should not be included in search results or summary reports unless specifically requested; provided for access control that is limited to authorized Users only.

Record: in database parlance, a single instance or data item, usually consisting of one or more fields of information, each field typically having a field identifier identifying what the information in that field represents. An array of records is often referred to as a table.

Source Database: another term for Monitored Database.

Staging Database: a special database that receives data from an extraction operation and holds the data temporarily prior to a mapping operation.

Subject: person(s) and/or system(s) associated with a particular Exception or Case managed by embodiments of the present invention. Is typically an Actor.

Super Exception: an aggregate Exception that comprises multiple Exceptions, i.e. the logic of a Frame may be responsive to the occurrence of one or more previously generated Exceptions, possibly from the execution of other Frames.

Support Entity: an Entity that is persistent over a relatively long period of time. An Entity typically relating to an Actor and/or the subject matter of a business activity, e.g. vendors, employees, customers, products, third party service providers, service personnel, etc. and their associated information is considered Support Entities. Support Entities typically are static entities that have a longer persistence than Transactional Entities. Support Entity is sometime referred as Static Entity, See also Transactional Entity.

Table: a particular collection of database records in a DBMS, having predetermined data fields. A typical relational DBMS may be viewed as a plurality of tables or grids of information, with each row in the table or grid corresponding to a record, and each column of the table corresponding to a particular data field or data type. The term is typically used in the conventional DMBS sense.

Transaction: a set of system actions that result in a completed business activity. For example, a transaction includes the actions associated with adding or deleting a new vendor within an A/P system, or changing the name of an existing vendor from one name to another, or creating a purchase order. A transaction can relate to a Support Entity or a Transactional Entity. See also Monitored Transaction.

Transaction Analysis Engine: another term for CORE.

Transactions Database: see Monitored Database; generally synonymous therewith.

Transactional Entity: an Entity that has a relatively short lifecycle compared to a Static Entity; an Entity relating to a transaction and its associated information, typically corresponding to activities of or in a business process, for example, purchase orders, vouchers, payments, shipping records, service requests, change orders, etc. and their associated information are considered Transactional Entities. Also can include other activity that is not strictly business-process related, e.g. information technology (IT) infrastructure information of a transactional nature such as is provided by computer, networking, and telecommunications equipment such as firewalls, routers, intrusion detection devices, user authentication systems, application servers, and other similar equipment. Is typically a Transient Entity. See also Support Entity, Monitoring Entity.

User: an individual or other entity that accesses or uses a compliance monitoring system constructed in accordance with aspects of the invention. Typically, a user is an administrator who works for the enterprise, such as a policy Administrator or person who receives reports indicative of Exceptions, Events, or other failures of compliance. Typically, a User is not an Actor or Subject or other person subject to an Investigation.

UI: User Interface. Typically means a software Application with which a User interacts for purposes of entering information, obtaining information, or causing functions of an associated system to execute.

Wariness: indicates a level of suspicion of an Exception or Entity. Can build up or accumulate as a function of Confidence, Potential Impact, and/or Priority, or of Indicators.

System Overview

The embodiments of the present invention are preferably implemented as a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer; or special purpose processing device to perform a certain function or group of functions.

Those skilled in the art will understand the features and aspects of a suitable computing environment in which aspects of the invention may be implemented. Although not required, the inventions will be described in the general context of computer-executable instructions, such as program modules, being executed by computers in networked environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules and other data for the computer. Although the exemplary environment described herein employs a magnetic hard disk, a removable magnetic disk, removable optical disks, other types of computer readable media for storing data can be used, including magnetic cassettes, flash memory cards, digital video disks, Bernoulli cartridges, RAMs, ROMs, and the like.

Computer program code that implements most of the functionality described herein typically comprises one or more program modules may be stored on the hard disk or other storage medium. This program code, as it known to those skilled in the art, usually includes an operating system, one or more application programs, other program modules, and program data. A user may enter commands and information into the computer through keyboard, pointing device, or other input devices (not shown), such as a microphone, joy stick, game pad, satellite dish, scanner, or the like. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN) and a wide area network (WAN) that are presented here by way of example and not limitation. Such networking environments are commonplace in office-wide or enterprise-wide computer networks, intranets and the Internet.

When used in a LAN networking environment, the main computer system implementing aspects of the invention is connected to the local network through a network interface or adapter. When used in a WAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

Figure 1:
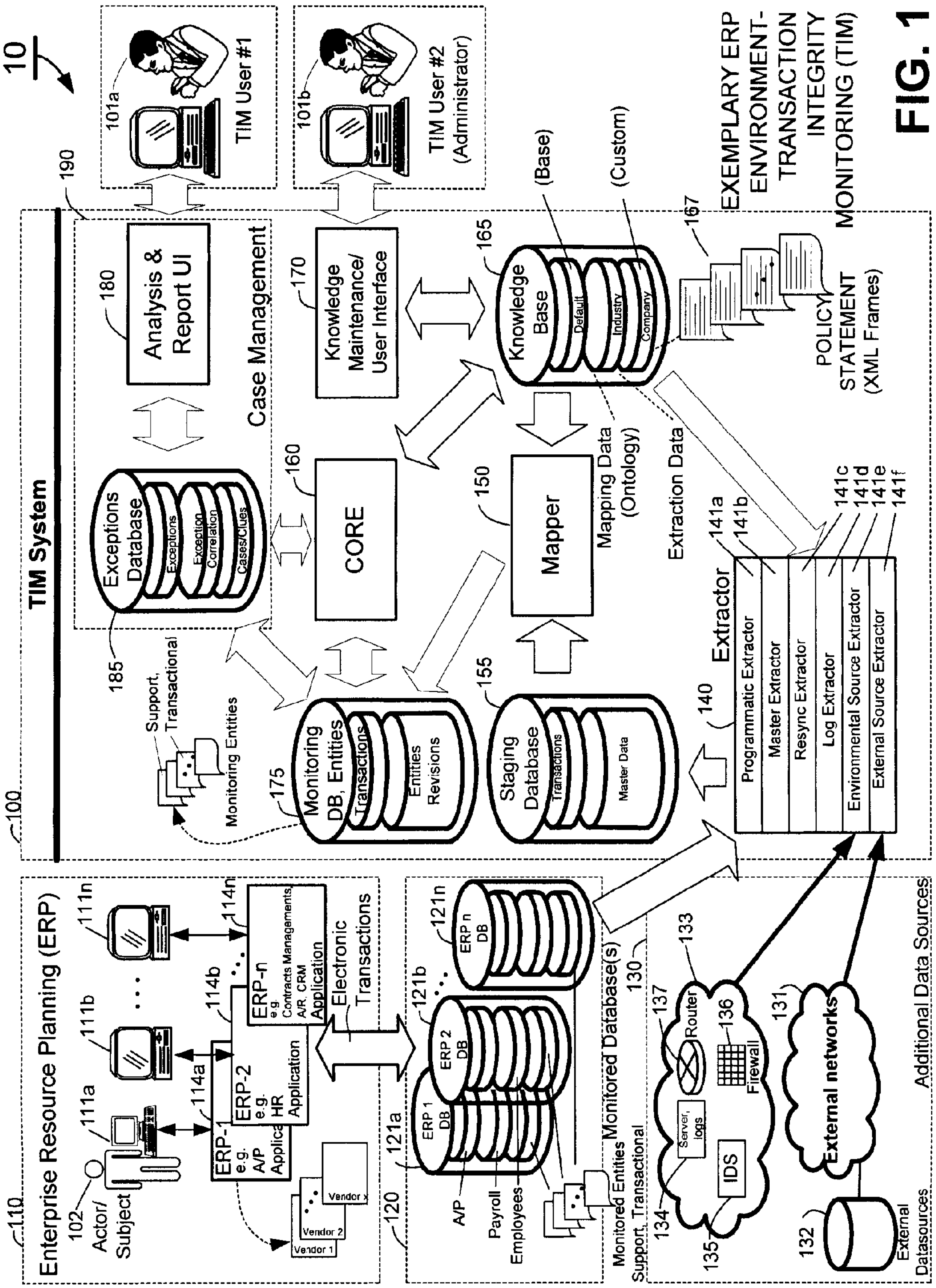
FIG. 1 is an overview of an exemplary enterprise resource planning system (ERP) environment with transaction integrity monitoring (TIM) according to aspects of the present invention.

Referring now to the drawings, in which like numerals indicate like elements or steps throughout the several drawing figures, FIG. 1 illustrates an exemplary enterprise computing environment 10 in which a transaction integrity monitoring (TIM) system 100, constructed and operated in accordance with aspects of the present inventions, is operative and useful for the purposes described herein. The enterprise computing environment includes an enterprise resource planning (ERP) system 110 as exemplary of a type of computer system with which the inventions are operative, although other types of computer systems are also operative, e.g. enterprise email systems, contract management systems, customer relationship management (CRM) systems, document retention systems, inventory management systems, etc. Collectively, such various types of computer system are generally referred to as "ERP" systems in a broader sense for purposes of explaining and illustrating the inventions.

Briefly summarized, the TIM system 100 is connected for computer-to-computer communications with an enterprise resource planning (ERP) system 110 which in turn is connected to and stores data in one or more data sources such as ERP database systems 120, e.g. databases 121*a*, 121*b*, . . . 121*n*. Users 101 of the TIM system interact with the system via a user interface (UI) comprising a personal computer or terminal and associated display for configuring the system, constructing and maintaining the information such as policy statements, ontology mappings, extraction requirements, etc. (collectively referred to as "knowledge maintenance"), and receiving analysis and reports in a manner that will be described later.

ERP systems 110 with which the embodiments of the present invention are operative include both disparate heterogeneous and stand alone computer systems that run individual ERP applications on behalf of an enterprise, such as account payables systems, human resources systems, accounts receivable, general ledger, inventory management, and like. However, it will be understood that integrated ERP applications (see FIG. 2) that provide these functions in an integrated environment in a single computer system are also operative with the invention. Thus, it should be understood in FIG. 1 that various applications, e.g., 114*a*, 114*b*, . . . 114*n*, labeled as ERP-1, ERP-2, . . . ERP-n, are typically independent applications that generate their own electronic data transactions, and that such electronic transactions are stored in one or more ERP databases, e.g., ERP database 121*a*, 121*b*, . . . 121*n*. For example, and not by way of limitation, ERP database (DB) 1 may be an accounts payable database that includes information concerning vendors of the enterprise, payments to such vendors, the status of invoices and vouchers from vendors, etc. A second ERP database 121*b* may relate to human resources (HR) functions and store information concerning employees, their ID and/or social security numbers, their addresses, payroll information and deductions, insurance and benefits information, etc. Likewise, a separate ERP application 114*n* can include contracts management, accounts receivable, customer relationship management (CRM), email, or virtually any other type of computer system. In accordance with aspects of the invention, virtually any type of computer program or system that generates, transmits, records, processes, or otherwise manifests transactions, as the term is used herein, can be connected to and utilized with the present invention.

Data generated from enterprise transactions is stored in ERP database system 120, such as databases 121*a*, 121*b*, . . . 121*n*. Such databases are considered monitored databases in accordance with aspects of the invention. Transactions generated by the various applications in the ERP system 110 are stored in these databases, and information from such databases is extracted, processed, and analyzed in accordance with aspects of the invention. Information stored in the monitored databases 120 is considered monitored entities, which can take the form of support entities or transactional entities, as defined herein. As described elsewhere herein, support entities are typically static entities that have a relatively long persistence within an enterprise such as employee names, customer identification, vendor name, etc. Transactional entities, on the other hand, are typically transient entities that exist in a plurality relative to one or more support entities, e.g. a vendor of an enterprise may generate numerous invoices and receive numerous payments over a period of time.

It should be understood that electronic transaction can be considered a transactional entity and processed in accordance with the invention, and considered as a part of assessing policy compliance. For example, the creation of a vendor in an accounts payable system is a transaction, as is creation of a new employee in an HR system; both of these become support entities after their transaction is completed.

In accordance with aspects of the inventions, monitored entities are extracted from the monitored databases 120 and processed in accordance with the inventions as will be described. Such monitoring entities correspond to transactions generated within a data source such as ERP system 110. Transactions within an ERP system 110 are created and/or handled by an actor 102, such as an employee, executive, consultant, other authorized individual, or other person that interacts with the ERP system via a computer terminal such as that shown at 111. In accordance with the aspects of the inventions, an actor 102 who is responsible for a transaction within the system 110 but violates policies—and thereby constitute exceptions in accordance with the techniques described herein—may become a subject of an investigation. As will be discussed in greater detail, transactions associated with various actors, or subjects, may be cumulated and viewed in accordance with aspects of the case management features as described herein. For example, if a particular actor 102 works in an enterprise's accounts payable function and operates an A/P program module such as 114*a*, he or she may generate one or more payments to various vendors, e.g., vendor 1, vendor 2, etc. Under certain circumstances, rules reflective of enterprise policy can be constructed to determine if improprieties occur in the identification of vendors, or providing unauthorized or excessive payments to vendors, or changing a vendor name to a different entity and changing it back, and other known fraudulent schemes.

Still referring to FIG. 1, a TIM system 100 that is constructed and operative in accordance with aspects of the inventions described herein comprises several major components. These include extractor 140, staging database 155, mapper 150, knowledge base 165, monitoring database 175, collaborative reasoning engine (CORE) 160, knowledge maintenance and administration subsystem 170, and a case management system 190 comprising an exceptions database 185 and analysis and reporting engine 180. These components are typically provided in the form of one or more computer program modules that are stored and run on one or more server-based type computer systems comprising the entire TIM system 100, including storage devices such as disk drives and/or RAID arrays and/or storage area network (SAN) devices to serve as the databases. Preferably, the entire TIM system 100 is provided with and runs on a hardened computer operating system, in a secure environment, physically separate from the ERP systems 110 and databases 120 that are monitored, so as to provide out-of-band, secure, and controlled access operation.

An extractor 140 is operative to interface with the various data sources such as monitored databases 120 and retrieve, be provided, or otherwise obtain data from such data sources and monitored databases. Extracted data from extractor 140 is stored in a staging database 155, which temporarily stores data so that the TIM system can operate out of band with respect to enterprise applications and thereby minimize performance degradation of the monitored ERP systems. The extractor is responsive to and/or configured by extraction data (stored as extraction files a knowledge base 165) to determine an appropriate extraction methodology for a particular type of ERP database from which data is extracted and monitored.

The extractor 140 comprises several subcomponents 141. A programmatic extractor 141*a* is operative to provide information from an ERP system (such as provided by the known ERP system provider SAP, located in Walldorf, Germany), that provides or exports data automatically rather by extraction. A master extractor 141*b* is operative for an initial data load to extract an entire predetermined data set, typically a limited set (subset) of information or "snapshot" of data within an enterprise at a predetermined point in time, and to store that initial and "master" data set in the staging database 155 or in the monitoring database 175. A resync extractor 141*c* is operative to synchronize data in the monitoring database 175 to a master set of information in the monitored databases 120 so as to minimize the likelihood that a lack of synchronization between data sets will create issues. A log extractor 141*d* is responsive to the provision of audit data logs by certain types of ERP database systems, in the form of records indicating the addition or change of records within particular ERP data. An environmental source extractor 141*e* is operative to obtain data from an enterprise's environment 133 (e.g. internal systems such as its information technology (IT) infrastructure). Finally, an external source extractor 141*f* is operative to access and retrieve information from external data sources 132 via an external network 131 such as the Internet. As will be described in greater detail, access to information in external data stores such as proprietary databases, publicly accessible databases, and the like that may be required in enterprise policies to provide certain integrity checks.

The environmental source extractor 141*e* and external source extractor 141*f* obtain data from additional data sources 130. Such additional sources are typically supplemental and additional to primary sources of transaction data such as ERP systems. In accordance with an aspect of the invention, these additional data sources include the environmental sources 133 and external data sources 132. The environmental data sources, such as the enterprise IT infrastructure, can include devices such as server logs 134, intrusion detection systems (IDS) 135, firewalls 136, and routers 137, as well as telephone systems, caller ID logs, physical security access devices, and other types of devices (not shown) that generate electronic information indicative of use or activity.

A mapper 150 is operative to retrieve data from the staging database 155 and normalize, transform or map that information into a predetermine format to comprise monitoring entities, which are then stored in a monitoring database 175. The monitoring database 175 stores monitoring entities, both support and transactional, identified by table and field names in accordance with mapping data stored in a knowledge base 165. The mapping data (e.g. in the form of mapping files and ontology files) establishes relationships between monitoring entities stored in the monitoring database and monitored entities from the ERP databases. A principal function of the mapper 150 is to transform data from various and disparate (and possibly heterogeneous) data sources into a shared schema or ontology, so that an analysis engine can examine and correlate data across the disparate systems and facilitate the preparation of policy statements that consider information from different data sources.

A knowledge base 165 stores information required by the extractor 140 (extraction data in the form of extractor files), information required by the mapper 150 (mapping data in the form of mapping files and ontology files), and a plurality of computer-executable policy statements or frames 167 that constitutes the rules and/or logic for determining exceptions. A collaborative rules engine (CORE) 160, also called a transaction analysis engine, is operative in accordance with aspects of the invention to execute policy statements, which constitutes one or more logical rules and/or expressions, against the monitoring database 175 to determine whether there is a violation of policies or rules (i.e. exceptions), in a manner that will be described in greater detail below. Output from the CORE 160 in the form of exceptions resulting from execution of frames 167 is stored as one or more exceptions in an exceptions database 185. These exceptions, as will be described, constitute indications of violations of enterprise policy that are reflected by and maintained in the frames 167.

By "computer executable policy statement," it is generally meant that the policy statements are expressed in a computer-readable form, such as an XML frame containing data, commands, and logical expressions that resolve to an outcome such as an exception, etc. Typically a policy statement can be "executed" in the sense that an interpreter can parse the file and determine what computer-operations should be effected. The policy statement is therefore a form of computer program or data for use in a computer program. A number of equivalents to the XML expression will be apparent to those skilled in the art, for example, a computer program in a conventional programming language such as C++, various types of data structures, scripting languages, object modules, rules statements, and other forms of expression that can be interpreted and executed by a computer.

An analysis & reporting server 180 provides a user interface (UI) to users, e.g., users 101, for purposes of receiving reports regarding exceptions and implications thereof, as well as providing a user interface to a case management component 190 also as will be described in greater detail below. Users 101 can be of different types, having different authorizations for different purposes. For example, certain users such as user 101*a* may have access to receive reports and manage certain cases or learn of certain exceptions, while another user 101*b* may be considered an administrator, with authorizations to set up other users, access and edit enterprise policy statements (or enter them initially), configure the mapping data and extraction data, etc.

The foregoing discussion of FIG. 1 has illustrated a typical environment within which the inventions herein are useful, in the context of an ERP environment where the enterprise provides different computing functions, perhaps via different computing systems or platforms in a distributed environment, each running individual applications for carrying out the function. For example, one server in an enterprise may run an A/P application, while another server, perhaps in a different physical location, may run an HR application, while yet another server, also perhaps in a different but perhaps the same physical location, may run a contracts management application or CRM system. The present inventions are not limited to distributed environments, as will next be explained.

Figure 2:
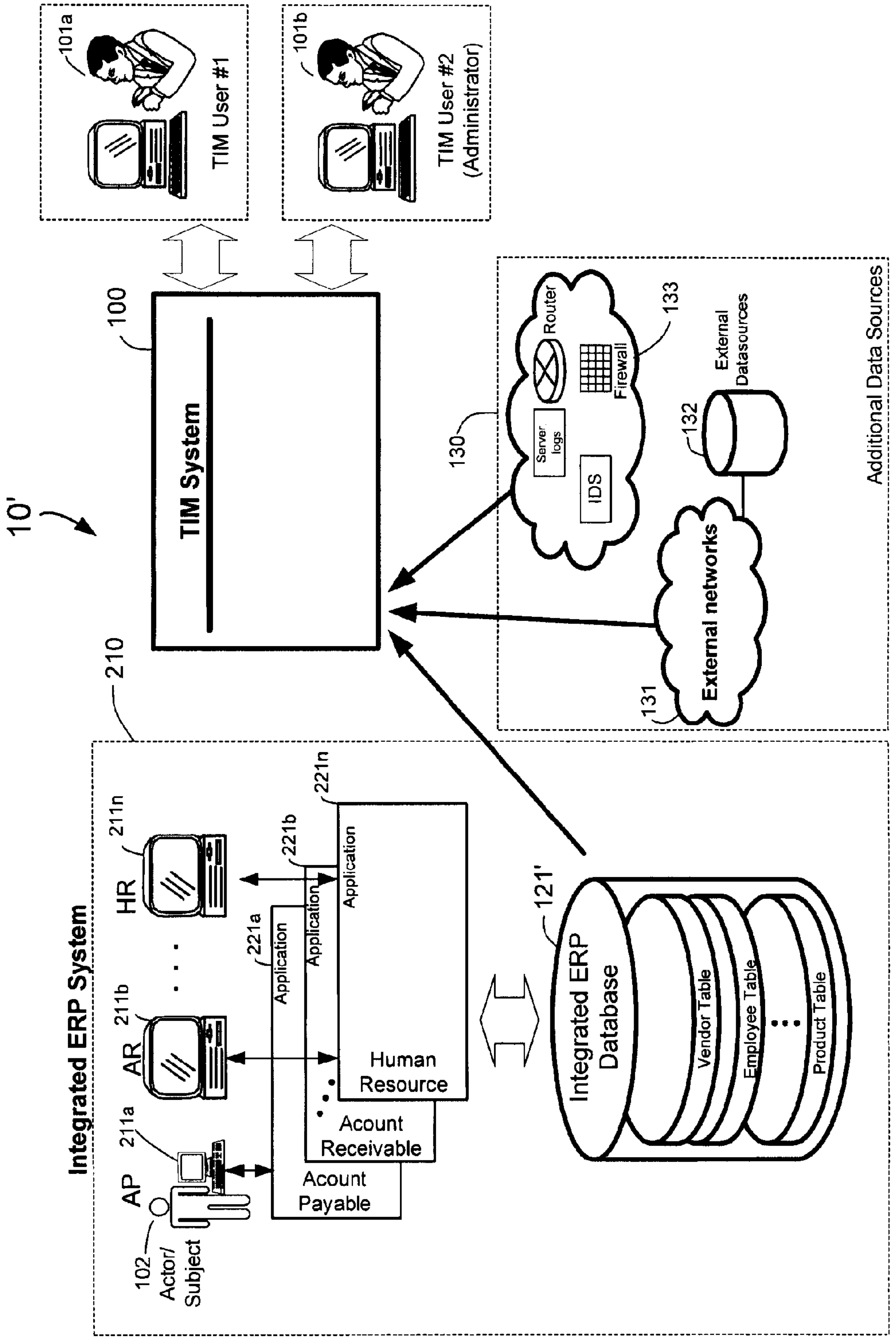
FIG. 2 is an overview of an integrated ERP system environment with transaction integrity monitoring according to other aspects of the present invention.

FIG. 2 illustrates a different (integrated) enterprise environment 110' with which the TIM system 100 is also operative. The known SAP system is an example of such an integrated ERP system. In such integrated environments, an ERP system 210 may consist of an integrated suite of different applications that provide enterprise functions such as accounts payable, accounts receivable, human resources, etc., by way of one or more application layers such as 221*a*, 221*b*, . . . 221*n* running on one or more servers that comprise the integrated comput8ing environment. Such applications may execute by way of individual network-connected computer systems such as 211*a*, 211*b*, . . . 211*n*, accessed by enterprise personnel (actors) 102 who are responsible for generating transactions. In such an integrated environment, the various application layers 221 generate and store data in an integrated ERP database 121', which maintains separate data files and/or tables for the various functions within the system 210, e.g., a vendor table, employee table, products table, and various other database tables that are maintained within the operation of a modern enterprise.

As in a more distributed, disparate, heterogeneous environment like that of FIG. 1, an integrated environment as in FIG. 2 may derive additional data from additional data sources 130 for use in policy determination and analysis, e.g. data from external data sources 132 that are external and independent of the enterprise, or from sources that are associated with or internal to the enterprise such as the IT environment 133.

Those skilled in the art will understand and appreciate that the aspects of the present invention described herein that are shown in FIG. 1 with respect to a distributed enterprise computing environment are equally applicable to an integrated environment such as shown in FIG. 2. Such an integrated ERP environment may not be strictly considered a distributed heterogeneous type system, but more integrated, but the information and the table structures within an integrated environment nonetheless possesses certain heterogeneous properties that are addressed and handled by aspects of the present invention(s). Even in an integrated environment, information in different tables may contain related information that is utilized in implementing enterprise policy. For example, vendor information tables may not map directly to information in employee tables or product tables, etc. Even more specifically by way of example, an enterprise may have a policy that an employee cannot also be a vendor without supervisory authority. In accordance with such a policy, if an employee is found to have the same address and telephone number as a vendor, the enterprise may wish to have an exception indicated and brought to the attention of appropriate personnel.

From the foregoing, it will be appreciated that the principles of the present invention are applicable in both distributed and integrated environments, in that monitored entities are extracted and mapped to constitute one or more monitoring entities stored in the monitoring database as described herein, so as to allow the detection of exceptions that not in compliance with policies or procedures of the enterprise.

FIG. 3 illustrates another exemplary enterprise computing environment 10" wherein a TIM system 100 constructed in accordance with aspects of the inventions is operative—a distributed environment. In such a distributed environment 10", a plurality of ERP systems 301 such as shown at 301*a*, 301*b*, 301*c*, 301*d* are provided to implement the various enterprise functions such as accounts payable, human resources, accounts receivable, etc. These various systems 301 need not be physically located in the same location and can be widespread and dispersed. The ERP systems 301 can be connected to the TIM system 100 by various communication means and methodologies, for example, via dedicated communication line or link 125*a*, a wide area network (WAN) 125*b*, a local area network (LAN) 125*c*, or the Internet 125*d*.

Certain functions of the present invention may be dispersed and separated, and need not be in the same physical location. For example, the extractor 140 and mapper 150 may be dispersed and located at various remote sites and in different configurations. Specifically for example, the extractor 140*a* and mapper 150*a* in connection with ERP 1 can be physically located at the ERP site 301*a*, instead of locally proximate to the TIM system 100. Similarly, the extractor and mapper for an ERP system 301*b* can be located within or proximate to the TIM system 100, such as shown at 140*b*, 150*b*. Likewise, the functions of extraction and mapping can be separated by locating the extractor 140*c* at a remote ERP site 301*c*, with the mapper 150*c* located proximate to the TIM system 100. Those skilled in the art will understand and appreciate that these principle functions of extraction and mapping are readily dispersible, for convenience, and need not be physically located at or near the other components of the TIM system.

Transactional Entities

FIG. 4 illustrates exemplary heterogeneous databases storing information relating to electronic transactions of an enterprise, in the exemplary form of business transactions, with which aspects and embodiments of the present inventions are operative. As will be shown, the present invention(s) are suitable for use in connection with many different types of enterprise computing environments wherein information corresponding to transactions and entities involved in transactions is to be monitored for purposes of implementing enterprise policies, expressed in the ontology of the enterprise. In this regard, FIG. 4 illustrates the notion of exemplary entities and transactions, both of a support variety and of the transactional variety.

It will be understood from the outset that the examples shown in FIG. 4 are meant to be exemplary and not limiting to the specific types of data, tables, entities, and the like. In accordance with the aspects of the invention, ERP applications 114*a*, 114*b* for ERP1, ERP2 with associated databases 121*a*, 121*b* are configured to have data extracted therefrom (or to provide data) that is analyzed in accordance with the principles of this invention. As will be known to those skilled in the art, information in databases is typically stored in one or more data structures or tables, e.g. tables 402, 404. A typical database table comprises a plurality of data records 410, usually a plurality of instances of similar data items. A specific example of FIG. 4 is a first enterprise computing system ERP 1 for accounts payable, with data corresponding to vendors of the enterprise and invoices associated with such vendors, and a second enterprise computing system ERP 2 for a human resource function, with data corresponding to employees.

In this example, the first enterprise computing system ERP 1 has a database 121*a* storing a data structure or table 402 representing an exemplary vendor table for a typical A/P system, having a plurality of data records 410*a*, each record having columns or field identifiers such as name, address, vendor ID, bank account number, contact, etc. In many ERP systems, a vendor would be considered a relatively static entity, because vendor information tends to persist over an extended period of time.

The second and different enterprise computing system ERP2 has an associated database 121*b* relates to the human resources function, which stores a data structure or table 404 comprising of a plurality of data records 410*b* that identify employees of the enterprise. Each record of such an employee table 404 has field identifiers such as name, address, bank account number, social security number (SSN), and other related information. Typically, employees are also considered static entities, because data records associated with employees tend to persist within the records of the organization over an extended period of time.

The example of FIG. 4 also illustrates a different and more transient entity, namely, invoices of various vendors of the enterprise. The database 121*a* of ERP 1 also stores an invoices table 406, which comprises a plurality of data records, each record relating to a single invoice. The invoices table 406 provides a function of tracking invoices from vendors and whether such invoices had been paid. The exemplary invoices table 406 in FIG. 4 consists of a plurality of data records 410*c*, each record having fields identified as vendor ID, invoice number, amount, status, and other information related to invoices and payments.

Invoices are an example of transactions that are transient entities, as the term in understood in the present invention, because such entities typically tend to exist in greater numbers relative to static entities, are related to one or more particular static or support entities, and there tend to be a plurality of such entities respect to a single static entity, e.g. a single vendor may have issued multiple invoices to the enterprise over a predetermined period of time.

It will be understand that the present invention is operative with both static and/or support entities, as well as transient and/or transactional entities, in that different instances or versions of each of these entities may exist over time. In accordance with the invention and as shown by way of example in FIG. 4, the disclosed TIM system 100 is operative to extract information relating to monitored entities such as vendors, employees, invoices, etc. from the various monitored databases 121 of the enterprise computing systems, generate a reduced subset of such information, and store such a reduced subset in the monitoring database 175 as monitoring entities.

Either static or transient entities, but especially static entities, can exist over time as different versions of the same conceptual entity. Conceptually, a particular vendor is always the same person, but that vendor's name may change, its address may change, its bank account may change, its telephone number may change, but the conceptual entity remains the same. Over time, the data representing this entity may change. Some ERP systems do not provide for robust version change tracking, or provide adequate controls or supervision over changes to entities. Unauthorized or hidden changes to information about static entities is known as a classic pattern of fraud for many organizations and enterprises, and a typical subject for an enterprise policy that detects certain types of changes to static entities, or requires supervisory permission and an auditable record.

It will be understood that the creation of any entity, whether static or transient, is the creation of a transactional entity. Creation of a vendor or new employee (both relatively static entities) involves a transaction that is initially a transactional entity (the data involved in the creation); that entity may later be considered a support entity. Issuance of an invoice or purchase order involves a transaction that is a transactional entity. A change to a vendor or employee also involves a transaction that is a transactional entity, as does a change to an invoice or payment. Any entity becomes a support entity and can be referred to or utilized in policy statements.

For example, an entity such as a vendor can originally be created with a first address, thereafter changed to a different address at a later point in time, and thereafter changed again to provide a different bank account number for receiving payments, and thereafter changed yet again to undergo a name change from a corporation to an LLC. Throughout such changes, of which three have been given as an example, the basic entity remains conceptually, logically, and legally the same, yet certain information relating to the entity was changed over time.

Similarly with respect to transactional entities such as invoices, an invoice will typically have a predetermined and fixed invoice number, but could have different and changeable information such as date, amount, items identified, and the like.

In accordance with aspects of the inventions, the state of a given entity is captured in an initial or master extraction so as to provide an initial data set representative of data in the enterprise at an initial point in time (e.g. a snapshot). Thereafter, each change to a certain entities, whether static entities or transient entities, as required by enterprise policy statements, is captured by operation of the invention and stored as monitoring entities in the monitoring database and analyzed in accordance with policies of the enterprise, as expressed in the policy statements that execute on the monitoring database, for purposes of detecting exceptions in the form of anomalies, duplications, duplicate payments, violations of company policy, and the like.

Still referring to FIG. 4, in accordance with aspects of the invention, a reduced subset of information relating to monitored entities extracted from the monitored databases 121 is initially obtained during a master or initial extraction or data load, by operation of the master extractor 141*b* (FIG. 1). In the example of information from the vendor table 402, the master extractor obtains a plurality of data records relating to selected information from the vendor table 402, reduced to provide a limited set of fields of information in accordance with the enterprise ontology, which are then mapped according to the enterprise ontology. This initial and master extraction comprises a collection of data records at a point in time t1 of the master extraction. This is diagrammatically represented as the table 420, showing a plurality of entities represented as vendor 1 at time t1, vendor 2 at time t1, . . . vendor n at time t1. It will understood that a master extraction typically comprises a replication of at least portions of the vendor table 402, extracted and temporarily stored in the staging database 155, prior to reduction and mapping into the monitoring entities by operation of the mapper 150. The reduced subset of information, mapped in accordance with field names and other parameters corresponding to the system ontology, is then stored as a plurality of monitoring entities in the monitoring database 175.

Subsequent extractions of information from a table in a monitored database, for example, the vendor table 402, is represented at different points in time by different data entries and stored in the monitoring database 175, for example in a vendor table 430 that represents different versions of the same entity (Vendor 1) at different points in time. Considering the example of the modified vendor discussed above, which occurred at different points in time t1, t2, t3, etc., the subsequent extraction comprises a plurality of records relating to vendor 1 at different points in time. For example, the change to the address of vendor 1 subsequent to the master extraction at time t2 appears as a separate entry in the monitoring database, and the change in bank account number of vendor 1 that occurred at time t3 is yet another entry in the monitoring database 175. It will thus be understood and appreciated that operation of the present invention allows the capture of the state and/or status and/or versions of a particular entity, such as particular vendor, as it might exist in various points in time during the life of that entity. Operation of the policy statements against the various entities at different points in time allows the comparison of fields of information for different "versions" of the same entity, which thereby facilitates the determination of improper actions with respect to particular entities.

Although the foregoing example of a vendor change is described in connection with a static entity such as a vendor and a vendor table, it will be understood and appreciated that the same principles apply to more transient transactional entities such as invoices, checks, vouchers, insurance claims, refunds, returns, and virtually any other type of transaction maintained within the data processing systems of an enterprise.

In accordance with aspects of the invention, transactional entities that originate within enterprise systems (such as vendors, invoices, etc.) have a virtual counterpart as transactional entities in the monitoring database. For example, support entities such as vendors in source table 402 are mapped into a corresponding table(s) such as vendor table(s) 420, 430 in the monitoring database 175, and entities such as invoices in source table 406 are mapped into a corresponding table such as invoice table 440 in the monitoring database 175.

Exemplary Static Entity

Changes & Metadata

With the foregoing principles relating to changes to static entities over time, turn next to FIG. 5 for an explanation of an exemplary sequence of transactions relating to changes to an exemplary static entity, namely, that of a typical vendor. The example in this figure illustrates a number of individual transactions relating to a particular vendor (Widget Company) that has undergone changes to selected information, for example, address and bank account identifier. Each change to the information associated with the vendor is captured by operation of the disclosed TIM system 100 and comprises a changed entity. Each change comprises a separate transaction 501, 502, 503, 504, 505. Each transaction is stored in the monitoring database 175, with versioning information that allows determination of the changes that have occurred over time and who made such changes.

In the example of FIG. 5, the entity being monitored is vendor Widget Co., which is identified in each transaction 501-505 by a vendor ID field in each transaction. Each transaction results in a change to the version number of the vendor entity, identified by the field Revision_ID. FIG. 5 shows five different versions of the vendor, at five different points in time, starting at revision 1 as shown at entry 501. Entries 502-505 show subsequent versions of vendor Widget Co., over a period of three years. In particular, transaction 502 shows an address change, transaction 503 shows a bank account change, transaction 504 shows another address change (back to the initial address), and transaction 505 shows another bank account change (back to the initial bank account).

As an example of the operation of the invention, consider that the enterprise has a policy that indicates an exception in the case of a vendor address change and bank account change followed by a changeback within a short period of time. Such an exception would be determined and reported in accordance with aspects of the invention. Although this example is given in the context of a financial type transaction, it should be understood that invention has applicability to other types of transactions including security applications, IT infrastructure, personnel management, health care, banking and financial institutions, logistics, and virtually any time of activity that involves an electronic record or transaction.

Still referring to FIG. 5, in accordance with aspects of the invention, predetermined metadata 510 is associated with each entity upon storage in the monitoring database so as to facilitate preservation of a historical record (versions) of the entities over time. This metadata typically includes, by way of example: an actor identification (such as the name of the person that effected the change to the entity, indicated by an Actor field), a timestamp (identified by the field Update_Time), and a revision number (identified by the field Revision_ID). FIG. 5 illustrates that revision 3 of the vendor Widget Company experienced a change to the bank account identifier from 123453 to 123456.

The initial metadata of actor, timestamp, and revision number is associated with initial selected data 515, to create the initial record for vendor Widget Company during the master extraction. It will of course be appreciated that subsequent changes to various information associated with the vendor Widget Company includes different metadata identifying the actor, timestamp, and an assigned revision number, to each subsequent change, for record keeping purposes.

System Main Execution Loop and Configuration

FIG. 6 is a flow chart of a computer-implemented process 600 for effecting the principal components of a transaction integrity monitoring system 100 constructed according to aspects of the present invention. From the discussion in connection with FIG. 1, it will be recalled that the various components of extractor 140, mapper 150, CORE 160, knowledge maintenance 170, and analysis engine 180 all cooperate to effect aspects of the inventions. Process 600 illustrates the principal operative components of extractor, mapper, and CORE. Starting at step 602 and looping at step 610, the process 600 begins by running programs 604 for implementing the extractor 140, then programs 606 for implementing the mapper 150, and then programs 608 for implementing the CORE 160. These programs run repeatedly and continuously, so as provide for continuous, near real time operation to detect policy exceptions. Although these processes are shown sequentially, they can be implemented asynchronously and independently. The processes for knowledge maintenance 170 and the transaction analysis engine 180 are user-driven and asynchronous to the process 600, and are described elsewhere herein.

Those skilled in the art will understand that the system 100 will require initial configuration with predetermined information so as to allow their various functions to execute. A system constructed in accordance with the present invention(s) is configured by an administrator or other authorized user, prior to operation. Such configuration involves establishment and expression of the enterprise policies in one or more enterprise policy statements, determination of the manner of extraction of data from monitored databases and providing extraction data, and determination of the mapping or normalization of data in the monitored databases to the enterprise ontology, so that extracted data can be stored in the monitoring database for out-of-band operations and exception detection and management.

FIG. 7 is a pseudocode listing of a computer-implemented process 700 for system configuration that may be invoked through a user interface by an authorized user such as shown at 101 in FIG. 1, for example an administrator. Access is provided to the TIM system 100 for purposes of inputting information required by the various components. In accordance with known computer security techniques, user name and password security or other security mechanisms are preferably employed to control or limit access to the configuration functions to trained and authorized users, in particular administrators who are knowledgeable as to functions of the system and information requirements.

The process 700 includes several subsidiary program functions, including ConfigureExtractor, ConfigureMapper, ConfigureCore, and ConfigureWorkbench. These program functions or routines provide for configuration of the extractor 140, mapper 150, CORE 160, and aspects of the analysis and reporting functions 180, respectively.

The ConfigureExtractor routine includes steps for specifying enterprise systems or other data sources from which data is acquired or provided, as well as specifying primary key fields, field identifiers, filters, context, and parameters of accessing remote data sources. From FIG. 1, it will be recalled that the extractor 140 may be of various types, including a programmatic extractor 141*a*, master extractor 141*b*, a resync extractor 141*c*, a log extractor 141*d*, environmental source extractor 141*e*, or an external source extractor 141*f*. The principal information required in the extraction functions is the identification of the particular databases for which information is to be extracted, tables of such databases, any file pathnames required to access the tables, any routing information such as network or MAC addresses of particular computer systems, and, in certain cases, the identification of particular fields within particular tables that should be extracted if during an extraction fewer than the entirety of a table is to be obtained.

The ConfigureMapper routine includes steps for specifying parameters and aspects of the staging database 155, the monitoring database 175, the ontology files, entities involved or identified in an ontology, mappings of data items for entities, and other contexts and parameters. Configuration of the mapper as utilized in the present invention comprises identification of particular data tables and fields of data provided by an extraction from a monitored database, and maintenance of the relationship between such particular tables and fields of the monitored database with corresponding tables and fields of the monitoring database. Such information is reflected by and stored in the enterprise ontology. The ontology in particular represents the mapping of fields from monitoring databases into particular selected fields of the monitoring database.

The ConfigureCore routine includes steps for defining a set of policy statements or frames, including identifying the transaction involved in the policy, any required support entities, any indicators of the policy, and other frame or policy parameters. This routine enables a user to access to stored policy statements (as expressed in XML frames in the disclosed embodiment) so as to create new statements, update existing policy statements, activate or deactivate particular statements, change the sequence of statement (frame) execution, and provide any other required administrative functions for determining or modifying the logic or expressions associated with frame execution.

The ConfigureWorkbench routine includes steps for configuring access to the monitoring database (to obtain related entities), setting usernames and permissions, and configuring any reporting functions of the system. This routine enables a user to input or correct information associated with the analysis server, such as the configuration and contents of reports, alarms, status, cases, and other information associated with the provision of information relating to exceptions as determined by operation of the TIM system 100. Further details are provided below as to specific user interfaces relating to case management and reporting functions.

The process 700 operates in a continuous loop to monitor for user input, receive authorization information in the form of user name and password, test for a condition for actuation of one or more of the configuration functions, and permit access to the desired configuration function through a user interface (not shown) applicable to the informational requirements of the functions being configured.

Extractor

General Overview

Turn next to FIG. 8 for a detailed written description of aspects of the data extractor 140 and its operation to extract or retrieve information from various enterprise databases (data sources) and provide such information to a staging database 155 prior to a mapping operation by a mapper 150. As discussed in connection with FIG. 1, the data extractor comprises six principal components: a programmatic extractor 141*a*, a master extractor 141*b*, a resync extractor 141*c*, a log extractor 141*d*, an environmental extractor 141*e*, and an external source extractor 141*f*. Aspects of each of these different types of extractors will be discussed in turn.

FIG. 8 is a pseudocode listing of a process 800 for the extractor 140, and illustrates aspects of the subcomponents of the extractor. An extractor knowledge file (extractor file) is provided for each data source from which data is obtained for use in policy compliance analysis. Extractor files (data) are stored in the knowledge base 165. For each data source, an initial extraction is effected by a MasterExtractor routine to obtain an initial set (or selected subset) of data from the data source, which is typically stored or cached in the staging database 155. Subsequent to an initial extraction, a routine SyncExtractor is run to maintain databases between the staging database and source databases in synchronization, at an interval determined by a parameter SyncInterval. If a log file is used to provide changed data, a LogExtractor routine is run. If data is provided programmatically from a data source such as an SAP ERP, a ProgrammaticExtractor routine is executed. The process 800 runs repeatedly in a loop, as data extraction is a repeated, continuous operation.

A system constructed as described herein pulls data from various and sometimes heterogeneous sources, such as ERP systems, network logs, and other enterprise systems, hereinafter referred to as "source" systems, transforms the information via the enterprise ontology, and populates the monitoring database, also called the "target" system or database.

It will be appreciated that data corresponding to monitoring entities must be pulled frequently, preferably continuously, but not necessarily in real time. This minimizes the chance that fraudster can cover tracks by changing data back. Near real time data extraction is preferably in the range of several minutes, although this time period is arbitrary. In cases where data is retrieved by way of a detailed log (e.g., an audit log), frequency of extraction is less important since all changes to the ERP databases are logged anyway.

As discussed above, if updates to entity information are pulled via a change log, preferred embodiments provide for initial population of the target database utilizing the mapping transformations required by the enterprise ontology. Furthermore, because of the possibility that the source and target data will get out of synchronization if a change log is exclusively used, the resync extractor 141*c* provides for resyncing the data between a source database and the target database. Those skilled in the art will understand that re-syncing is a snapshot mechanism, so frequency is an important parameter. Non-log changes are believed to occur in batch jobs, so that daily or nightly resyncing is preferred.

Applications of the present invention will draw data from enterprise source systems comprising ERP system manufactured by various vendors. It is important not to disrupt the mission-critical operational system of an enterprise. Preferably, therefore, data extraction is usually in the form of simple queries, without additional constraints, joins, or follow-on queries.

In some aspects of the invention, target entity tables in the staging database or in the monitoring database are not necessarily exactly copies of the source tables. Table names, fields, data types, and even values may have to be transformed according to the system ontology. In accordance with aspects of the invention, each update in a source entity that is monitored should result in creation of a new "revision" created in the target or monitoring database. This advantageously allows the TIM system to retain and reason about past updates. Further details about this mapping are provided elsewhere.

The programmatic extractor 141*a* is operative in connection with data sources that do not provide for direct query access to data contained in the databases, for example certain SAP ERP systems. Further details of the programmatic extractor are provided below.

The master extractor 141*b* is operative for an initial or master data extraction, at initial start up of a TIM system 100 constructed in accordance with the present invention. According to certain aspects, an entire initial dataset, which may consist of entire data tables representative of a "snapshot" of the state of the enterprise data at initial point in time, is obtained by the master of extractor 141*b* and provided to the staging database 155. Those skilled in the art will understand and appreciate that the master extractor 141*b* is preferably a high-speed data interface that retrieves information at the maximum rate possible from connected ERP systems with immediate storage in the staging database 155, without any further data processing operations, to minimize the data processing load on the ERP system. Subsequent operations of mapping may therefore be done "out of band" relative to the operation of the ERP systems, to minimize the impact on time responsiveness and other operations. Further details are provided below.

The resync extractor 141*c* provides for a synchronization operation between the monitoring database and any associated monitored (source) databases, typically on a periodic basis, to compensate for loss of data synchronization that can occur over time, e.g. by reliance on log files. Further details are provided below.

The log extractor 141*d* provides for data extraction based on information provided by a data source in the form of a log or audit file, which typically contains selected information identifying a change to an entity. Further details are provided below.

The environmental source extractor 141*e* provides for data extraction from data sources associated with the system environment of an enterprise, e.g. its IT infrastructure such as firewalls, intrusion detection devices, routers, servers, etc. Such information is typically additional or supplemental to entity information, and can provide corroborating evidence for instances of errors, fraud, or misuse. For example, a repeated pattern of failed username/password attempts to an enterprise system might be indicative of a hacking attempt. If a user is finally successful in gaining access to a system (i.e. guessing the password), and thereafter perpetrates a fraudulent payment request in an A/P module using the same username, the log file of failed access attempts indicates that it is likely that the fraudulent payment transaction was likely generated by the same person that hacked the password after several failed attempts.

The external source extractor 141*f* is an interface to external data sources, e.g. public and/or proprietary data sources, that might provide supplemental information utilized in implementing certain enterprise policies, e.g. verification of a driver's license number, or a telephone number in an online telephone directory, or other similar data source that is not necessarily a direct part of the enterprise's computing infrastructure.

The disclosed embodiments of the TIM system 100 and methods thereof are operative with various different classes of data sources. One type of data source is a synchronous polling type database, such as PeopleSoft. In the case of this type of data source, the extractor preferably makes a JDBC connection to a database table and pulls its contents into the staging and/or monitoring database for further processing.

A second type of data source is a synchronous polling type database with an RFC/API. For this type of data source, the extractor uses an external system API and protocol to poll for new information that can be retrieved, transformed, and loaded into the staging and/or monitoring database. This type of data source includes SAP R3, and constitutes a programmatic type extraction.

A third type of data source is an asynchronous event broker type system. For this type of data source, the extractor must register with a data broker that sends events asynchronously as transactions as state changes occur in the enterprise system. Examples of this type data source include PeopleSoft EIP and SAP Netweaver type event brokers.

A fourth type of data source is an asynchronous file sending type system, such as SAP R3 ABAP cluster table. For this type of data source, the extractor initiates a program or script on an external machine that provides the actual extraction from the data source. Upon completing the extraction the external program sends the data to the extractor. This type of data source also constitutes a programmatic type extraction.

Each data extractor 141 makes reference to extractor data in the form of an extractor file stored in the knowledge base, for information specific to the data source from which data is extracted. In this regard, FIG. 9 illustrates an exemplary extractor file 900 according to aspects of the invention. Typically, each extractor file provides predetermined information needed to (a) access a particular data source, and (b) determine what specific data from that data source is to be obtained, i.e. what particular fields from what particular tables, and (c) where that data is to be stored or cached in the staging database. Thus, the exemplary extractor file 900 includes parameters or tags for a description of the extraction <description>, identification of the data source <extractor_name>, a source table identifier in the data source <source_table>, a target or destination table identifier in the staging database <staging_table>, one or more key fields <key_field> that identify keys to table(s) that are to be extracted, and one or more data fields <field> that identify particular data fields that are to be extracted. If desired, filters and queries can be embedded into the file to filter or retrieve particular data items.

FIG. 10 illustrates a multi-stage data extraction in accordance with aspects of the inventions. The numbered arrows indicate a typical sequence of data extraction for use in carrying out the invention. Typically, the master extractor 141*b* (or an initial run of a programmatic extractor 141*a*, if a data source requiring programmatic extraction is utilized to provide transaction data) is run first to obtain an initial data set and store that initial data set in the staging database 155. This is shown by the arrows labeled "1". Next, changed data is typically identified, by use of (a) a programmatic extractor 141*a* if the data source provides data in that manner, or (b) a log extractor 141*d* if changed data is identified by reference to audit or transaction logs, or (c) a resync extractor 141*c* if a resynchronization operation between the ERP database 121 and staging database has triggered. Such change data identification is shown by the arrows labeled "2". Next, any external data or environmental data from additional data sources 130 is pulled in by operation of an external data extractor 141*f* or an environmental extractor 141*e*. Such additional data is shown by the arrows labeled "3". In this manner, data is obtained from multiple, possibly heterogeneous, distributed, and disparate systems for use in policy analysis and exception determination.

FIG. 11 provides an example of how changed entities are detected and identified, by receipt of changed data from an exemplary ERP database 121. Table 1110 illustrates an exemplary vendor table that shows a plurality of support entities, i.e. vendors in an accounts payable system, at an initial data load or extraction by a master extractor, at time t1. Assume that an actor makes a number of changes to information related to a particular vendor, say Vendor 1, over a period of time, e.g. an address change, a bank account change, and address change back to the original address, etc. Table 1120 illustrates a plurality of prior versions of the entity Vendor 1 at various points in time t1, t2, t3 . . . up until a current version at time t_last_update. Assume a series of further updates (changed data) to Vendor 1 occur; these are new data that are pulled into the staging database by the log extractor or resync extractor (as applicable). These new changed data items 1122 are shown as entities Vendor 1 @ t_new__1, t_new__2, t_new__3, etc. in the table 1120. These new entities (new versions of Vendor 1) will be transformed into monitoring entities by operation of the mapper 150, which creates monitoring entities corresponding to these new versions of Vendor 1 in the monitoring database 175.

From the foregoing, it will be understood and appreciated that aspects of the invention involve an initial data load to obtain an initial set of data that is analyzed for exceptions, followed by a "detect changes" type operation to minimize the load on the ERP systems by extracting changes to certain entities, as reflected by changed data.

Programmatic Extractor

As mentioned above, a programmatic extractor 141*a* is utilized for enterprise databases that do not permit direct extraction. Those skilled in the art will understand that certain types of enterprise systems do not permit direct access to data tables or information stored therein. For example, certain SAP products do not provide an interface for external queries to data stored within its databases. However, the SAP product provides a scripting language that allows users to write programs to cause the export of selected data for external use. The SAP system and other similar systems output information in response to internal execution of such a script or program. The programmatic extractor 141*a* therefore represents the combination of (a) a scripting element operative internally to systems such as SAP that do not provide direct data querying, for internal retrieval of selected data and exporting such selected data, (b) a communications interface or file transfer mechanism for communicating data exported, and (c) a software component in the extractor 140 responsive to exported data from a scripting type export operation, for receiving this data and transmitting the data to the staging database or for other utilization, e.g. in the case of staging database bypass for small amounts of data that do not require staging to minimize performance degradation.

The system SAP R3 does not provide a data extraction interface that allows direct integration with an application program interface (API) that would permit direct data extraction. Nor is it possible to integrate directly with the underlying SAP database due to the presence of proprietary cluster tables. As with other types of ERP systems, SAP R3 contains many tables that will contain information comprising entity data. With some systems, a synchronous database query protocol can be used to periodically replicate tables of interest from SAP R3 into the monitoring database. It will then be possible to reuse existing algorithms to handle merge and loading behaviors.

However, many high volume data entities are stored in SAP R3 as "cluster" tables. These kinds of tables essentially store information as a column set for a table, in a single compressed proprietary data block inside a column in the cluster table. Other columns in that roll contain metadata such as key fields and values so that the "cluster" of data can be accessed and read or written as needed. The cluster table storage method used by SAP presents an issue for data extraction because there is no published specification for the compression algorithm or the data format used in the cluster. In such cases, and with other similarly constructed systems, information stored in cluster data can be made in R3 open SQL interface. An open SQL interface is available to ABAP programs as an internal API.

Accordingly, it will be understood that programmatic extractor 141*a* is invoked externally, but essentially comprises an independent process effected by a script or code 1210 that runs within a clustered type environment such as that provided by SAP, and returns a reply containing requested information to the programmatic extractor 141*a*. In this manner, the programmatic extractor 141*a* provides a synchronous source interaction with data storage systems of this nature.

FIG. 13 is a pseudocode listing of exemplary computer-implemented process 1300 for a programmatic extractor. The illustrated process EnterpriseSystemPlugin illustrates the steps taken within a system (such as SAP) that requires programmatic extraction, and corresponds to the process 1210 in FIG. 12. Essentially, this process queries for changed data fields to any updated tables within the ERP system, and exports or transmits that data to the TIM system 100, where it is received by the programmatic extractor. The process ExtractorListener provides steps within the programmatic extractor for receiving data from the EnterpriseSystemPlugin process, determine if any new rows of data (new data records) have been created, and insert the appropriate selected data items that are received into corresponding fields in the staging database. Similar steps are taken in the event of updated records or fields as opposed to new data records.

Master Extractor

FIG. 14 is a pseudocode listing for an exemplary computer-implemented master extraction process 1400 in accordance with aspects of the invention. Typically, a master extraction is a one-time operation to pull in a significant initial data set from a data source such as an enterprise system. This process typically involves steps for initializing a connection to the data source from which the master extraction is to occur, followed by steps of querying selected rows (fields) for all rows in all tables identified for the extraction, as specified in the corresponding extractor file. After the query and data is received, the data is inserted as new rows in the staging database 155, and the database connection is closed.

Other conditions for triggering a master extraction can occur, for example, in the event that a system administrator determines that the monitoring database is grossly out of sync with a monitored database and elects to "start over" with a new master data extraction. Other equivalent conditions for a master data extraction will occur to those skilled in the art.

Log File Data Extraction

FIG. 15 illustrates aspects of a transaction log file 1500, provided as a means for extracting information from certain types of data sources. The log extractor 141*d* is responsive to a log file 1500 to process the log file and extract data from an ERP system in accordance therewith. An exemplary transaction log file 1100 comprises a plurality of entries 1502, each typically including certain log file metadata 1504 relating to the information such as a timestamp, identification of a user or actor responsible for making the change or creating the log entry, and other relevant information relating to the entry. Relevant database updates are also provided as a part of the entries 1502 and identify particular fields and values of the changes to data indicated by each record in the transaction log file. For example, the entry 1502*a* indicates that a vendor AAA Inc. was added to a vendor table, entry 1502*b* indicates that a purchase order was issued to the vendor identified as AAA Inc., while entry 1502*c* indicates that a new vendor BBB Inc. was added to the vendor table. All these transactions were effected by the same actor, John Doe, as indicated in the metadata.

A log file might, or might not, provide the actual information that is desired for storage in the monitoring database. If so, no further data extraction operations would be required. If not, the log extractor 141*d* executes instructions to query the relevant database and obtain the needed data.

FIG. 16 is a pseudocode listing of a computer-implemented log extractor process 1600, according to aspects of the invention, operative to implement a log extractor 141*d*. As with many other processes and aspects of the present invention, the log extraction process 1600 operates as a continuous loop testing for the conditions that trigger a log extraction operation. For example, such conditions include the inquiry of a file that contains a list of unprocessed log files, or at a predetermined time.

As known to those skilled in the art and as illustrated in FIG. 15, a log file comprises a list of transactions, comprising metadata and other information that corresponds to the transactions are involved. An initial step is to receive a log from a data source that has new data or changed data. The log file is inspected for new log entries. For each new log entry, a temporary row is created in a temporary file or table, metadata from the log is appended (if not provided in the log), a query is made to the data source to obtain selected data fields for the record (row) involved in the addition or update, and upon receipt of the data from the data source (or parsing from the log file, if the data is provided embedded in the log file), the data is added to the temporary file. Then, for each row in the temporary file or table, a determination is made whether there is new data (a new row) or updated data (updated fields in existing records or rows), and the data for the selected fields is inserted into the staging database. Status data (such as a "modified" flag and/or timestamp) is further appended to flag the data as new or changed, for the mapper or other processes.

Resync Extractor

FIG. 17 is a pseudocode listing of a computer-implemented resync process 1700 according to aspects of the invention that comprises the operations of a resync extractor 141*c*. As with other processes described herein, the process 1700 operates in a continuous loop testing for the conditions that call for a resync type extraction. Examples of such conditions include the passage of a predetermined amount of time, or at a predetermined time such as the same time every day, night, week, etc. Another condition is the indication by other processes, not shown, of an out-of-sync condition between a data source and the staging database.

A re-sync or resynchronization operation essentially ensures consistency of data between a data source table and a corresponding table in the staging database. Such an operation is typically run periodically so as to ensure that the source tables and staging database table reflect the same information.

The resync process 1700 includes steps for determining new and modified rows in a table of a data source, and creating new rows in the staging database for any new records added that were not previously detected or identified in a log file. The process typically applies to each data source table that has a counterpart in the staging database. A procedure DetermineNewAndModifiedRows is operative to compare the contents of the tables in the data source table and the corresponding staging database table and determine if any new rows have been added or any fields of existing rows were changed. If so, the staging database table is updated.

Additional Data Sources Extraction

Although not directly illustrated, extraction processes similar to those described above are effected to obtain additional data from additional data sources such as external data sources 132 and environmental data sources 133 (FIG. 1). Those skilled in the art will understand that computer programs or processes substantially similar to those above are utilized to extract and obtain additional data from such additional data sources for utilization in policy statement compliance monitoring.

Mapping of Monitored Entities to Monitoring Entities

With the foregoing extraction processes and structure having been described, turn next to FIG. 18 for an illustration of an exemplary data extraction of a series of related business transactions and transformation of the data into monitoring entities, to illustrate the process of data captured by the extractor 140 in accordance with aspects of the invention. On the left hand side of the figure is a series of business transactions that comprise monitored entities in accordance with the invention. Such entities are identified as vendor account creation 1802, purchase order processing 1804, purchase receiving 1806, invoice and vouchering 1808, with the final step of payment issued 1810. In accordance with the invention, data corresponding to these various transactions generated by the responsible and monitored ERP system are (1) extracted from the data source in which electronic transaction representing these business activities are stored, (2) stored in the staging database, (3) transformed by the mapper into monitoring entities, and (4) stored in the monitoring database as monitoring entities. As monitoring entity, each transaction is identified with an entity name (e.g. a vendor account creation activity 1802 becomes an Account Created monitoring entity 1813) and associated with metadata 1812 including a timestamp, actor, and revision number, to facilitate tracking and comparison of entities representing such transactions historically and comparatively in the event that changes are made in violations of enterprise policy.

For example, the vendor account creation transaction 1802 generates an Account Created transactional monitoring entity 1813, bearing revision 1, with a timestamp as shown, with the actor indicated as John Doe. This is an example of a static monitoring entity in that the creation of a vendor account within an ERP system will tend to persist for an extended period of time. The subsequent transactions with monitoring entity names PO Issued 1814, Received Purchase 1816, Invoice Received 1818, and Payment Issued 1820 are considered transient or transactional entities. In accordance with aspects of the invention, each of these transactional entities is recorded in the monitoring database as monitoring entities, with appropriate metadata.

Mapper

FIG. 19 schematically illustrates the operation of the mapper 150 in accordance with certain aspects of the present invention. The mapper 150 operates in accordance with information stored in an ontology source table 1911 that comprises the enterprise ontology with respect to the particular data source involved in an extraction. The ontology source table 1911 contains information that correlates tables, fieldnames, field parameters, data types, etc. from various enterprise source databases to corresponding tables and fields in records comprising monitoring entities stored in the monitoring database 175. For example the ontology source table identifies particular tables and fields in the ERP database, e.g. tables 1916, 1918, 1920. The mapper effects various transformations and renaming required to store data sourced from theses ERP database tables as entries in the monitoring database.

According to an aspect of the invention, information required by the mapper to conduct its mapping and transformation operations is provided in an ontology file and a mapper file retrieved from the knowledge base. An exemplary ontology and mapper files are discussed elsewhere herein.

According to another aspect of the invention, information required by the mapper for its operations is provided in an ontology target table 1912 that provides information that identifies field names and parameters of the data, after mapping, as the data is stored in the monitoring database. The ontology target table 1912 also identifies what metadata 1915 is associated with each entity provided by an extraction. Examples of metadata include but are not limited to a revision identifier (Revision_ID), a unique entity identifier (Entity_ID), an entity version (Entity_Version), a person or actor associated with the transaction (Actor_ID), and a timestamp or time identifying the last update to the entity (Update_Time). Other types of metadata can also be utilized for other purposes, for example, a unique object identifier could be generated and assigned to the entity as it is reflected in the monitoring database.

The mapper carries out the following basic steps: (1) map an ERP source table name to a target table name in monitoring database; (2) map a source table field name to a target table field name in the monitoring database; (3) if required, map a predetermined set of source field values into single target field value (e.g., if multiple address lines are provided in a source table that are mapped to a single data item or field in the target table); (4) collapse any required "child" tables into a single parent entity and a target table in the monitoring database; (5) populate metadata fields in the target table including revision identifier, entity identifier, entity version, actor, and update time; (6) for each new entity revision for an entity preexisting in the monitoring database, duplicate the existing monitoring entity and create a new revision, i.e., in the monitoring database table.

If a change log approach is used for information from the ERP databases, which often records individual field updates in ERP databases as separate entries, changes to a particular entity that occurred within the same transaction (as determined by the change time and actor ID) are preferably combined into a new entity revision.

The mapper 150 may further require a query to a source database in the event that certain information needed to create a monitoring entity is not immediately available from an entry provided. For example, an address record update for a static entity such as a vendor or employee might not contain a reference to the particular address information that constituted the address change. If the ERP system is so constructed, this information must be obtained via a query from the source database. It will be understood that information could potentially be obtained from the target or monitoring database, obviating a copy of additional information from the ERP system.

It will be appreciated that the mapping operations conducted by the mapper 150 could, were such operations not segregated to separate computing processes, create an additional load on the ERP systems data processors. In accordance with the aspects of the invention, the staging database 155 provides a cache of information from the source databases, thereby facilitating mass copy operations from the ERP system. Such a caching architecture is more computationally efficient than conducting mapping operations in real time as data is received, and reduces the data processing load on ERP systems. This is believed to provide a significant architectural advantage for embodiments of the present invention. It will therefore be appreciated that this architecture minimizes the complexity and computational load on any component that runs remotely from the TIM system 100. Furthermore, the partition of functionality into logical steps of extraction, caching, and mapping provides for an architectural separation of functions and asynchronous operation to improve performance.

It will thus be appreciated that an asynchronous architecture with staging database caching allows the processes of extraction and mapping to optimize the rate at which data is provided from ERP systems, and that mapping operations can occur out-of-band (i.e. offline), at times when ERP systems have reduced workload, to improve performance.

FIG. 20 is a pseudocode listing for a computer-implemented process 2000 for effecting a mapper 150, in accordance with aspects of the invention. As with other computer-implemented processes described herein, process 2000 is preferably implemented as a computer program that executes on a computer system that runs the TIM system 100. As in other processes, the mapper process 2000 runs as a continuous loop testing for conditions that trigger its execution. Such conditions include the detection of new data in the staging database 155, or the provision of a command or parameter indicating it should run, or other similar condition.

The process 2000 comprises steps for creating tables in the monitoring database, retrieving data from the staging database, conducting transformations and renaming of selected fields in accordance with the enterprise ontology, and storing the transformed data in monitoring entity data records in the monitoring database. A process CreateTargetTables reads an ontology file corresponding to the particular data source that is providing entities for processing, creates a table in the monitoring database, creates meta data for the table such as pointers to related entities and predetermined text that displays in connection with the entity.

A process Mapper comprises steps for opening a connection to the staging database 155, opening a connection to the monitoring database 175, reading a corresponding mapper file to obtain information required for the data renaming and transformation (which may include base mappings provided with the system as well as custom mapping resulting from a customization operation to a base mapping), and validating the mappings to ensure consistency with the ontology. Then for each table in the monitoring database that is to receive transformed/mapped data, steps are taken to query/join source staging tables to retrieve particular data items or fields, perform any necessary table or field transformations, compute any additional fields, mark the previous version (revision) of the entity as "old", save the new fields as a new current version (revision) in the monitoring database, and set a "new" flag to indicate that a new monitoring entity is ready and available for processing by a policy statement.

The mapping table or enterprise ontology, it will be recalled from earlier discussion, stores information and establishes the mapping between predetermined tables, fields and parameters of a source (monitored) database and corresponding tables, fields and parameters in the monitoring database. The mapping, transformation, and renaming of data from the source data format (monitored database) to the target data format (monitoring database) is also referred to as normalizing.

FIG. 21 illustrates an exemplary mapping 2100 according to aspects of the present invention, and specifically illustrates how a subset of data items from a data source table are selected and renamed to become data items corresponding to a monitoring entity stored in the monitoring database. This illustrative example assumes an accounts payable system (A/P) associated exemplary accounts payable source database, as reflective by an ERP source table at 2101. In this example, there are in excess of 130 fields of information in various tables in the ERP data source that store information relating to the enterprise's accounts payable function. In accordance with aspects of the invention, only a limited subset (a selected reduced subset) of these fields may be relevant or needed for the enterprise policy statement containing rules relevant to accounts payable transaction integrity monitoring. Accordingly, the example assumes that there is a predetermined set of policy statements (XML frames) that rely upon and utilize particular data items from the accounts payable source table 2101 that are relevant for execution of these particular frames. In the example in shown in FIG. 21, it is assumed that only 21 fields are utilized in the logic of the policy statement for determination of indicators, as shown by the target table 2121. From the entirety of the set of fields from the original dataset 2101, the fields in the mapped and reduced subset include exemplary fields 2125 identified as Voucher_No, Business_Name, Invoice_No, Vendor_Name, etc. as well as predetermined metadata.

The mapper is responsive to an ontology source table 2111 to select only the needed data items from the source database in table 2101 and store those items as identified by the field names shown in the target table 2121, in the monitoring database 175. Also shown in FIG. 21 is a mapping file 2131 and an ontology file 2132, as preferred approach to reflecting information needed by the mapper 150.

In addition to the selected subset of information from the source table 2101, and as was previously described, predetermined metadata is added to each entity created and stored, e.g. Revision_ID, Entity_ID, Entity_Version, Actor_ID, Update_Time. It will be further understood that the mapper 150 is responsive to a stored ontology mapping predetermined source table data fields to predetermined target table data fields and including predetermined metadata, for purposes of creating monitoring entities in the monitoring database, on which the policy statements are executed in order to identify a possible policy of violations.

FIG. 22 illustrates an exemplary mapping file 2200 that contains data utilized by the mapper 150 in accordance with aspects of the invention. In preferred embodiments of the invention, the mapping file contains information needed to identify the source tables, entity names, target tables, and other required information. For example, the mapping file 2200 includes entity definitions delimited by entity tags <entity>, with associated information identifying a data source <source></source>, table names <name>, any database join operations that might be required to obtain the required data from multiple tables <join></join>, key fields that might be required <key></key>, field names within tables <field></field>, and a mapping of the corresponding filed name and table, e.g. a field with the name VENDOR_ID obtains its data from the source table and field VAB. ABALPH, as shown in the figure.

FIG. 23 illustrates an exemplary ontology file 2300 according to aspects of the invention. As with the mapping file 2200, the ontology file is utilized by the mapper 150 to effect data transformations and mappings. The preferred ontology file is expressed in XML, and includes a number of data items, identified with XML tags, that are required to create tables in the mapping database and set up appropriate fields and names that may be utilized in creating and executing policy statements or frames. For example, the exemplary ontology file includes information identifying an entity that is a monitoring entity in the monitoring database, shown as <entity></entity>. This entity includes certain data items such as a name <name></name>, a title <title></title>, a description <description></description>, an identifier <typeid></typeid>, and a linkage to one or more related entities <linkage></linkage>. The ontology file also includes one or more field identifiers <field></field> that specify data fields of records in the monitoring database; each of these fields has a corresponding name, description, and type, as identified with corresponding tags.

Knowledge Base, Core, and Frame Execution

FIG. 24 is a block diagram of a knowledge base 165 according to aspects of the present invention. The knowledge base 165 comprises several different data items that are utilized by various computer-implemented processes of the inventions. An extractor knowledge base (KB) 2405 stores one or more extractor files, as have been previously described herein. Such extractor files are identified as source table specifications or specs in the figure, e.g. Source Table Spec 1, Source Table Spec 2, etc. An ontology store 2410 stores one or more ontology files, as are described elsewhere herein. Such ontology files are identified as target table specifications or specs in the figure, e.g. Target Table Spec 1, Target Table Spec 2, etc. A mappings store 2415 stores one or more mapping files, as are described elsewhere herein. Such mapping files are identified as target mappings in the figure, e.g. Target Mappings 1, Target Mappings 2, etc. A frames store 2420 stores one or more computer-executable policy statements, in the form of XML frames in the disclosed embodiments, as are described elsewhere herein. Such frames files are identified as Frame 1, Frame 2, etc.

All of the specifications in the various knowledge base files can be modified and overridden element by element by more customized knowledge files as described below. In addition, individual files include a context mechanism allowing individual tags with in the knowledge files to be filtered on a run context, which is specified when the system is installed and run for an enterprise. These are only used of the context specified matches that for the specific installation. Finally, individual parameters can be set in the knowledge files, values for which are also set as installation for run time. This provides a third means of customizing knowledge files, including extractions, mappings, and frames.

FIG. 25 is a pseudocode listing of an exemplary computer-implemented process 2500 for operations of the CORE execution process 160 (FIG. 1) according to aspects of the present invention. As with other computer-implemented processes, the CORE execution process 2500 is asynchronous and executes on the computer system running the TIM system program modules. As with other processes utilized in the invention, the process 2500 is a continuous loop that runs continuously, testing for the conditions that cause it to execute. Such conditions include, by way of example, the completion of a pass through all available policy statements, or completion of a predetermined subset of such policy statements, or at predetermined time intervals, or in response to a command to execute a particular policy statement. Other conditions for execution will occur to those skilled in the art.

The CORE process 2500 comprises steps for retrieving computer-executable policy statements (frames) from the knowledge base 165 and executing them on data (monitoring entities) in the monitoring database 175. The preferred data structure for the computer-executable policy statements or frames is described in greater detail elsewhere. These steps include opening a connection to the monitoring database, retrieving and reading any base frames that are configured to run, retrieving and reading any custom frames that are configured to run, and validating the frames for syntax. Then, for each frame so retrieved, the system computes any required statistics tables, and for each new version (revision) of a monitoring entity, and for all applicable and required support entities, evaluates all indicators in the frame. Such operation may require retrieving additional information from additional data sources, as discussed elsewhere. If the evaluation of any indicator produces a confidence level that exceeds a predetermined threshold, a new exception is created. Exceptions can be based on the absence of specific entities as well as on specific patterns of data in existing entities. Exceptions can also be based on the results of previous exceptions, thereby proving a form of chaining reasoning wherein subsequent transactions can be used to build on the conclusions related to previous transactions. This new exception is added to the exception database, in a format (data model) described elsewhere herein. Any required potential impact and probabilities are computed. A natural language description of the exception is generated based on a template in the frame, all basis revisions are determined and saved, and a wariness value for each entity underlying the exception is updated based on exception. Basis revisions are the entities (actually a specific revision of the entities) upon which an exception is based. This includes the single transactional entity (i.e. the new revision of an entity that has changed) and any supporting entities (revisions thereof) required to match the pattern in the frame. These are used to provide a comprehensive exception view to the user in the UI (see below). Additional computation is performed to identify transitive links between entities and exceptions, which are used in the link analysis functionality in the UI.

Exemplary Enterprise Policy and Exception

FIG. 26 illustrates an exemplary policy and exception that might be made the subject of an enterprise policy and expressed as a computer-executable policy statement (or frame) in accordance with aspects of the present invention. Valid and invalid business transaction sequences are is shown in the figure, so as to illustrate certain exemplary transactions that might occur during typical business activity and how an invalid sequence might be detected. The exemplary typical business transaction sequence involves creation of a new vendor account at 2602 reflective of an enterprise determining that a new vendor should be added to its accounts payable process. Logically, a vendor account must be created before any purchase orders can be issued to that vendor, purchases made, invoices received, and payments issued. These other business activities are shown as purchase order processing 2604, purchase receiving 2606, invoice and vouchering 2608, with payment issued 2610.

The right hand side of FIG. 26 illustrates that a payment has been issued at step 2616, which would only logically be expected after a purchase has been received 2618, and invoice and vouchering activity 2620.

In accordance with aspects of the invention, a frame can be constructed to track the logical business activity steps and impose the discipline (i.e. enterprise policy) of a particular sequence in a business process of an enterprise, and to indicate a policy exception in the event that a portion of a business transaction sequence is out of order. Those skilled in the art will understand that information pertaining to each of these particular activities involved of the process must be reflected as transactional entities in a system of the present invention, and that appropriate metadata such as timestamps associated with the particular transactions must be inspected so that a determination of sequence can be established. For the foregoing, those skilled in the art will understand that many other business activity and transaction policies can be implemented by utilizing the techniques and methodologies of the present invention.

FIG. 27 illustrates another enterprise policy exception in the form of an overridden transaction 2720. This figure also illustrates how the business activities or transactions 2700 of the enterprise might be reflected as transactional entities 2710, as such transactional entities might appear and be stored as monitoring entities in the monitoring database in accordance with aspects of the invention. On the left hand side is a sequence of exemplary and illustrative business transactions 2700 of business and their counterpart transactional entities 2710, as such transactional entities might appear as exemplary monitoring entities stored in the monitoring database. Each of the transactional entities 2710 is shown together with corresponding metadata in the form of revision, timestamp, and actor.

Note the group of transactions shown at 2720, which is provided as an example of an overridden transaction. The expected sequence of business transactions would be creation of a vendor account 2701, purchase order processing 2702, purchase receiving 2706, invoice and vouchering 2707, and payment issued 2708. An inappropriate or invalid set of transactions might occur if a certain actor within the enterprise changed the vendor's bank account number at 2721, issued a payment at 2722, and then changed the vendor's bank account number at 2723 back to the original number that was input during the vendor account creation. This is an example of a typical fraud where an insider employee changes bank account numbers or other payment type information of a vendor so as to misdirect or misappropriate funds from the enterprise, and then attempts to "cover his tracks" by changing the bank account or other payment information back to the initial invalid setting.

According to aspects of the invention, each version of particular entities, and in this case the static entity of vendor with corresponding bank account number, is preserved as an historical record. A frame expressing the exemplary policy statement that "any changes of bank account numbers of vendors followed by changeback within a predetermined time period constitutes an exception to be investigated" can be easily written and utilized in embodiments of the invention. Such a frame or a group of frames expressing related policies can be executed to inspect a pattern or series of changes to particular entities, with the purpose of determining if policy exceptions have occurred.

In the example described, the enterprise has a policy that such an exception should be indicated. The right hand side of FIG. 27 illustrates the various transactional entities that would be created in implementing this particular exemplary policy and exception. Those skilled in the art will understand that many other types of business transaction sequences, patterns, information requirements, controls, and the like can be similarly implemented, as will be discussed in greater detail in connection with the frames and their execution.

FIG. 27 also illustrates the example of dual payments being issued in connection with the example shown therein. At 2722 a first payment was issued, and at 2708, a second payment was issued, perhaps against the same vendor, but at a different account number than the first payment 2722. The occurrence of dual or duplicate payments is yet another type of policy exception that an enterprise may wish to monitor and identify.

FIG. 28 illustrates further aspects of the exemplary policy exceptions of overridden transaction and duplicate payments of FIG. 27. On the left hand side of FIG. 27 are the transactional entities 2710, as described in connection with FIG. 27. The right hand side illustrates exemplary resultant exceptions 2800 in accordance with aspects of the invention.

In the example of FIG. 28, one or more policy exceptions might be determined from the sequence of transactions illustrated. One exemplary exception 2801 is that a vendor bank account changed, perhaps without supervisor approval or other controls. Another exception 2802 is an invalid sequence due to a payment being issued prior to receipt of an invoice. Another exception 2803 is another change to a bank account of a vendor. Yet another exception 2804 is the detection of a duplicated payment relative to a particular invoice or relative to a particular vendor, or perhaps due to the failure of the number of payments made to a particular vendor to match a number of invoices received from a particular vendor. In accordance with aspects of the invention, these exceptions 2800 are generated by operation of the CORE 160, executing frames reflecting and representing the logic required to review the transactional entities 2710 and determine exceptions, and create exception entries for storage in the exceptions database 185.

In accordance with aspects of the invention, the illustrative exceptions 2800 are shown with an identifier and/or description of the nature of the exception, the time, actor identification, and status. Further explanation of the nature of indicators, status, and other aspects of stored exceptions are described elsewhere herein.

FIG. 29 illustrates an exemplary computer-executable policy statement in the form of a frame 2900 that is executed by the CORE 160 for reflecting and representing a particular enterprise policy, operative to provide predetermined indicators signaling or representing a possible detected policy violations and to generate one or more exceptions corresponding thereto. The exemplary frame 2900 relates to creation of a "ghost vendor." Those skilled in the art of financial transaction systems will understand that a ghost vendor is a situation where an employee or other known person identifies himself or herself as a vendor within the accounts payable portion of the ERP system. By way of example, an enterprise policy could be established that no employees or other persons known to the enterprise can be identified as vendors to receive payments outside of the payroll system, or that such payments cannot be made without additional controls or safeguards such as approval of a supervisor, creation of an auditable record, or other financial system safeguards.

In accordance with aspects of the invention, frames in the present invention are implemented as XML code, which those skilled in the art will understand is a computer programming expression methodology that is computer-executable by a number of different commercially-available XML processing engines that can be utilized in constructing embodiments of the present invention. As will be known to those skilled in the art, XML stands for eXtensible Markup Language and bears certain similarities to the well known hypertext markup language (HTML). The XML language is designed to describe data itself and attributes thereof, and has a known structure having "tags", document type definition portions (DTD), and an XML schema. Each logical expression, statement, attribute, or other identifier in an XML document is delimited by a starting tag in the format of "<tag>" and concludes with a closing tag in the format of "</tag>". The information between the starting tag and closing tag sets forth a statement, attribute, description, computer command, formula, or other information that can be parsed by an XML interpreter and executed by a computer.

As those skilled in the art will understand how to construct statements and frames using XML, no further discussion of the particular implementation methodology using XML will be provided herein.

It should, however, be understood that other computer-implemented mechanisms, languages, scripting methodologies, program modules, and/or devices could be employed in constructing embodiments of the present invention to express enterprise policies in other forms of policy statements, access information in the monitoring database, apply the rules of such policy statements, determine exceptions, etc, so as to identify and determine exceptions and store them in the exception database.

The exemplary frame of FIG. 29 illustrates the simple logical proposition that "if a vendor is an employee, indicate an exception." In accordance with this exemplary policy statement, the frame will indicate an exception in the event that a vendor in the enterprise's accounts payable system and an employee within the enterprise have the same telephone number. It will, of course, be understood and appreciated that many different mechanisms may be used to determine if a vendor is an employee of the enterprise, and that the example provided is merely illustrative and not meant to be limiting. Other indicators of the identity between the vendor and an employee could be reflected by vendor and employee address information, tax ID and/or social security information, bank account number, or other information.

In accordance with aspects of the inventions, each frame such as the exemplary frame 2900 processes data identified in terms of the enterprise ontology, as stored in the knowledge base, with respect to entities that are monitored in the present invention, and determines indicators based on the processing of data on the monitoring database. In the example of FIG. 29, two separate transactional entities are required: a vendor entity identified by the <name> tag AP_VENDOR, and an employee entity identified by the <name> tag HR_EMPLOYEE, as such entities are identified in the monitoring database. Such entities, as will be recalled from previous discussions, are static entities in accordance with aspects of the invention, and serve as support entities for the logic of this particular frame. The corresponding indicator in the example is that the vendor and employee have the same telephone number, as reflected by the <summary> tag 2910, which describes the policy in human-readable form as a comment. The <indicator> tag 2950 sets forth the logical computer-executable expression of the data items required from the monitoring database.

The logical expression that would detect whether the vendor telephone number is the same as the employee telephone number is set forth in the <expression> tag within the <indicator> tag. In response to the detection that a vendor telephone number is the same as an employee telephone number, a new exception is generated. According to aspects of the invention described elsewhere, the new exception comprises a new data record for storage in the exceptions database 185. The CORE process generates the exception and provides information needed to create the exception record including an exception ID, a name, the identities of all related transactional and support entities, a confidence calculation (if employed). Specific details of the exception are provide in connection with FIG. 33.

In connection with executing the exemplary frame 2900, an impact parameter may be provided. In accordance with aspects of the invention, the impact parameter is a predetermined amount that reflects an anticipated or expect financial impact or effect of the indicator. This impact may be the particular hard dollar amount associated with the transaction, if a transaction has an amount, or may be an arbitrary value. The impact value facilitates prioritizing the exception. The exemplary impact in FIG. 29 is 9000.

Each frame typically includes one or more transaction tags. These identify particular transactional entities involved in the frame execution. In the example of FIG. 29, this transaction tag is AP_VENDOR, which reflects that the frame is executing in response to a determination that a change was made to data corresponding with a vendor entity.

Each frame typically includes one or more entity tags, e.g. the entity tag in FIG. 29 is HR_EMPLOYEE. Entity tags identify support entities that are involved in evaluating and resolving the logic of the frame to determine exceptions.

Each frame typically involves one or more indicator tags, e.g. FIG. 29 illustrates an indicator having the summary tag <summary> The Vendor and Employee have the same phone number.</summary>. This summary tag is followed by a description tag that accompanies the indicator in the exception record if the indicator resolves to a true condition.

The indicator typically includes one or more logical expressions, identified by the <expr> tag, which contains a logical expression of a condition that if satisfied indicates an exception. The exemplary expression FIG. 29 is <expr>VENDOR.PHONE !=' ' and VENDOR.PHONE= EMPL.PHONE</expr>. This statement reflects that a vendor's telephone number is not a null value and that the vendor's telephone number is equal to the telephone number of the supporting employee entity that is referred to in the frame.

The indicator typically includes a confidence value, identified by a tag <conf>, which is an arbitrary number or probability that the associated indicator is revealing a compliance policy violation. The example in FIG. 29 is a confidence value of 0.2. In accordance with other aspects of the invention, the confidence value is mathematically combined with confidence values of other associated indicators, and if a cumulative confidence value exceeds a predetermined threshold, an exception is indicated.

A frame typically includes one or more <cev> tags, which represents the term "comprehensive exception view". This information is provided with an exception as information associated with the exception and how to display that information to a user. In particular, the <cev> tag provides information that enables the frame of FIG. 29 to display information about the vendor entity and the employee entity in a tabular format.

In accordance with other aspects of the invention, a plurality of different indicators and frames can execute to determine more complex scenarios, to thereby obtain a greater certainty in establishing a compliance policy violation. In the example of FIG. 29, the mere fact that a vendor and an employee have the same telephone number may not be dispositive of the fact that a vendor is an employee. For example, the exemplary <conf> tag of 0.20 in FIG. 29 is a relatively small confidence indicator if taken alone. But if the confidence value or indicator of 0.20 is combined with other confidence indicators of similar value, resultant from satisfaction of expressions associated with other indicators in the frame, or from execution of other frames setting forth other tests for "vendor is employee" such as an address match, the cumulated value may add up to a sufficient total value that indicates a sufficiently high confidence level that a vendor is truly an employee.

For example, if the vendor telephone number and employee telephone number are found to be the same (with confidence value of 0.20), and the respective tax ID (e.g. social security numbers) are found to be the same (with confidence value of 0.20), and addresses are found to be the same (with confidence value of 0.20), and a number of payments have been found to be the same (with confidence value of 0.20), a cumulative confidence factor of 0.80 may result (assuming simple cumulation). By comparing the cumulative confidence level to a predetermined value such as 0.75, as reflected by another frame that executes in conjunction with the frame 2300, a more complex logical expression may be constructed so as to provide for a number of different logical, financial, and other checks to reflect and represent enterprise policy.

As described elsewhere herein, the confidence values are preferably combined in a statistically appropriate manner rather than simple accumulation as described above. See the discussion in connection with FIG. 32. Note that it is also possible to specify a negative confidence for an indicator. If such an indicator is true, the total confidence for the entire exception is reduced rather than increased.

FIG. 30 illustrates details of other indicators used in an exemplary frame, and different confidence levels associated with the different indicators. Consider the example of an exception that would be triggered in the event that two separate vouchers in an accounts payable system reference the same or a similarly numbered invoice (which might be evidence of a double payment situation, either an error or deliberate fraud). In the example shown, a first indicator 3005 tests for a condition that two different vouchers (exemplary transactions) reference the same invoice number. This indicator, if resolved to true, possesses a confidence value of 0.3, shown at 3010. A second indicator 3015 tests for a condition that two different voucher numbers are similar, e.g. the numbers are the same except for a transposition error in the numerals, or the last digits of the number are within a range of plus or minus 10. This indicator, if resolved to true, possesses a confidence value of 0.2, shown at 3020, indicating that the risk of an issue with invoice numbers being similar is slightly less than the quantified risk of invoice numbers being exactly the same.

FIG. 31 illustrates aspects of frame types and execution sequence in accordance with aspects of the present inventions. In accordance with one aspect of the invention, the knowledge base comprises a plurality of base frames. Base frames comprise relatively general enterprise policy statements that are applicable to a wide variety of different types of enterprises with little or no customization. Base frames generate exceptions in typical business-oriented enterprises with conventional business functions of accounts payable, accounts receivable, human resources, etc. It will of course be understood and appreciated that the needs of businesses are not identical, and that certain enterprise policies may need to be adjusted, modified, or entirely not implemented for various reasons. Additionally, there may be instances wherein entirely new and different enterprise policies may need to be implemented. Custom frames comprise base frames that have been modified or customized so as to meet requirements of a particular enterprise, or new frames that supplement a preexisting set of base frames and express policies not covered by any of the base frames.

In accordance with aspects of the invention, FIG. 31 illustrates a set 3100 of predetermined base frames, a set 3130 of custom frames, and a sequence or runtime set 3140 of frames, in the order of execution. In accordance with aspects of the invention, each frame is preferably provided with a tag to indicate at runtime whether a particular frame is to execute or not. In FIG. 31 this is shown as a tag <frame></frame> to indicate that a frame should execute, and a tag <frameoff></frameoff> to indicate that a frame should not execute. For example, a first base frame 3002 possesses a <frame tag>, while a second base frame 3004 possesses a <frameoff> tag.

In like manner, a first custom frame 3112 possesses a <frameoff> tag to indicate that this frame should not run, while a second custom frame 3014 possesses a <frame> tag to indicate this frame should run.

At runtime, and as shown at 3140, the preferred CORE process 160 retrieves a set of frames from the knowledge base 165 and executes the frames in a predetermined sequence. In the event that a particular frame should not execute, it would possess a <frameoff> tag. Thus, it will be seen in the runtime sequence at 3140 that base frame 1 3002 executes, custom frame 2 3114 executes, base frame 3 3106 executes, etc., while all frames possessing a <frameoff> tag are not executed. In this manner, a predetermined set of base frames may be called and executed, may be selectively turned off, and may be modified so as to reflect particular circumstances of a particular enterprise and execute in place of a different base frame, or new frames may be created, as desired by a system administrator.

FIG. 32 provides an example of a frame calculation of parameters of confidence, wariness, impact, and priority, which are utilized in disclosed aspects of the invention to provide signals as to the probable significance of an indicator or exception. Specifically, this figure illustrates the effects of a two-indicator exception, and how the indicators affect the combined confidence level of the exception, increase a wariness parameter associated with an entity, produce a particular resulting impact, and utilize a resultant priority value.

Consider that a monitoring entity 3202 for a payment was generated in monitored system. Assume that the vendor associated with the payment is a preexisting support entity having a vendor record 3204, and that this entity (ID=5678) possesses an initial wariness value of 300 (expressed in arbitrary terms, but perhaps dollars). A payment (transaction 3202) is issued to this vendor in the amount of $1000, which triggers the execution of a frame 3206 that is intended to test for some condition relating payments to vendors (not specifically illustrated). Within this frame 3206, there exist two indicators related to the vendor (the logic for which is not shown but assumed), and their confidence values are c1=0.2 and c2=0.3, as shown in the abbreviated frame, respectively. The confidence C of this two-indicator exception may be calculated as shown in step 3208:

$$C=1-(1-c1)*(1-c2)=1-(1-0.2)*(1-0.3)=0.44$$

The priority of the exception is calculated as follows:

$$\text{Priority}=\text{Impact}*\text{Confidence}=1\,000*0.44=440$$

where in this case the impact is the payment amount ($1000) of the triggering payment entity 3202. The exception has a priority value of 440, which in this example results from the application of the confidence level (which may be considered a probability) to the nominal impact of the transaction (which in this case is the amount of the transaction, $1000). Since the exception is related to the vendor, the wariness of this particular vendor is increased by 440 after this exception is generated. Therefore, the wariness of the vendor is now increased to 740, the sum of the initial wariness and the priority, as shown in 3210.

From the foregoing, those skilled in the art now understand how to determine various types of indicators, exceptions, wariness, confidence, impact, and priority in accordance with the present invention for many different types of transactions, not just financial transactions.

FIG. 33 illustrates a data schema for an exception, as stored in the exceptions database 185, in accordance with aspects of the present invention. An exception is a data structure that contains a number of data fields or items, with each field having a type and default value. Data items that represent an exception in the invention include an identifier (EXCEPTION_ID), a name (EXCEPTION_NAME), information identifying the frame that generated the exception and its version (EXCEPTION_FRAME_NAME, EXCEPTION_FRAME_VERSION, EXCEPTION_FRAME_UPDATE), a description of the exception (EXCEPTION_DESCRIPTION), a date the exception was detected (EXCEPTION_DATE_DETECTED), a potential impact (EXCEPTION_POTENTIAL_IMPACT), an expected impact (EXCEPTION_EXPECTED_IMPACT), a probability (EXCEPTION_PROBABILITY), whether or not the exception is marked private by a user (EXCEPTION_PRIVATE), an owner (EXCEPTION_OWNER), a status field (EXCEPTION_STATUS_ID), an added by field to indicate an author (EXCEPTION_ADDED_BY), a category identifier (CATEGORY_ID, a system identifier (SYSTEM_ID, and a last update time (LAST_UPDATE_TIME). Other data items may occur to those skilled in the art.

FIG. 34 illustrates relationships between transactional entities and support entities, related entities, and exemplary exceptions that are dependent. Assume in this figure that a first transaction (step 1) is the creation of a new vendor at 3402 in an ERP accounts payable system. This initially is a transactional entity, as shown at 3402. After its creation, the resultant vendor entity at 3408 is a support entity. Assume that this initial vendor creation transaction was reviewed by a frame designed to determine if any newly created vendor is an employee of the enterprise (step 2), e.g. "Vendor—Employee Similar".

Assume now that the "Vendor—Employee Similar" frame determined that some aspects of the newly created vendor and an employee of the enterprise were similar, for example, the addresses of the two entities are the same. According to the logic of the frame, this creates an exception 3414 (step 3), "Vendor—Employee Similar". As discussed above in connection with frames, this exception will have an associated confidence level.

Assume next that a purchase order is generated at 3404. This creates a transactional entity, which is related to (connected) to the vendor created at step 1. Assume another frame that is designed to examine purchase orders to determine if any vendors associated with a purchase order already are connected to any exceptions (step 4). According to the logic of this second frame (or another indicator in the first frame), another exception 3416 is created (step 5). This exception is described as "Suspected Ghost Vendor," and will also have an associated confidence level.

Assume next that a frame or indicator determines that no other employees within the company other than a single employee have ever bought from the vendor 3408, i.e. there is a sole buyer 3410 in the system's database associated with this particular vendor. The fact that only a single person within the organization has ever bought from this particular vendor indicates that the vendor is very new, very small, or very suspicious. Assume that an indicator of "sole buyer" increases the confidence level associated with the exception 3416 of "Suspected Ghost Vendor" (step 6). In accordance with aspects of the invention, the exception 4016 receives an incremental boost to its existing confidence level.

Assume next that a frame or indicator is operative upon additional data from additional data sources, for example, the system authentication function of the enterprise's IT infrastructure. As shown in FIG. 1, additional information can be extracted and utilized in evaluating policy statements and determining exceptions or parameters associated therewith. Assume that such a frame or indicator determines that a particular user entity 3412 that has logged into the enterprise's systems, as reflected by records provided additional IT infrastructure data sources, is the same user that (a) created the vendor 3408, (b) is the employee 3406, and (c) is the sole buyer for that vendor (step 7). According to the operation of the indicators that detect such occurrences, all of such conditions increase the confidence level of exception 3416 further still (step 8). In this example, a number of different but related factors, utilizing different support entities, have affected the confidence level of a policy violation that a "ghost vendor" set up by an employee may be about to receive a payment indicated by a fraudulent purchase order.

The foregoing has illustrated a number of different aspects of indicators, frame execution, increase of confidence level, exceptions, transactional and support entities, and the like, and demonstrates to those skilled in the art that systems and methods of the present invention may be adapted to address myriads of enterprise compliance policy situations.

Exception Management and Reporting

As shown in FIG. 1, exceptions from operations of the CORE process 160 are stored in an exceptions database 185. A case management system 190 comprising a an analysis and reporting user interface 180 handles exceptions and cases involving one or more exceptions, for compliance policy management and reporting functions. The analysis and reporting user interface 180 provides information to users 101 and facilitates review, inspection, management, reporting, and other functions for handling reported exceptions from the system.

From the discussion above, it will be understood that the CORE 160 is operative to executive frames from the knowledge base on the monitoring database 175 and to generate one or more exceptions that are representative of the violation or possible violation of enterprise policies. Exceptions take the form of data items generated by the CORE 160. Principally, each exception data item includes information reflecting the nature of the exception as determined by particular frame that generated the exception, time information, actor identification information, and a status indicator. The case management system 190 provides analysis of exceptions and reporting of exceptions, so as to facilitate the provision of information to users regarding generated exceptions, to provide a mechanism for storing collections of exceptions, and to manage investigations in the form of a case. A case typically comprises a plurality of exceptions with status relating to such exceptions, to permit the enterprise to monitor and control its business processes.

In accordance with aspects of the invention, the case management system 190 is a computer-implemented process that retrieves information from the exceptions database 185 and the monitoring database 175 and presents the information to users, e.g., users 101 as shown in FIG. 1, in various manners. The analysis and reporting component 180 of the case management system 190 results provides a display of various user interface screens so as to display information regarding exceptions and entities to users, and to receive control information from users for purposes of assigning personnel as case managers or investigators, changing the status of items, and collecting other information (clues) that may be relevant to an investigation of one or more exceptions constituting a case, for reporting and other purposes.

There are three major aspects to the analysis component of the case management system of the invention. The first is a set of detailed displays of exceptions including an exception summary list, and for each exception an automatically generated natural language description, several detailed views of the entities underlying the exception, and a display for various other parameters describing the exception. The second is a similar display for entities, which displays a summary list of entities optionally sorted by their composite wariness score, and a detailed view for an entity including a display for all the exceptions that the entity supports as well as a display for various attributes of the entity. The third is a user-configurable summary display that displays aggregate statistics for exceptions and entities, graphs, and alerts.

FIG. 35 illustrates an exemplary exceptions display user interface (UI) screen 3500 that shows exceptions displayed to a user. An exceptions display control 3502 is shown activated, which results in display of a plurality of exceptions in a list at the top of the screen. Each exception is identified by an exception ID, a name of the exception, a priority, and an owner. An exemplary exception, VOUCHER_LINE_DUPLICATE_AMOUNT-1053020000364 is shown as selected by the user. This particular exception, it will be understood, necessarily involves two separate vouchers (two separate entities) whose amounts are identical, i.e. $68,104.00. The entities involved in this exception are shown in a region of "related entities," two in the present example, entity 3510 and 3512.

The Entities tab in the lower display region is shown selected, which causes display of information associated with the entities that were involved in triggering the exception of duplicate vouchers with the same amount. A description field 3515 shows information associated with the exception, and identifies the indicators that triggered the exception, e.g. that "Exactly two VoucherLines were entered for the same Vendor for the same amount within 14 days." This information is provided from the description information in the exception data record, as described above.

Note that a popup control (effective on a right click in embodiments of the invention) is shown at 3506. Assume that the cursor was positioned over the Voucher ID data field. Assume that the user selects the command "Show Related Entity" at 3508. In accordance with aspects of the invention, this will cause display of entities that are related to the particular voucher, for example, an associated purchase order (PO).

Turn in this regard to FIG. 36 for an illustration of an exemplary related entities display user interface (UI) screen 3600 that shows an entity or entities related to an entity that is the subject of an exception, in particular the exception and entities of FIG. 35. Note that the Related Entities control 3602 is shown highlighted as having been selected or activated. The Summary tab 3610 is shown selected, which results in display of information corresponding to an entity (a particular purchase order with Entity ID 00100-OP-11648-000-200). As can be seen, information about the purchase order transactional entity associated with the previous duplicate vouchers is displayed for user assessment, such as PO line ID, PO ID, a Vendor ID, and Quantity Ordered. In accordance with aspects of the invention, a user can select entities that are related to particular entities that trigger exceptions, and view the information. This connection ability is referred to in the invention as "linking" to associated or related entities.

FIG. 37 is an illustration of an exemplary detailed display of information about related entities in a user interface (UI) screen associated with the analysis and reporting UI 180. In this illustration, detailed information about one or more entities involved in an exception are displayed. This display is generated in preferred embodiments of the invention in response to user activation of the exception 3504 as displayed in the list of exceptions in FIG. 35, for example by double-clicking on the particular exception. In particular, this display allows side-by-side comparison of the details of two different vouchers that were indicated as "duplicate," so that a user can inspect the information corresponding to the entities involved, and determine a disposition of the exception, assign it to a case for investigation, etc.

FIG. 38 is an illustration of an exemplary display of information about related entities in a user interface (UI) screen associated with the analysis and reporting UI 180, where the entities are provided from different data sources. This is an example of link analysis provided in aspects of the invention. This display illustrates the ability of systems constructed in accordance with the invention to bring together information from disparate, even heterogeneous data sources, connect information by way of indicators and exceptions, and facilitate an analysis and investigation of transactions that give rise to policy statement exceptions. In the example of FIG. 38, an exception identified as PO_TO_GHOST_VENDOR is identified as an exception that is to be inspected and analyzed. In this example, a transactional entity of a purchase order has been issued to a support entity that was previously determined, by another exception, to have a certain confidence level of being a "ghost vendor." The information displayed in this figure about related entities is, logically, information about the purchase order transactional entity (shown at 3810) and information about the vendor previously identified as a ghost vendor (shown at 3815). Note in the Description of Exceptions display area 3820 that two indicators underlie or are associated with the exception: "PO issued to Vendor flagged as ghost" (and an associated exception identifier) and "Only one Buyer (MRO) purchased from the Vendor: increases confidence".

As another example of link analysis provided in aspects of the invention, FIG. 39 is an illustration of an exemplary display of information about other related entities in a user interface (UI) screen associated with the analysis and reporting UI 180, where the entities are provided from different data sources, in this case vendor information from an accounts payable system at 3910 and information about a particular employee from an human resources (HR) system at 3915. This display screen shows the entities involved in an exception, discussed above, where a vendor and an employee were determined to have a similar or identical address. Indicators of this exception are shown at 3920.

Case Management and Reporting

FIG. 40 is an illustration of an exemplary case management user interface (UI) display screen associated with the analysis and reporting UI 180. This display is generated for users that have a number of exceptions assigned to them for handling and/or investigation and/or disposition. As in previous displays, a region 4000 is provided for a display of a number of exceptions, by ID, name, priority, owner, etc. A particular exception, GHOST_VENDOR-105302000364, is shown highlighted as having been selected by a user. The summary tab in a display region 4010 provides a display of particular information associated with the selected exception. In this case, information associated with the "ghost vendor" exception includes the exception name at 4002, a priority 4003, a potential impact 4004, a case manager assigned to the exception 4005, a confidence value 4006, and status information 4007, e.g. "Under Review." Other information such as secondary case managers 4012 are shown, as well as a scheme display and system display (e.g. AP for accounts payable). Also included is information about the case ID, date created, and date modified. Also included is checkbox 4013 for marking the selected exception as "private" so that unauthorized users will not have access to the exception.

FIG. 41 illustrates an exemplary case management UI screen 4100, with the Entities tab selected. This screen illustrates a collection of information relating to a particular actor, in this example an employee "Adelbert Bell," whose name is displayed in an data display field 4102. Display area 4104 includes other information relating to the particular actor, who in this case may be considered a subject under investigation, for example, the employee ID, last name, first name, SSN, address, etc. A Case ID and Date Created display area is also provided. It will be understood that the information provided when the Entities tab is selected is particular to and dependent on the nature of the particular entity. In this case, an employee entity (a static support entity, likely from an HR system) is displayed.

FIG. 42 illustrates an exemplary case management user interface screen 4200, with the Chronology tab selected. According to aspects of the invention, a graphical display of one or more exceptions is presented in a timeline format, together with other useful information. The disclosed system generates a timeline that displays exceptions along the timeline, in association with particular transactions that relate to the exceptions. The displayed exception information includes a label identifying the nature of the exception and a date and time. Icons or other symbols reflecting disposition of the exception or status may also be provided.

In the screen 4200, a number of particular transactions relating to exceptions are displayed, to illustrate certain linking functions of certain aspects of the present invention. According to such aspects of the invention, a collection of transactions related to particular actors or to particular static entities are collected and displayed in a timeline chronology. In the example of FIG. 42, specific transactions are illustrated as an unfilled circle, e.g., transactions 4201, 4203, 4207, 4211, 4217. Exceptions and detections thereof are indicated as a filled-in circle, e.g., 4205, 4209, 4213, and 4219.

For example, the transaction 4201 relates to the creation of a vendor identified as AA, while transaction 4203 represents the creation of a second vendor identified as ABBC. In the example illustrated, assumed that the two transactions 4201, 4203 resulted in the utilization of the same address for two different vendors. Assume further that a policy frame is provided to determine whether duplicate addresses exists for different vendors, and generate an exception as a result the processing of an appropriate frame. This would be indicated at as the exception 3505 in the chronology, "Opportunity Exception (Duplicated Address)", together with a date and time of detection, and displayed with the filled-in circle icon.

Advantageously, the different display techniques allow users to readily identify and analyze exceptions and their related transactions, and graphically display the relationships between various occurrences of transactions and exceptions over time.

Another example of a detected exception is shown at 4213, identified as "Ghost Vendor Scheme Detected." A predetermined display indicator 4215 is provided to indicate that supervisory personnel or auditor have been notified regarding the exceptions.

FIG. 43 illustrates an exemplary case management user interface screen 4200 with a Reports tab selected. This particular display screen includes a subsidiary display screen 4305 with subsidiary tabs Impact, Confidence, and Status. The Impact subtab is shown selected. In this particular view, information relating to particular case numbers assigned to a particular user (case manager) are displayed in a table format including a Case No. column indicating case numbers assigned to particular case, an Exception ID column identifying exceptions associated with the various cases, an Actor column for identifying actors (e.g. certain individuals) that are or might be considered subjects, an Exception Description column displaying identifying information relating to particular cases under investigation, and an Impact column displaying a computed impact of a particular case and the exceptions represented thereby. The manner of computing impact has been describe elsewhere herein.

According to aspects of the invention, the Impacts column is cumulated to form a total, as indicated in by the Total display area 4306.

Selector buttons are also provided so as to allow cumulating the calculated impact(s) for a predetermined time intervals, e.g., Date, Week, Month, Year. The Month selector is activated at 4302, indicating that the cumulated total impact of the exceptions assigned to this particular user represents the impact for the particular month in question.

FIG. 44 illustrates an exemplary case management user interface screen 4400 with the Status subsidiary tab selected. In this particular display, a user may activate a selector box to select a collection of cases that have similar status assigned and view information relating to exceptions and their calculated potential impact. Otherwise the view is similar to that of FIG. 43. Case statuses provided in the described embodiment of the present invention include Detected, Under Review, Dismissed, and Fixed. In the example shown in the FIG. 44, the Under Review selector box 4401 has been actuated, so as to cause display of a plurality of cases having this status assigned. Accordingly, the cumulative impact in the Total field 4406 reflects the added impact of all cases displayed that are considered "under review" in the system and having been assigned to a particular user.

FIG. 45 illustrates an exemplary case management user interface screen that allows assignment of an exception to a particular user as investigator or case manager. A particular exception 4504 is shown selected, identified as VOUCHER_LINE_TO_DUPLICATE_PO-105032000007-93. The Summary tab is shown selected. The display area associated with the Summary tab shows a number of data items or fields associated with this exception, including the Exception ID, Owner 4506, Status 4508, Priority (calculated as described elsewhere), Confidence (as described elsewhere), Category, System, Potential Impact (as described elsewhere). In particular, the Owner field control is shown actuated, which generates a pulldown or popup selector box 4506 having a list of names of users that can be selected to assign such persons as Owner of the particular exception. This assignment function would typically be implemented as a function of an administrative level person.

FIG. 46 is an exemplary case management user interface screen 4600 with the Notes tab selected. The region 4601 provides an area for user input of notes relating to particular cases being handled by a particular authorized person who is reviewing and inspecting the screen.

FIG. 47 is an exemplary case management user interface screen 4700 with Log tab selected. This particular display screen includes a display region 4702 for display of information relating to a log of information as to the handling of particular actors, exceptions, or the handling thereof.

In order to illustrate certain principles involves in the disclosed embodiments and aspects of the present invention turn to FIG. 48 for an illustration of an exemplary exception and various steps in the detection and reporting of the exception. The exemplary exception takes the form of an employee changing the bank account number for a particular vendor to substitute his or her bank account for the vendor's bank account, perhaps as a part of a fraudulent scheme to steal funds from the enterprise. In accordance with aspects of the invention, assume that the enterprise maintains a compliance policy frame or statement operative to detect whether a vendor's bank account number is the same as an employee's bank account number. Accordingly, the change of a vendor's bank account number will constitute a transaction monitored by the TIM system 100; this can be indicated by operation of a frame similar to that described above in connection the "Ghost Vendor" situation described above, except containing expressions designed to compare vendor bank account numbers with employee bank account number.

The various steps of interest in the exception processing are identified as numbers within circles, reflecting steps 1-9 of a process for identifying a Ghost Vendor exception and establishing a case to handle the determination of the exception. At step 1, assume that an employee (actor) 102 of the enterprise changes the bank account number of a particular vendor ID 1234 from 5678 to account number 8899. The data relating to this change will be stored in the ERP database 120, and in particular in the vendor table 4815.

At step 2, a transaction containing the information relating to this change is acquired by the extractor 140 in accordance with aspects of the present invention. Assume that information indicating changes to entities is provided in the form of an audit log, stored in an audit log table 4817 in the ERP database. An audit or transaction log data item 4801 is provided to the data extractor 140 via the audit/transaction log. At step 3 the extractor 40 queries the ERP database 120 to retrieve other information (related entity information) regarding Vendor 1234, in accordance with the extractor information. At step 4, other information from the query back to the ERP database is provided, including the new bank account number for Vendor 1234.

At step 5, a corresponding monitoring entity 4803 is created in the monitoring database 175. At step 6, a frame 4805 reflecting an enterprise policy is retrieved from the knowledge base 165 and provided to the CORE 160. Assume that the frame 4805 expresses the policy that an exception should be indicated if a vendor bank account number is the same as an employee bank account number. At step 6, the CORE 160 determines from execution of the frame 4805 that an exception has occurred, and stores an exception entry 4810 in the exceptions database 185.

At step 7, the case management process 190 retrieves (or is provided) the exception and generates a case report indicating that a Ghost Vendor exception has been determined, with provision of information relating to impact and confidence level. At step 8, information relating to the Ghost Vendor exception is displayed to a user 101 via the case management/analysis and report UI 180. At step 9, optionally, the extractor retrieves additional information relating to vendor 1234 from the ERP database in a subsequent extraction operation (e.g. from access to external data sources 131), so as to obtain further details about vendor 1234 or about the employee, for use in connection with a case or investigation.

The foregoing description of the exemplary embodiments of the inventions has been presented only for the purposes of illustration and description and is not intended to be exhaustive or to limit the invention to the precise forms disclosed. Many modifications and variations are possible in light of the above teachings.

What is claimed is:

1. A computer-readable medium for storing data for access by a compliance monitoring application program being executed on a data processing system in a policy compliance monitoring system operative to monitor electronic transactions of an enterprise and determine exceptions to policies of the enterprise expressed by computer-executable compliance policy statements, comprising:

a plurality of extractor files stored on said medium, each of the extractor files for utilization by one or more data extractors coupled for data communications with one or more data sources that provide electronic transactions of the enterprise for extracting information from said electronic transactions for utilization in policy compliance monitoring by the policy compliance monitoring system;

a plurality of normalizing files stored on said medium for access and utilization by a mapper operative for normalizing data from the one or more data sources against a system ontology and storing normalized data in a monitoring database for use by a transaction analysis engine in the policy compliance monitoring system; and a plurality of computer-executable compliance policy statements stored on said medium for use by a transaction analysis engine, the computer-executable compliance policy statements representing one or more predetermined policies of the enterprise that apply to data stored in the monitoring database, whereby the extractor files are accessed and utilized by the data extractors to extract information from electronic transactions, the normalizing files are accessed and utilized by the mapper to generate normalized data from extracted data and store normalized data in the monitoring database, and said computer-executable policy statements are accessed and utilized by the transaction analysis engine to process data in the monitoring database and determine the occurrence of exceptions to policies expressed by said computer-executable compliance policy statements.

2. The computer-readable medium of claim 1, wherein each of plurality of extractor files includes information identifying a data source containing information for utilization in the policy compliance monitoring system, access protocols for the data source, and predetermined tables and columns of tables of the data source.

3. The computer-readable medium of claim 1, wherein an extractor file is provided for one or more of the following types of extractors: master extractor, resync extractor, log extractor, programmatic extractor, external data source extractor, IT environment extractor.

4. The computer-readable medium of claim 1, wherein the normalizing files comprise an ontology file.

5. The computer-readable medium of claim 4, wherein the ontology file contains information identifying an entity that is subject to testing for policy compliance by a computer-executable compliance policy statement, in a format corresponding to expressions contained in the computer-executable compliance policy statement.

6. The computer-readable medium of claim 4, wherein the ontology file contains linkages identifying other entities related to one of the entities expressed in the ontology.

7. The computer-readable medium of claim 1, wherein the normalizing file includes information required to add metadata to data obtained from a data source.

8. The computer-readable medium of claim 7, wherein the metadata comprises revision information that allows comparison of different versions of an entity over a period of time.

9. The computer-readable medium of claim 7, wherein the metadata comprises actor information.

10. The computer-readable medium of claim 1, wherein the normalizing files comprise a mapping file.

11. The computer-readable medium of claim 10, wherein the mapping file identifies specific tables and column in a schema of a data source, and corresponding specific tables and columns in a schema of the monitoring database.

12. The computer-readable medium of claim 1, wherein the computer-executable compliance policy statements comprise XML frames.

13. The computer-readable medium of claim 1, wherein the computer-executable compliance policy statements comprise logical expressions for evaluating data stored in the monitoring database against predetermined requirements, and indicators that represent the resolution of a logical expression.

14. The computer-readable medium of claim 13, wherein one or more indicators comprise an exception signaling possible lack of compliance with a policy expressed by the computer-executable compliance policy statement.

15. The computer-readable medium of claim 1, wherein the computer-executable compliance policy statements comprise one or more of the following types of policy statements: a generic policy statements, industry specific policy statements, business process specific policy statements, ERP system specific policy statements, customer specific policy statements, division specific policy statements.

16. The computer-readable medium of claim 1, further comprising a user interface for allowing user access and modification of the extractor files, the normalizing files, and the computer-executable compliance policy statements, for customization and configuration to specific end-user applications.

17. A computer-implemented method for determining the occurrence of exceptions to enterprise policies as evidenced by data contained in electronic transactions of an enterprise, the method for execution in a policy compliance monitoring system that is operative to determine said exceptions based on use of computer-executable policy statements executed by a transactions analysis engine associated with the policy compliance monitoring system, comprising the steps of:

storing a plurality of extractor files on a computer-readable medium, each of the extractor files for utilization by one or more data extractors coupled for data communications with one or more data sources that provide electronic transactions of the enterprise for extracting information from said electronic transactions for utilization in policy compliance monitoring by the policy compliance monitoring system;

storing a plurality of normalizing files on a computer-readable medium for access and utilization by a mapper operative for normalizing data from the one or more data sources against a system ontology and storing normalized data in a monitoring database for use by the transaction analysis engine; and storing a plurality of computer-executable compliance policy statements on a computer-readable medium for use by the transactions analysis engine, the computer-executable policy statements representing one or more predetermined policies of the enterprise that apply to the data stored in the monitoring database, whereby the extractor files are accessed and utilized by the data extractors to extract information from electronic transactions, the normalizing files are accessed and utilized by the mapper to generate normalized data from extracted data and store normalized data in the monitoring database, and said computer-executable policy statements are accessed and utilized by the transaction analysis engine to process data in the monitoring database and determine the occurrence of exceptions to policies expressed by said computer-executable compliance policy statements.

18. The method of claim 17, wherein each of plurality of extractor files includes information identifying a data source containing information for utilization in the policy compliance monitoring system, access protocols for the data source, and predetermined tables and columns of tables of the data source.

19. The method of claim 17, wherein an extractor file is provided for one or more of the following types of extractors: master extractor, resync extractor, log extractor, programmatic extractor, external data source extractor, IT environment extractor.

20. The method of claim 17, wherein the normalizing files comprise an ontology file.

21. The method of claim 20, wherein the ontology file contains information identifying an entity that is subject to testing for policy compliance by a computer-executable compliance policy statement, in a format corresponding to expressions contained in the computer-executable compliance policy statement.

22. The method of claim 20, wherein the ontology file contains linkages identifying other entities related to one of the entities expressed in the ontology.

23. The method of claim 17, wherein the normalizing file includes information required to add metadata to data obtained from a data source.

24. The method of claim 23, wherein the metadata comprises revision information that allows comparison of different versions of an entity over a period of time.

25. The method of claim 23, wherein the metadata comprises actor information.

26. The method of claim 17, wherein the normalizing files comprise a mapping file.

27. The method of claim 26, wherein the mapping file identifies specific tables and column in a schema of a data source, and corresponding specific tables and columns in a schema of the monitoring database.

28. The method of claim 17, wherein the computer-executable compliance policy statements comprise XML frames.

29. The method of claim 17, wherein the computer-executable compliance policy statements comprise logical expressions for evaluating data stored in the monitoring database against predetermined requirements, and indicators that represent the resolution of a logical expression.

30. The method of claim 29, wherein one or more indicators comprise an exception signaling possible lack of compliance with a policy expressed by the computer-executable compliance policy statement.

31. The method of claim 17, wherein the policy statements comprise one or more of the following types of policy statements: a generic policy statements, industry specific policy statements, business process specific policy statements, ERP system specific policy statements, customer specific policy statements, division specific policy statements.

32. The method of claim 17, further comprising the step of providing a user interface for allowing user access and modification of the extractor files, the normalizing files, and the computer-executable policy statements, for customization and configuration to specific end-user applications.

33. A policy compliance monitoring system operative to monitor electronic transactions of an enterprise and determine exceptions to policies of the enterprise expressed by computer-executable compliance policy statements, comprising:

a computer system coupled to one or more data sources that provide data corresponding to electronic transactions of the enterprise;

one or more data extractors coupled for data communications with the one or more data sources and operative for extracting information from said electronic transactions for utilization in policy compliance monitoring by the policy compliance monitoring system;

a data storage system comprising a computer-readable medium, the data storage system storing:

(a) a compliance monitoring application program for execution by the computer system;

(b) a mapper application program;

(c) a transactions analysis engine application program;

(d) a monitoring database;

(e) a plurality of extractor files, each of the extractor files for utilization by the one or more data extractors;

(f) a plurality of normalizing files for access and utilization by the mapper operative for normalizing data from the one or more data sources against a system ontology and storing normalized data in the monitoring database for use by the transaction analysis engine; and (g) a plurality of computer-executable compliance policy statements for use by the transaction analysis engine, the computer-executable compliance policy statements representing one or more predetermined policies of the enterprise that apply to data stored in the monitoring database, whereby the extractor files are accessed and utilized by the data extractors to extract information from electronic transactions, the normalizing files are accessed and utilized by the mapper to generate normalized data from extracted data and store normalized data in the monitoring database, and said computer-executable policy statements are accessed and utilized by the transaction analysis engine to process data in the monitoring database and determine the occurrence of exceptions to policies expressed by said computer-executable compliance policy statements.

34. The system of claim 33, wherein each of plurality of extractor files includes information identifying a data source containing information for utilization in the policy compliance monitoring system, access protocols for the data source, and predetermined tables and columns of tables of the data source.

35. The system of claim 33, wherein an extractor file is provided for one or more of the following types of extractors: master extractor, resync extractor, log extractor, programmatic extractor, external data source extractor, IT environment extractor.

36. The system of claim 33, wherein the normalizing files comprise an ontology file.

37. The system of claim 36, wherein the ontology file contains information identifying an entity that is subject to testing for policy compliance by a computer-executable compliance policy statement, in a format corresponding to expressions contained in the computer-executable compliance policy statement.

38. The system of claim 36, wherein the ontology file contains linkages identifying other entities related to one of the entities expressed in the ontology.

39. The system of claim 33, wherein the normalizing file includes information required to add metadata to data obtained from a data source.

40. The system of claim 39, wherein the metadata comprises revision information that allows comparison of different versions of an entity over a period of time.

41. The system of claim 39, wherein the metadata comprises actor information.

42. The system of claim 33, wherein the normalizing files comprise a mapping file.

43. The system of claim 42, wherein the mapping file identifies specific tables and column in a schema of a data source, and corresponding specific tables and columns in a schema of the monitoring database.

44. The system of claim 33, wherein the computer-executable compliance policy statements comprise XML frames.

45. The system of claim 33, wherein the computer-executable compliance policy statements comprise logical expressions for evaluating data stored in the monitoring database against predetermined requirements, and indicators that represent the resolution of a logical expression.

46. The system of claim 45, wherein one or more indicators comprise an exception signaling possible lack of compliance with a policy expressed by the computer-executable compliance policy statement.

47. The system of claim 33, wherein the computer-executable compliance policy statements comprise one or more of the following types of policy statements: a generic policy statements, industry specific policy statements, business process specific policy statements, ERP system specific policy statements, customer specific policy statements, division specific policy statements.

48. The system of claim 33, further comprising a user interface for allowing user access and modification of the extractor files, the normalizing files, and the computer-executable compliance policy statements, for customization and configuration to specific end-user applications.

* * * * *